(12) United States Patent
Kaminkow et al.

(10) Patent No.: US 7,946,917 B2
(45) Date of Patent: May 24, 2011

(54) FLEXIBLE LOYALTY POINTS PROGRAMS

(75) Inventors: Joseph E. Kaminkow, Reno, NV (US); Richard E. Rowe, Las Vegas, NV (US)

(73) Assignee: IGT, Reno, NV (US)

( * ) Notice: Subject to any disclaimer, the term of this patent is extended or adjusted under 35 U.S.C. 154(b) by 774 days.

(21) Appl. No.: 10/214,936

(22) Filed: Aug. 6, 2002

(65) Prior Publication Data
US 2003/0036425 A1 Feb. 20, 2003

Related U.S. Application Data

(63) Continuation-in-part of application No. 09/927,742, filed on Aug. 10, 2001.

(51) Int. Cl.
*A63F 9/24* (2006.01)
*A63F 13/00* (2006.01)

(52) U.S. Cl. .................. 463/25; 463/42; 463/43

(58) Field of Classification Search ............ 463/25, 463/29, 42, 43, 16–20
See application file for complete search history.

(56) References Cited

U.S. PATENT DOCUMENTS

| | | |
|---|---|---|
| 4,335,809 A | 6/1982 | Wain et al. |
| 4,359,633 A * | 11/1982 | Bianco ................. 235/468 |
| 4,669,730 A | 6/1987 | Small |
| 4,764,666 A | 8/1988 | Bergeron |
| 4,856,787 A | 8/1989 | Itkis |
| 5,129,652 A | 7/1992 | Wilkinson .............. 273/139 |
| 5,169,155 A | 12/1992 | Soules et al. |
| 5,257,179 A | 10/1993 | DeMar |
| 5,258,837 A | 11/1993 | Gormley |
| 5,265,874 A | 11/1993 | Dickinson et al. ........ 463/25 |
| 5,290,033 A | 3/1994 | Bittner et al. ............ 273/138 |
| 5,318,298 A | 6/1994 | Kelly et al. |
| 5,321,241 A | 6/1994 | Craine |
| 5,326,104 A | 7/1994 | Pease et al. |
| 5,373,440 A | 12/1994 | Cohen et al. |

(Continued)

FOREIGN PATENT DOCUMENTS
DE 19855117 5/2000
(Continued)

OTHER PUBLICATIONS

Symbol® , Wireless for Beginners, Sep. 1, 2001, Symbol Tech.
(Continued)

*Primary Examiner* — Peter DungBa Vo
*Assistant Examiner* — Jasson H Yoo
(74) *Attorney, Agent, or Firm* — Weaver Austin Villeneuve & Sampson LLP

(57) ABSTRACT

A gaming machine comprising a non-physical contact data interface is described. The non-physical contact data interface may be capable of reading loyalty program data from a loyalty program instrument without contact between the loyalty program instrument and the non-physical contact data interface. The non-physical contact data interface may be one of a bill validator, a bar-code reader and a Radio Frequency Identification (RFID) tag reader. The loyalty program instrument may be a substrate including at least one of a 1-D bar-code printed on the substrate, a 2-D bar-code printed on the substrate, a symbol printed on the substrate, alpha-numeric character printed on the substrate, a RFID tag embedded in the substrate, a RFID tag printed on the substrate and combinations thereof. The loyalty program instrument may be used to store an index to a record in a database or a portable data file.

40 Claims, 13 Drawing Sheets

U.S. PATENT DOCUMENTS

| | | | |
|---|---|---|---|
| 5,557,086 A | 9/1996 | Schulze et al. | |
| 5,581,257 A | 12/1996 | Greene et al. | |
| 5,586,936 A * | 12/1996 | Bennett et al. | 463/25 |
| 5,643,086 A | 7/1997 | Alcorn et al. | 463/29 |
| 5,655,961 A | 8/1997 | Acres et al. | |
| 5,702,304 A | 12/1997 | Acres et al. | |
| 5,722,891 A | 3/1998 | Inoue | |
| 5,741,183 A | 4/1998 | Acres et al. | 463/42 |
| 5,741,184 A | 4/1998 | Takemoto et al. | |
| 5,743,798 A | 4/1998 | Adams et al. | |
| 5,752,882 A | 5/1998 | Acres et al. | |
| 5,761,647 A | 6/1998 | Boushy | 705/10 |
| 5,768,382 A | 6/1998 | Schneier et al. | |
| 5,770,533 A * | 6/1998 | Franchi | 463/42 |
| 5,816,918 A | 10/1998 | Kelly et al. | 463/16 |
| 5,820,459 A | 10/1998 | Acres et al. | |
| 5,823,879 A | 10/1998 | Goldberg et al. | |
| 5,833,540 A | 11/1998 | Miodunski et al. | 463/42 |
| 5,836,817 A | 11/1998 | Acres et al. | |
| 5,871,398 A | 2/1999 | Schneier et al. | |
| 5,876,284 A | 3/1999 | Acres et al. | |
| 5,892,661 A | 4/1999 | Stafford et al. | |
| 5,951,397 A | 9/1999 | Dickinson | 463/36 |
| 5,952,922 A * | 9/1999 | Shober | 340/572.4 |
| 5,967,896 A | 10/1999 | Jorash et al. | |
| 5,971,271 A | 10/1999 | Wynn et al. | |
| 5,977,913 A | 11/1999 | Christ | |
| 5,988,501 A | 11/1999 | Murakami et al. | |
| 6,003,013 A | 12/1999 | Boushy et al. | 705/10 |
| 6,019,283 A | 2/2000 | Lucero | |
| 6,048,269 A | 4/2000 | Burns et al. | 463/25 |
| 6,048,271 A | 4/2000 | Barcelou | |
| 6,089,975 A | 7/2000 | Dunn | 463/16 |
| 6,104,815 A | 8/2000 | Alcorn et al. | 380/251 |
| 6,106,396 A | 8/2000 | Alcorn et al. | 463/29 |
| 6,110,041 A | 8/2000 | Walker et al. | |
| 6,113,495 A | 9/2000 | Walker et al. | 463/42 |
| 6,135,884 A | 10/2000 | Hedrick et al. | |
| 6,142,876 A | 11/2000 | Cumbers | 463/25 |
| 6,144,332 A | 11/2000 | Reindl et al. | |
| 6,149,522 A | 11/2000 | Alcorn et al. | 463/29 |
| 6,161,743 A | 12/2000 | Shoemaker, Jr. | |
| 6,162,122 A | 12/2000 | Acres et al. | 463/29 |
| 6,165,071 A | 12/2000 | Weiss | |
| 6,183,362 B1 | 2/2001 | Boushy | 463/25 |
| 6,186,893 B1 | 2/2001 | Walker et al. | |
| 6,193,156 B1 | 2/2001 | Han et al. | |
| 6,193,608 B1 * | 2/2001 | Walker et al. | 463/25 |
| 6,203,430 B1 | 3/2001 | Walker et al. | |
| 6,210,279 B1 | 4/2001 | Dickinson | 463/37 |
| 6,234,900 B1 | 5/2001 | Cumbers | 463/29 |
| 6,244,958 B1 | 6/2001 | Acres | 463/26 |
| 6,254,006 B1 | 7/2001 | Mish | |
| 6,254,483 B1 | 7/2001 | Acres | |
| 6,265,977 B1 * | 7/2001 | Vega et al. | 340/572.7 |
| 6,267,671 B1 | 7/2001 | Hogan | |
| 6,280,326 B1 | 8/2001 | Saunders | 463/25 |
| 6,285,295 B1 * | 9/2001 | Casden | 340/825.22 |
| 6,293,866 B1 | 9/2001 | Walker et al. | 463/20 |
| 6,302,793 B1 | 10/2001 | Fertitta et al. | |
| 6,319,122 B1 | 11/2001 | Packes et al. | |
| 6,319,125 B1 | 11/2001 | Acres | |
| 6,329,213 B1 * | 12/2001 | Tuttle et al. | 438/19 |
| 6,358,149 B1 | 3/2002 | Schneider et al. | |
| 6,379,247 B1 | 4/2002 | Walker et al. | 463/25 |
| 6,383,076 B1 | 5/2002 | Tiedeken | |
| 6,394,907 B1 | 5/2002 | Rowe | 463/42 |
| 6,398,649 B1 | 6/2002 | Sugaya | 463/36 |
| 6,400,272 B1 | 6/2002 | Holtzman et al. | |
| 6,409,595 B1 | 6/2002 | Uihlein et al. | |
| 6,419,190 B1 | 7/2002 | Nguegang | |
| 6,424,884 B1 | 7/2002 | Brooke, Jr. et al. | |
| 6,431,983 B2 | 8/2002 | Acres | |
| 6,471,590 B2 | 10/2002 | Saunders | |
| 6,514,140 B1 | 2/2003 | Storch | |
| 6,547,664 B2 | 4/2003 | Saunders | |
| 6,554,705 B1 | 4/2003 | Cumbers | |
| 6,558,256 B1 | 5/2003 | Saunders | |
| 6,571,216 B1 | 5/2003 | Garg et al. | |
| 6,606,744 B1 | 8/2003 | Mikurak | |
| 6,612,575 B1 | 9/2003 | Cole et al. | |
| 6,612,928 B1 * | 9/2003 | Bradford et al. | 463/29 |
| 6,628,939 B2 | 9/2003 | Paulsen | |
| 6,629,019 B2 * | 9/2003 | Legge et al. | 700/237 |
| 6,641,035 B1 | 11/2003 | Predescu et al. | |
| 6,641,484 B2 | 11/2003 | Oles et al. | |
| 6,675,152 B1 | 1/2004 | Prasad et al. | |
| 6,682,421 B1 | 1/2004 | Rowe et al. | |
| 6,712,698 B2 | 3/2004 | Paulsent et al. | |
| 6,778,820 B2 | 8/2004 | Tendler | |
| 6,811,486 B1 * | 11/2004 | Luciano, Jr. | 463/24 |
| 6,812,824 B1 * | 11/2004 | Goldinger et al. | 340/10.1 |
| 6,813,609 B2 * | 11/2004 | Wilson | 705/14 |
| 6,848,995 B1 | 2/2005 | Walker et al. | |
| 6,852,031 B1 | 2/2005 | Rowe | |
| 6,878,062 B2 | 4/2005 | Bjorklund et al. | |
| 6,884,173 B2 | 4/2005 | Gauselmann | |
| 6,887,154 B1 * | 5/2005 | Luciano et al. | 463/26 |
| 6,912,398 B1 * | 6/2005 | Domnitz | 455/461 |
| 6,920,561 B1 | 7/2005 | Gould et al. | |
| 6,923,721 B2 * | 8/2005 | Luciano et al. | 463/24 |
| 6,923,724 B2 | 8/2005 | Williams | |
| 6,935,958 B2 | 8/2005 | Nelson | |
| 7,022,017 B1 | 4/2006 | Halbritter | |
| 7,025,674 B2 | 4/2006 | Adams et al. | |
| 7,083,518 B2 | 8/2006 | Rowe | |
| 7,094,149 B2 | 8/2006 | Walker et al. | |
| 7,116,987 B2 | 10/2006 | Spain, Jr. et al. | |
| 7,116,988 B2 | 10/2006 | Dietrich et al. | |
| 7,175,528 B1 | 2/2007 | Cumbers | |
| 7,303,475 B2 | 12/2007 | Britt et al. | |
| 7,311,605 B2 | 12/2007 | Moser et al. | |
| 2002/0034978 A1 | 3/2002 | Legge et al. | |
| 2002/0077173 A1 | 6/2002 | Luciano et al. | 463/25 |
| 2002/0077174 A1 | 6/2002 | Luciano et al. | |
| 2002/0128057 A1 | 9/2002 | Walker et al. | |
| 2002/0142841 A1 | 10/2002 | Boushy | |
| 2002/0169021 A1 | 11/2002 | Urie et al. | |
| 2002/0187834 A1 | 12/2002 | Rowe et al. | |
| 2002/0194619 A1 | 12/2002 | Chang et al. | |
| 2003/0027635 A1 | 2/2003 | Walker et al. | |
| 2003/0032471 A1 | 2/2003 | Darder | |
| 2003/0032474 A1 | 2/2003 | Kaminkow | |
| 2003/0045354 A1 * | 3/2003 | Giobbi | 463/40 |
| 2003/0069071 A1 | 4/2003 | Britt et al. | |
| 2003/0078101 A1 | 4/2003 | Schneider et al. | |
| 2003/0083943 A1 | 5/2003 | Adams et al. | |
| 2003/0104865 A1 | 6/2003 | Itkis et al. | |
| 2003/0162593 A1 | 8/2003 | Griswold | |
| 2003/0195037 A1 | 10/2003 | Vuong et al. | |
| 2003/0199321 A1 | 10/2003 | Williams | |
| 2003/0232647 A1 | 12/2003 | Moser | |
| 2004/0254005 A1 | 12/2004 | Shackleford et al. | |
| 2005/0012818 A1 | 1/2005 | Kiely et al. | |
| 2005/0051965 A1 | 3/2005 | Gururajan et al. | |
| 2005/0054439 A1 | 3/2005 | Rowe et al. | |
| 2005/0116020 A1 | 6/2005 | Smolucha | |
| 2005/0143169 A1 | 6/2005 | Nguyen et al. | |
| 2005/0255919 A1 | 11/2005 | Nelson | |
| 2006/0040741 A1 | 2/2006 | Griswold et al. | |
| 2006/0046842 A1 | 3/2006 | Mattice | |
| 2006/0052169 A1 | 3/2006 | Britt et al. | |
| 2006/0076401 A1 | 4/2006 | Frerking | |
| 2006/0084488 A1 | 4/2006 | Kinsley et al. | |
| 2006/0148561 A1 | 7/2006 | Moser et al. | |
| 2006/0252521 A1 | 11/2006 | Gururajan et al. | |
| 2006/0252554 A1 | 11/2006 | Gururajan et al. | |
| 2006/0258427 A1 | 11/2006 | Rowe | |
| 2006/0258442 A1 | 11/2006 | Ryan | |
| 2007/0011763 A1 | 1/2007 | Nelson | |
| 2007/0087834 A1 | 4/2007 | Moser et al. | |
| 2007/0117623 A1 | 5/2007 | Nelson | |
| 2007/0271113 A1 | 11/2007 | Nelson | |
| 2008/0051193 A1 | 2/2008 | Kaminkow et al. | |
| 2009/0055204 A1 | 2/2009 | Pennington | |
| 2009/0055205 A1 | 2/2009 | Nguyen | |

FOREIGN PATENT DOCUMENTS

| | | |
|---|---|---|
| EP | 360613 | 4/1995 |
| EP | 762341 | 12/1997 |
| EP | 1096438 | 2/2001 |
| EP | 1139310 | 4/2001 |
| EP | 1120757 | 8/2001 |
| EP | 1 351 180 | 10/2003 |
| FR | 2 711 001 | 4/1995 |
| FR | 2 816 742 | 5/2002 |
| JP | 07-505079 | 6/1995 |
| JP | 11-019330 | 1/1999 |
| JP | 2000-210464 | 8/2000 |
| JP | 2002-74506 | 3/2002 |
| JP | 2002-78954 | 3/2002 |
| WO | 96-00950 | 1/1996 |
| WO | 98-12648 | 3/1998 |
| WO | WO 98/47589 | 10/1998 |
| WO | WO00/38089 | 6/2000 |
| WO | 00-52655 | 8/2000 |
| WO | 00-78419 | 12/2000 |
| WO | 01-46923 | 6/2001 |
| WO | WO02/058020 | 7/2002 |
| WO | WO 03/025828 | 3/2003 |
| WO | 03-027970 | 4/2003 |
| WO | WO 03073386 | 9/2003 |
| WO | 03-089088 | 10/2003 |
| WO | 03-107287 | 12/2003 |
| WO | 2004-013820 | 2/2004 |
| WO | WO 2004052656 | 6/2004 |
| WO | 2004-064354 | 7/2004 |
| WO | 95-24689 | 9/2005 |
| WO | 2005-098650 | 10/2005 |
| WO | 2006-020413 | 2/2006 |
| WO | 2006-105182 | 10/2006 |
| WO | 2008-067212 | 6/2008 |
| WO | 2008-091473 | 7/2008 |
| WO | WO2009-026180 | 2/2009 |
| WO | WO2009/026295 | 2/2009 |

OTHER PUBLICATIONS

RFID Basics Primer, Automatic Identification Manufacturers, Sep. 28, 1999, http://www.aimglobal.org/technologies/rfid/resources/papers/rfid_basics_primer.htm., pp. 1-17.

Bar Code 1, 2-Dimensional Bar Code Page, Adams Communication, Jun. 20, 2002, http://www.adams1.com/pub/russadam/stack.html, pp. 1-13.

Bar Code 1, Bar Code Readers Page, Adams Communication, Jun. 20, 2002, http://www.adams1.com/pub/russadam/readers.html., pp. 1-5.

Symbol®, Encoded Fingerprint Scanned by Symbol PDF417 Reader, Symbol Tech, Dec. 22, 1998. http://www.symbol.com/nes/pressreleases/press_releases_pdf417prod_ph.html., pp. 1-3.

Economist, Where's the smart money?, Feb. 7, 2002, www.Economist.com.

V.L Engineering, Hand Held terminal-decoder for invisible bar codes, Jun. 20, 2002, http://www.vlengineering.com/products/wizard_CT6.html.

International Search Report and Written Opinion dated Nov. 15, 2005 for corresponding PCT Application No. PCT/US2005/026777 (7 pages).

Foreign Search Report dated Jul. 7, 2005, from corresponding UK Application No. 0502535.8 (2 pages).

Combined International Search and Examination Report dated, Feb. 15, 2007, from corresponding Great Britain Application No. GB0620781.5.

The Straight Dope, Jul. 24, 2001 http://www.strightdope.com/mailbag/mpreenstamps.html.

S&H Greenpoints Web page, 2001, Sperry & Hutchinson Company, Inc. heep://www.greenpoints.com.

U.S. Office Action dated Mar. 20, 2007 from related U.S. Appl. No. 09/927,742, (23 pages).

U.S. Office Action dated Mar. 10, 2003 from related U.S. Appl. No. 09/927,742, (15 pages).

U.S. Office Action dated Aug. 20, 2003 from related U.S. Appl. No. 09/927,742, (15 pages).

U.S. Office Action dated Sep. 19, 2002 from related U.S. Appl. No. 09/927,742, (15 pages).

Rankl W et al.: "Handbuch der Chipkarten, Kontaktbehaftete Karten" Handbuch Der Chipkarten. Aufbau-Funktionsweise-Einsatz Von Smart Cards, Muenchen: Carl Hanser Verlag, DE, 1999, pp. 110-125, XP002242017.

Summary of Herbst Presentation given by Rick Rowe on Aug. 12, 2003.

Sandia National Laboratories, "Technology Highlight: Spread Spectrum Barcode Technology," Sandia/California News, downloaded Oct. 27, 2005.

Office Action dated Sep. 20, 2007 received in related U.S. Appl. No. 09/927,742.

Office Action dated Oct. 5, 2007 received in related U.S. Appl. No. 10/914,944.

Examination Report dated Jan. 16, 2008 from European Patent Application No. 05776662.8.

Examination Report dated Jan. 30, 2008 from United Kingdom Patent Application No. 0620781.5.

Japanese Office Action dated Mar. 5, 2008 from related U.S. Application No. 2004-256237, 4 pgs.

Office Action dated Apr. 16, 2008 from related U.S. Appl. No. 10/914,944.

Office Action dated May 28, 2008 from related U.S. Appl. No. 11/830,739.

Office Action dated Jun. 9, 2008 from related U.S. Appl. No. 09/927,742.

United Kingdom Office Action dated Jun. 24, 2008, from related UK Application No. 0620781.5, 2 pgs.

Chinese Office Action dated Jul. 18, 2008 from related CN Application No. 200580027057.X, 6 pgs.

Australian Office Action dated Jul. 18, 2008 from related AU Application No. 2003257941, 3 pgs.

International Search Report mailed Oct. 18, 2002 from PCT Application No. PCT/US2002/025105; 3 pgs.

Japanese Office Action dated Dec. 8, 2008 from related JP Application No. 2004-256237; 4 pgs.

U.S. Office Action dated Nov. 12, 2008 from U.S. Appl. No. 09/927,742; 12 pgs.

U.S. Final Office Action dated Feb. 19, 2009 from U.S. Appl. No. 11/830,739; 13 pgs.

U.S. Office Action dated Apr. 17, 2009 from U.S. Appl. No. 09/927,742; 12 pgs.

U.S. Office Action dated Apr. 22, 2009 from related U.S. Appl. No. 10/914,944; 19 pgs.

China Office Action dated Jun. 12, 2009 from U.S. Appl. No. 200580027057.X; 5 pgs.

Final Office Action dated Nov. 12, 2008 for U.S. Appl. No. 09/927,742.

Final Office Action dated Apr. 17, 2009 for U.S. Appl. No. 09/927,742.

Office Action dated Jul. 23, 2009 from U.S. Appl. No. 09/927,742.

Final Office Action dated Aug. 21, 2009 for U.S. Appl. No. 10/214,936.

Final Office Action date Aug. 19, 2009 for U.S. Appl. No. 11/830,739.

Office Action dated Oct. 16, 2009 from related U.S. Appl. No. 11/262,059.

Office Action dated Apr. 22, 2009 from related U.S. Appl. No. 10/914,944.

US Office Action, mailed Mar. 2, 2004, from U.S. Appl. No. 10/170,278.

US Office Action, mailed Apr. 4, 2005 (non-responsive), from U.S. Appl. No. 10/170,278.

US Office Action, mailed Sep. 9, 2004, from U.S. Appl. No. 10/170,278.

US Office Action, mailed Jan. 11, 2007, from U.S. Appl. No. 10/170,278.

Supplemental US Office Action, mailed Jan. 19, 2007, from U.S. Appl. No. 10/170,278.

Notice of Allowance for U.S. Appl. No. 10/170,278 dated Sep. 7, 2005.

Notice of Allowance for U.S. Appl. No. 10/170,278 dated Aug. 7, 2007.
Allowed claims for US Appl. No. 10/170,278.
Final Office Action, mailed Jan. 25, 2007, from U.S. Appl. No. 11/303,444.
US Office Action, mailed Feb. 25, 2008, from U.S. Appl. No. 11/655,496.
US Final Office Action, mailed Oct. 1, 2008, from U.S. Appl. No. 11/655,496.
US Office Action, mailed Jan. 26, 2009, from U.S. Appl. No. 11/655,496.
US Office Action, mailed Sep. 8, 2009, from U.S. Appl. No.11/565,424.
International Search Report mailed Oct. 18, 2002 for PCT Application No. PCT/US2002/025105.
Combined Search and Examination Report dated Aug. 31, 2006 for GB Patent Application No. GB0611551.3.
Combined Search and Examination Report dated Aug. 31, 2006 for GB Patent Application No. GB0611545.5.
Japanese Office Action dated (FA Letter dated Mar. 5, 2008) from related U.S. Appl. No. 2004-256237, 4 pgs.
International Search Report mailed Mar. 2, 2004 for PCT Application No. PCT/US2003/023872.
Written Opinion mailed Mar. 8, 2004 for PCT Application No. PCT/US2003/023872.
Examiner's Report for Australian Patent Application No. 2003243570 dated Sep. 19, 2008.
Communication regarding Examination for European Patent Application No. 03 760 364.4-2221 dated May 20, 2005.
Preliminary Opinion European Patent application No. 03760364.4-2221 dated May 10, 2006.
Decision to Refuse a European Patent Application dated Feb. 2, 2007 for EP Patent Application No. 03 760 364.4-2221.
International Preliminary Examination Report with International Search Report for PCT Application No. PCT/US03/18826 mailed Apr. 8, 2004.
Written Opinion for PCT Application No. PCT/US03/18826 mailed Jan. 15, 2004.
Written Opinion mailed Jun. 23, 2008 for PCT Application No. PCT/US2007/085117.
International Search Report mailed Jun. 23, 2008, for PCT Application No. PCT/US2007/085117.
International Search Report mailed Jun. 23, 2008 for PCT Application No. PCT/US2007/088920.
Written Opinion mailed Jun. 23, 2008 for PCT Application No. PCT/US2007/088920.
International Preliminary Examination Report with International Search Report for PCT Application No. PCT/US2007/088920 mailed Jul. 30, 2009.
International Search Report mailed Nov. 7, 2008 for PCT Application No. PCT/US2008/073388.
Written Opinion mailed Nov. 7, 2008 for PCT Application No. PCT/US2008/073388.
International Search Report mailed Feb. 13, 2009 for PCT Application No. PCT/US2008/073599.
Written Opinion mailed Feb. 13, 2009 for PCT Application No. PCT/US2008/073599.
Converting Signal Strength Percentage to dBm Values, Joe Bardwell, Nov. 2002.
Doppler Direction Finder, Radio Direction Finder Kit, Ramsey Electronics Mode No. DDF1, Copyright 1998 by Ramsey Electronics, Inc.
N. Patwari, A. O. Hero and J. Costa, "Learning Sensor Location from Signal Strength and Connectivity," in Secure Localization and Time Synchronization for Wireless Sensor and Ad Hoc Networks , Eds.

Radha Poovendran, Cliff Wang, and Sumit Roy, Advances in Information Security series, vol. 30, Springer, Dec. 2006, ISBN 978-0-387-32721-1.
Bronstein et al "Robust expression-invariant face recognition from partially missing data", Computer Vision-ECCV 2006,ISBN 3-540-33836-5, Jul. 2006, pp. 396-408.
EPCglobal Architecture Framework, Final Version, Jul. 1, 2005, 53 pp.
Electronics Now, Whats News, 'In-Charge Cards', Aug. 1993, p. 4.
Bazakos et al. "Fast Access Control Technology Solutions", *IEEE Conference on Advanced Video Signal Based Surveillance*, Italy, Sep. 15-16, 2005.
Dowdall et al., "A Face Detection method Based on Multi-Band Feature Extraction in the Nar-IR Spectrum," *Proceedings IEEE Workshop on Computer Vision Beyond the Visiblespectrum: Methods and Applications*, Dec. 14, 2001, XP002369556.
Notice of Allowance dated Apr. 16, 2010 from U.S. Appl. No. 09/927,742.
Notice of Allowance and Fee(s) due dated Aug. 23, 2010 for U.S. Appl. No. 11/830,739.
Final Office Action dated Mar. 8, 2010 for U.S. Appl. No. 11/262/059.
Office Action dated Dec. 7, 2009 for U.S. Appl. No. 10/914,944.
Office Action dated Apr. 26, 2010 for U.S. Appl. No. 10/914,944.
US Final Office Action, mailed Feb. 5, 2010, from U.S. Appl. No. 11/655,496.
US Office Action, mailed Aug. 5, 2010, from U.S. Appl. No. 11/655,496.
US Final Office Action, mailed Mar. 8, 2010, from 11/565,424.
Chinese Office Action dated Jan. 8, 2010 from related CN Application No. 200580027057.X.
Google search on the definition of "encrypt" at: http://www.google.com/search?h1=en&r1z+1T4GGLD_en_US345 &q=define%3AEncrypt, pp. 1-2, retrieved on Feb. 26, 2010.
U.S. Advisory Action dated May 27, 2003 issued in U.S. Appl. No. 09/927,742.
U.S. Advisory Action dated Jun. 21, 2007 issued in U.S. Appl. No. 09/927,742.
U.S. Advisory Action dated Jun. 26, 2009 issued in U.S. Appl. No. 09/927,742.
U.S. Notice of Allowance dated Sep. 7, 2010 issued in U.S. Appl. No. 09/927,742.
U.S. Notice of Allowance dated Jan. 6, 2011 issued in U.S. Appl. No. 09/927,742.
U.S. Office Communication dated Sep. 29, 2010 considering IDS references issued in U.S. Appl. No. 11/830,739.
U.S. Notice of Allowance, Interview Summary, and Examiner's Amendment dated Dec. 29, 2010 issued in U.S. Appl. No. 11/830,739.
U.S. Final Office Action dated Sep. 23, 2010 issued in U.S. Appl. No. 10/914,944.
U.S. Office Action dated Sep. 24, 2010 issued in U.S. Appl. No. 11/565,424.
U.S. Office Action dated Dec. 1, 2010 issued in U.S. Appl. No. 11/829,028.
PCT International Preliminary Examination Report dated Jun. 11, 2003 issued in PCT/US2002/025105.
PCT International Preliminary Examination Report dated May 27, 2004 issued in PCT/US2003/023872.
PCT International Preliminary Report on Patentability and Written Opinion dated Feb. 24, 2010 issued in PCT/US2008/073388.
PCT International Preliminary Report on Patentability and Written Opinion dated Feb. 24, 2010 issued in PCT/US2008/073599.

* cited by examiner

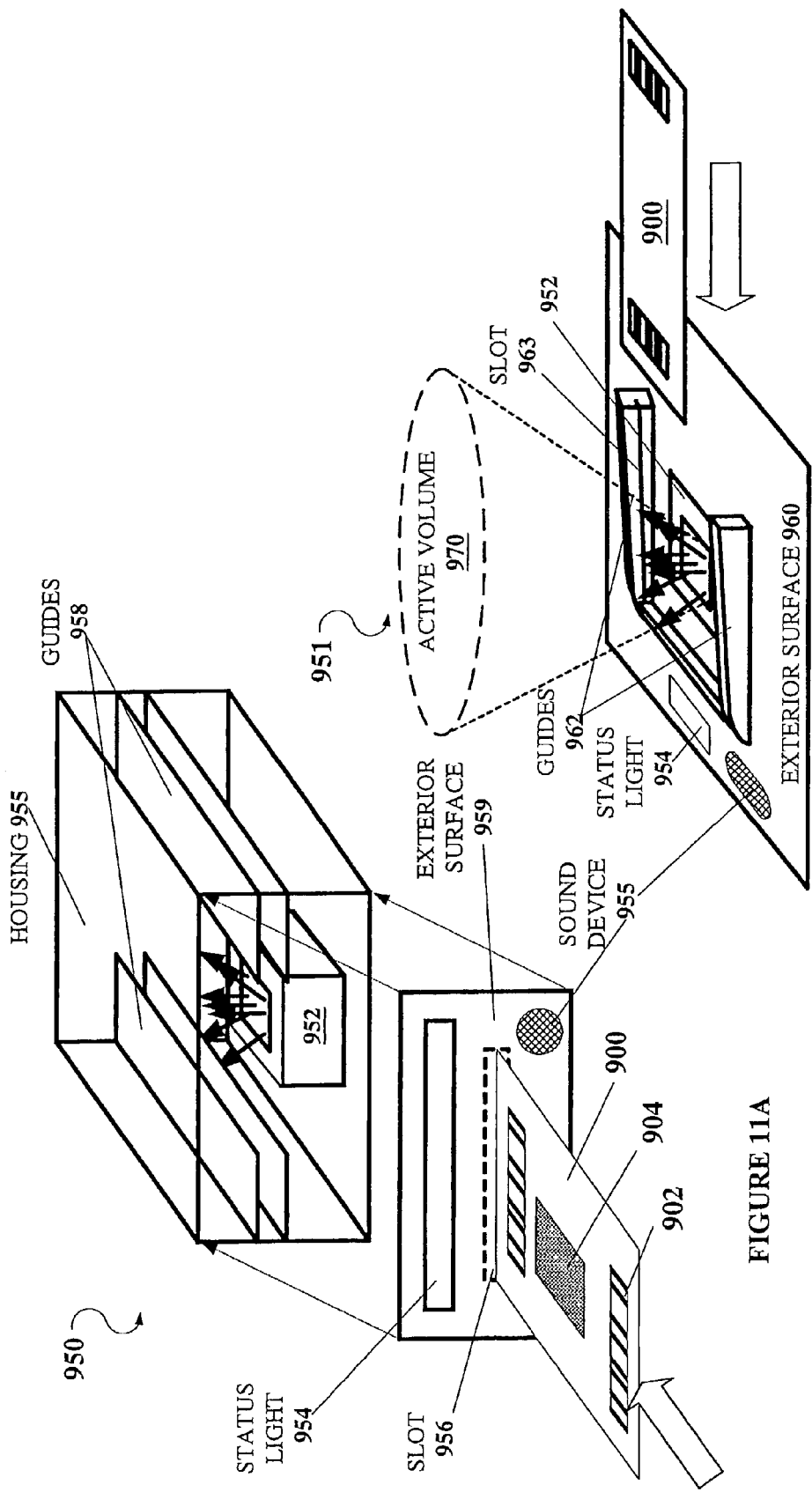

FLEXIBLE LOYALTY POINTS PROGRAMS

CROSS-REFERENCE TO RELATED APPLICATIONS

This application is a continuation-in-part of U.S. patent application Ser. No. 09/927,742 entitled "FLEXIBLE LOYALTY POINTS PROGRAMS," filed Aug. 10, 2001, which is incorporated herein by reference in its entirety for all purposes.

BACKGROUND OF THE INVENTION

This invention relates to game playing methods for gaming machines, such as video slot machines and video poker machines, or for tracked table games. More particularly, the present invention relates to methods and apparatus of allowing game players to participate in loyalty programs on gaming machines and during other gaming activities.

As technology in the gaming industry progresses, the traditional mechanically driven reel slot machines are being replaced or supplemented with electronic counterparts having CRT, LCD video displays or the like and gaming machines such as video slot machines and video poker machines are becoming increasingly popular. Part of the reason for their increased popularity is the nearly endless variety of games that can be implemented on gaming machines utilizing advanced electronic technology. In some cases, newer gaming machines are utilizing computing architectures developed for personal computers. These video/electronic gaming advancements enable the operation of more complex games, which would not otherwise be possible on mechanical-driven gaming machines and allow the capabilities of the gaming machine to evolve with advances in the personal computing industry.

Typically, utilizing a master gaming controller, the gaming machine controls various combinations of devices that allow a player to play a game on the gaming machine and also encourage game play on the gaming machine. For example, a game played on a gaming machine usually requires a player to input money or indicia of credit into the gaming machine, indicate a wager amount, and initiate a game play. These steps require the gaming machine to control input devices, including bill validators and coin acceptors, to accept money into the gaming machine and recognize user inputs from devices, including touch screens and button pads, to determine the wager amount and initiate game play.

After game play has been initiated, the gaming machine determines a game outcome, presents the game outcome to the player and may dispense an award of some type depending on the outcome of the game. A game outcome presentation may utilize many different visual and audio components such as flashing lights, music, sounds and graphics. The visual and audio components of the game outcome presentation may be used to draw a players attention to various game features and to heighten the players interest in additional game play. Maintaining a game player's interest in game play, such as on a gaming machine or during other gaming activities, is an important consideration for an operator of a gaming establishment.

One related method of gaining and maintaining a game player's interest in game play is loyalty point programs, such as player tracking programs, offered at various casinos. Loyalty point programs provide rewards to players that typically correspond to the player's level of patronage (e.g., to the player's playing frequency and/or total amount of game plays at a given casino). Loyalty point rewards may be free meals, free lodging and/or free entertainment. These rewards may help to sustain a game player's interest in additional game play during a visit to a gaming establishment and may entice a player to visit a gaming establishment to partake in various gaming activities.

In general, loyalty programs may be applied to any game of chance offered at a gaming establishment. An example of a hardware and/or software implementation of a loyalty reward program with respect to a number of gaming machines is described as follows. FIG. 1 is a block diagram of a number of gaming machines with player tracking units connected to servers providing player tracking services. In casino 150, gaming machines 100, 101, 102 and 103 are connected, via the data collection unit (DCU) to the player tracking/accounting server 120. The DCU 106, which may be connected to up to 32 player tracking units in a particular example, consolidates the information gathered from player tracking units in communication with the DCU 106 and forwards the information to a player tracking account server such as 120.

In another casino 151, a different player tracking server 121 is connected to gaming machines 130 and 131. In yet another casino 152, a separate player tracking server 122 is connected to gaming machines 132 and 133.

In gaming machine 100 of casino 150, a player tracking unit 107 and slot machine interface board (SMIB) 103 are mounted within a main cabinet 8 of the gaming machine. A top box 130 is mounted on top of the main cabinet 8 of the gaming machine. In many types of gaming machines, the player tracking unit is mounted within the top box 130. Usually, player tracking units, such as 107, and SMIBs, such as 103, are manufactured as separate units before installation into a gaming machine. The player tracking unit 107 includes three player tracking devices, a card reader 24, a key pad 22, and a display 16, all mounted within the unit.

The player tracking unit 107 communicates with the player tracking server via the SMIB 103, a main communication board 110 and the data collection unit 106. The player tracking unit 107 is usually connected to the master gaming controller 104 via a serial connection of some type and communicates with the master gaming controller 104 using a communication protocol of some type. For example, the master gaming controller 104 may employ a subset of the Slot Accounting System (SAS protocol) developed by International Game Technology of Reno, Nev. to communicate with the player tracking unit 107.

Typically, when a game player wants to play a game on a gaming machine and utilize the player tracking services available through the player tracking unit, a game player inserts a player tracking card, such as a magnetic striped card, into the card reader 24. After the magnetic striped card has been so inserted, the player tracking unit 107 may detect this event and receive certain identification information contained on the card. For example, a player's name, address, and player tracking account number encoded on the magnetic striped card, may be received by the player tracking unit 107. In general, a player must provide identification information of some type to utilize player tracking services available on a gaming machine. For current player tracking programs, the most common approach for providing identification information is to issue a magnetic-striped card storing the necessary identification information to each player that wishes to participate in a given player tracking program.

After a player has inserted her or his player tracking card into the card reader 24, the player tracking unit 107 may command the display 16 to display the game player's name on the display 16 and also, may optionally display a message requesting the game player to validate their identity by entering an identification code using the key pad 22. Once the game player's identity has been validated, the player tracking information is relayed to the player tracking server 120. Typically, the player tracking server 120 stores player tracking account records including the number of player tracking points previously accumulated by the player.

During game play on the gaming machine, the player tracking unit 120 may poll the master gaming controller 104 for game play information such as how much money the player has wagered on each game, the time when each game was initiated and the location of the gaming machine. The game play information is sent by the player tracking unit 107 to the player tracking server 120. While a player tracking card is inserted in the card reader 24, the player tracking server 120 may use the game play information provided by the player tracking unit 107 to generate player tracking points and add the points to a player tracking account identified by the player tracking card. The player tracking points generated by the player tracking server 120 are stored in a memory of some type on the player tracking server.

As suggested above, a player's incentive for using the player tracking services is awards provided by the gaming machine operator (e.g., the casino). Unfortunately, when player tracking identification information is not provided to the player tracking server 120 via the player tracking unit 107, player tracking points are not accrued for a game player participating in a game play session on gaming machine 100. For example, when a player tracking card is not inserted into the card reader 24, the player tracking card has been inserted incorrectly or the card reader is malfunctioning, a game player may not obtain player tracking points while participating in game play on gaming machine 100. This happens more frequently than one might imagine. Very often a player will forget to bring his/her playing card to a casino, or leave the card in his/her room, or possibly return from the swimming pool without a card and decide to play anyway.

Also, when the player uses a player tracking card that is incompatible with gaming machine 100, such as a player tracking card issued at another casino, player tracking points are not awarded to the player. Typically, each casino implements a player tracking program with player tracking cards that may only be used to earn player tracking points only at the casino where the card was issued. For instance, casino 150 may issue a player tracking card that is only valid at casino 150, casino 151 may issue a player tracking card that is only valid at casino 151, and casino 152 may issue a player tracking card that is only valid at casino 152. In this example, the player may be a member of the player tracking programs available at each of casinos 150, 151 and 152. Thus, when a player tries to use the card issued at casino 151 in casino 150 or in casino 152, the card will not work and the player will not earn player tracking points.

In many gaming establishments, loyalty programs that allow a player to earn "complimentaries" or "comps", such as free rooms/buffets/shows etc., during table game play are very common. A player may earn "comps" for playing table games, such as black jack, baccarat, pai gow poker, keno and roulette. Depending on the gaming establishment, a loyalty program based upon table game play may or may not be combined with a loyalty program based upon slot game play.

Comps at table games are awarded using a rating system. To get rated, a player must give their name to a casino service representative every time they sit down to play a table game. The player must supply their name even if they have only moved from one table to an adjacent table. During the player's game play at the table, a casino service representative, such as a pit boss, keeps track of, or rates, the player. This means that the casino service person writes down how much a player buys in for, what his average bet is, how fast they play, how long they play and how much they win or lose. When the player leaves the table their rating is handed in. The game play information from their table gaming session is entered into a computer usually connected a remote server that stores a record of the player's game playing history. If the player then asks for dinner for two at the coffee shop the pit boss can look up their game play history and, based on guidelines, which may vary from casino to casino, decide whether or not a comp is justified. When a comp is justified, the pit boss can offer the player a voucher valid for the requested comp.

Player tracking/comp cards and player tracking/comp programs are becoming more and more popular. They have become a de facto method of doing business at casinos. A player may belong to many different player tracking/comp programs and have many different player tracking cards corresponding to each program to which they belong. For example, a single player may belong to as many as 20-30 separate player tracking programs and have 20-30 player tracking cards. As indicated, a disadvantage of current player tracking programs using player tracking cards is that a game player may simply forget to bring her card, lose her card, bring the wrong card, or forget to insert it into the gaming machine. In each of these cases, the player will fail to earn player tracking points. The casino is deprived of valuable marketing information and loyalty incentive and the player is deprived of awards that would otherwise be provided.

In view of the above, it would be desirable to provide apparatus and methods for player tracking programs that eliminate factors that can prevent the initiation of a player tracking session on a gaming machine.

SUMMARY OF THE INVENTION

This invention addresses the needs indicated above by providing a gaming machine that includes an input mechanism with a non-physical contact data interface. The non-physical contact data interface may be capable of reading loyalty program data from a loyalty program instrument without contact between the loyalty program instrument and the non-physical contact data interface. The input mechanism with the non-physical contact data interface may be one of a bill validator, a bar-code reader and a Radio Frequency Identification (RFID) tag reader. The loyalty program instrument may be a substrate including at least one of a 1-D bar-code printed on the substrate, a 2-D bar-code printed on the substrate, a symbol printed on the substrate, alpha-numeric character printed on the substrate, a RFID tag embedded in the substrate, a RFID tag printed on the substrate and combinations thereof. The loyalty program instrument may be used to store an index to a record in a database or a portable data file.

One aspect of the present invention provides a gaming machine. The gaming machine may be generally characterized as comprising: 1) a master gaming controller designed or configured to i) control a game play sequence comprising a presentation of one or more games of chance on the gaming machine and ii) generate data for use in a loyalty program session; and 2) an input mechanism for reading data stored on a loyalty program instrument where the input mechanism includes a non-physical contact data interface capable of reading the loyalty program instrument data without physical contact between the loyalty program instrument and the non-physical contact data interface and where the gaming machine is operable to initiate the loyalty program session without contact between the loyalty program instrument and the non-physical contact data interface. The game of chance generated by the master gaming controller may be selected from the group consisting of video slot games, mechanical slot games, video blackjack games, video poker games, video keno games, video pachinko games, video card games, video games of chance and combinations thereof.

The input mechanism on the gaming machine may be selected from the group consisting of a bar-code reader, a bill validator, a wireless interface and a RFID Tag reader. The input mechanism may be located within a player tracking device and the player tracking device may be mounted to the gaming machine. The loyalty program instrument data, which is read by the non-physical contact data interface in the input mechanism, may be one of 1) an index to a record in a loyalty program database, 2) a record in the loyalty program database and 3) combinations thereof. The loyalty program instrument data may be one of i) loyalty program information, ii) biometric information, iii) player preferences, iv) promotional information, v) gaming machine configuration settings, vi) prize information, vii) cashless transaction information and viii) and combinations thereof.

The loyalty program instrument may be selected from the group consisting of an RFID tag, a portable wireless device, a cell phone, a portable computation device and a portable communication device. In addition, the loyalty program instrument may be a substrate including at least one of a 1-D bar-code printed on the substrate, a 2-D bar-code printed on the substrate, a symbol printed on the substrate, an alphanumeric character printed on the substrate, a Radio Frequency Identification (RFID) tag embedded in the substrate, an RFID tag printed on the substrate and combinations thereof. The substrate may include a top-side and a bottom-side where the loyalty program instrument data may be printed on the top-side and the bottom-side and where the non-physical contact data interface is operable to read the loyalty program instrument from at least one of the top-side, the bottom-side and combinations thereof. The loyalty program instrument data printed on the top-side and the bottom-side may be the same.

The loyalty program instrument may comprise a substrate with an adhesive backing where substrate with the adhesive backing may be attached to an item worn or carried by a game player that uses the gaming machine. The substrate with the adhesive backing may be one of a printable media and may include an embedded RFID tag. The gaming machine may include an output mechanism, such as a printer, for issuing one or more of the loyalty program instruments with the adhesive backing. The substrate may be attached to a curved surface. Thus, the non-physical contact data interface may be operable to read data from curved surfaces.

In particular embodiments, the non-physical contact data interface may be operable to read the loyalty program instrument data from the loyalty program instrument for: 1) the loyalty program instrument in a fixed position relative to the non-physical contact data interface during the reading of data from the loyalty program instrument data, 2) the loyalty program instrument in a time varying orientation relative to the non-physical contact data interface during the reading of data from the loyalty program instrument data, 3) for the loyalty program instrument in a time varying distance relative to the non-physical contact data interface during the reading of data from the loyalty program instrument data, 4) the loyalty program instrument in a plurality of distances relative to the non-physical contact data interface and 5) the loyalty program instrument in a plurality of orientations relative to the non-physical contact data interface.

On the gaming machine, one or more physical guides may be provided for aligning the loyalty program instrument relative to the non-physical contact data interface. Further, the gaming machine may include a housing mounted within an interior of the gaming machine. The housing may comprise: a front surface including an opening allowing the loyalty program instrument to be inserted into the gaming machine and to removed from the gaming machine where the front surface of the housing is part of an exterior of surface of the gaming machine.

The gaming machine may comprise a sound projection device for emitting a sound in response to a data read by the non-physical contact data interface or a lighting device for generating light in response to a data read by the non-physical contact data interface. The lighting device may change color in response to a data read by the non-physical contact data interface. For example, the lighting device may generate one of a first color, first light pattern and combinations thereof when a status of the loyalty program session is active and may generate one of a second color, a second light pattern and combinations thereof when the status of the loyalty program session is inactive. Further, the lighting device may generate one of a third color, a third light pattern and combinations thereof when the status of the loyalty program session is about to change.

In a further embodiment, the lighting device and the sound projection device may be incorporated into a loyalty program session status interface. The loyalty program session status interface may generate one of a sound, a light pattern, a light color and combinations thereof when data is read correctly by the non-physical contact data interface and may generate one of a sound, a light pattern, a light color and combinations thereof when data is read incorrectly by the non-physical contact data interface. The loyalty program session status interface may generate one of a sound, a light pattern, a light color and combinations thereof when a status of the loyalty program session is active, may generate one of a sound, a light pattern, a light color and combinations thereof when a status of the loyalty program session is inactive and may generate one of a sound, a light pattern, a light color and combinations thereof when a status of the loyalty program session is about to change.

In a particular embodiment, the input mechanism may be a bar-code reader and the non-physical contact data interface may be a scanner. The scanner may be one of a laser scanner and a charge coupled device scanner. The scanner may be capable of 1) reading data printed in a non-visible format and 2) reading loyalty program instrument data that is encoded in one of a 1-D bar-code, a 2-D bar-code, a symbol, alphanumeric characters and combinations thereof. The encoded loyalty program data may be encrypted and may be one of a) loyalty program information, b) biometric information, c) player preferences, d) promotional information, e) gaming machine configuration settings, f) prize information, g) cashless transaction information and h) and combinations thereof.

The bar-code reader may further comprise 1) a logic device designed or configured for i) parsing data, ii) performing format conversion, iii) performing optical character recognition, iv) performing encryption and v) combinations thereof and 2) a communication interface for transmitting information to the master gaming controller, a processor located in a player tracking unit and combinations thereof. In a particular embodiment, the scanner may be mounted below a translucent substrate on an exterior surface of the gaming machine where the scanner may be designed to read loyalty program instrument data stored on the loyalty program instrument when the loyalty program instrument is placed within a volume of space above the translucent substrate. In another embodiment, the scanner may be mounted below a card slot on the gaming machine where the scanner is designed to read loyalty program instrument data stored on the loyalty program instrument when the loyalty program instrument is placed in the card slot.

In yet another embodiment, the input mechanism is a Radio Frequency (RFID) reader and the non-physical contact data interface is an antenna capable of reading loyalty program instrument data stored on an RFID tag. The RFID tag may be an inductively coupled RFID tag or a capacitively coupled RFID tag. The RFID tag may comprise one of 1) a logic device, 2) a power source, 3) a non-volatile memory, 4) a read-only memory, 5) a random access memory, 6) an antenna and 7) combinations thereof.

The RFID tag may be capable of storing an index to a record in a loyalty program database, a record of data in a loyalty program database and combinations thereof. The stored data may be encrypted and may be one of 1) loyalty program information, 2) biometric information, 3) player preferences, 4) promotional information, 5) gaming machine configuration settings, 6) prize information, 7) cashless transaction information and 8) and combinations thereof. The RFID reader may be designed to program the RFID tag with data. The programmed data may be read by RFID tag readers.

The gaming machine may also comprise a printer capable of printing loyalty program instrument data to a loyalty program instrument. The printer may be selected from the group consisting of a thermal contact printer, an inkjet print and a laser printer. The printer may be capable of printing loyalty program instrument data in at least one of a 1-D bar-code format, a 2-D bar-code format and combinations thereof. Further, the printer may be capable of printing in a format that is invisible, such as using an invisible ink.

In a particular embodiment, the printer may be capable of generating an electronic circuit on a printable media used as a loyalty program instrument. The printable media may be flexible. The electronic circuit may be programmed to store loyalty instrument data. The electronic circuit may be part of an RFID tag.

When a magnetic striped card is used in a player tracking session, which is one type of loyalty program session, the session is initiated when physical contact between the magnetic stripe and magnetic reader is detected. In the present invention, the loyalty program session may be initiated without physical contact between the loyalty program instrument and the instrument reader in response to a number of conditions. For example, the loyalty program session may be initiated by a first gaming event and may be terminated by a second gaming event. The first gaming event may be one of i) an input of loyalty program instrument data from the loyalty point instrument via the non-physical contact data interface, ii) a deposit of an indicia of credit into the gaming machine, iii) an insertion of a card into a card slot on the gaming machine, iv) an activation an input button on the gaming machine, v) an input of a loyalty program instrument into the input mechanism on the gaming machine, vi) an input of a code into the gaming machine, vii) an input of biometric information into the gaming machine and viii) combinations thereof. The second gaming event may be one of a) an occurrence of zero credits on the gaming machine, b) an amount of idle time on the gaming machine exceeding a specified limit, c) a tilt condition, d) an error condition, e) a request for a loyalty program instrument, f) a request to terminate the loyalty program session, g) an inability to detect the loyalty program instrument, h) a cashout request, i) a timeout condition, j) an inability to detect a user of the gaming machine and k) combinations thereof.

Another aspect of the present invention provides a gaming system for communicating and locating wireless gaming devices. The gaming system may be generally characterized as comprising: 1) a plurality of wireless gaming device capable of generating wireless signals, 2) a plurality of wireless signal receivers capable of receiving signals generated by the wireless gaming devices where a portion of the wireless signal receivers are located in gaming machines; and 3) a location server for determining a location one or more of the wireless gaming devices and for tracking a status of the plurality of wireless gaming devices. The gaming system may be located in a casino where the gaming machines are used to generate games of chance. Activities on the gaming machines may be used to accumulate loyalty points in a loyalty program session where the wireless gaming devices are used provide loyalty program data used in the loyalty program session.

In the gaming system, the location of the wireless gaming device may be determined using signal triangulation. The signal triangulation may be based upon one of a single strength, a time for a signal to travel and return from a wireless access point to a wireless gaming device and combinations thereof. The location determined for the wireless gaming device may be accurate to within about 1 foot or less.

The location server may be used to assign a communication frequency for communication between a wireless signal receiver and one of the wireless gaming devices where the wireless gaming device may be selected from the group consisting of a cell phone, an RFID tag and a portable communication device. The wireless signal receivers may be capable of receiving signals simultaneously from two or more wireless gaming devices. In this case, the location server may be capable of determining which of the wireless gaming devices is closest to a selected location. The selected location may be directly in front of a first gaming machine where the wireless gaming device closest to the selected location may be contacted via one of the wireless access points to initiate a loyalty program session.

Another aspect of the invention pertains to computer program products including a machine-readable medium on which is stored program instructions for implementing any of the methods described above. Any of the methods of this invention may be represented as program instructions and/or data structures, databases, etc. that can be provided on such computer readable media.

These and other features and advantages of the invention will be spelled out in more detail below with reference to the associated drawings.

BRIEF DESCRIPTION OF THE DRAWINGS

FIGS. 11A-11B are block diagrams of input mechanisms with a non-physical contact data interface of the present invention.

DESCRIPTION OF THE PREFERRED EMBODIMENTS

Concepts important to many embodiments of this invention include "loyalty points," "loyalty point sessions," and "loyalty points initiation events." Loyalty points refers to any type of points accrued for participating in designated activities at a gaming establishment. Such establishments include casinos, hotels where gaming activities are provided, stores where gaming activities are permitted, Internet-based gaming activities, and the like. Designated activities include, but are not limited to, gaming activity such as playing gaming machines, card games such as black jack, pai gow poker, baccarat and poker, betting on public event outcomes, table games such as roulette, craps, keno and lotteries, etc. Other patronage activities at gaming establishments may accrue loyalty points. As indicated above, loyalty points represent a form of credit accrued for patronage. The points can be redeemed for a variety of goods or services (or translated to other forms of credit) within a gaming establishment or affiliated establishment. Player tracking points are a typical example of "loyalty points."

Loyalty point sessions are sessions during which a person is performing the designated activity and during which loyalty points accrue. Such session may be delineated by a first event and a second event (such as the "game events" described above). Importantly, loyalty point sessions can be triggered or initiated by events that need not involve conventional player tracking initiation events (e.g., insertions of player tracking cards). Thus, the person can begin accruing loyalty points even if he/she forgets to insert his/her player tracking card or otherwise fails to initiate a conventional player tracking session. Further, it is possible that the entire process is performed anonymously so that the gaming establishment never knows who is accruing the loyalty points—or at least not via a conventional player tracking methodology.

Because loyalty points sessions may begin without a conventional player tracking initiation event, a more general concept must be applied to initiation of loyalty points sessions. Preferably such initiation can be automatically detected by a gaming machine or other mechanism at a gaming establishment. (Note however that some activities such as black jack may require that a dealer or other person manually initiate the session.) Examples of events that trigger accrual of loyalty points include a player beginning to play a particular gaming machine, a player providing cash or indicia of credit to a gaming machine, a user actuating a mechanism allowing anonymous gaming activity, etc. Examples of events that can indicate the end of a loyalty points session include winning a jackpot or other conventional gaming award, a user actuating a mechanism indicating an end to the gaming activity, detecting that a particular period of inactivity has elapsed, etc.

Figure 1:
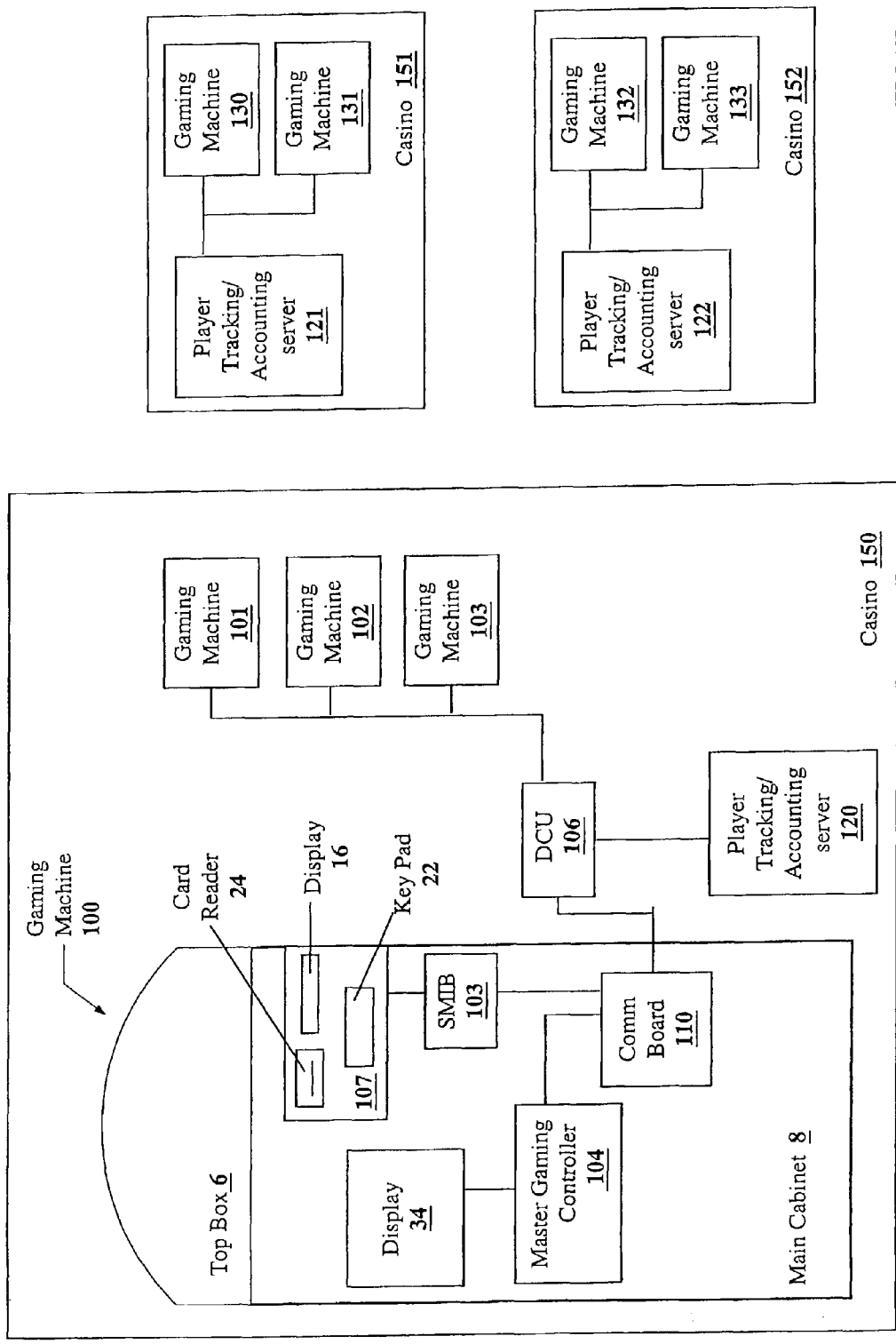
FIG. 1 is a block diagram of a number of gaming machines with player tracking units connected to servers providing player tracking services.
Figure 2:
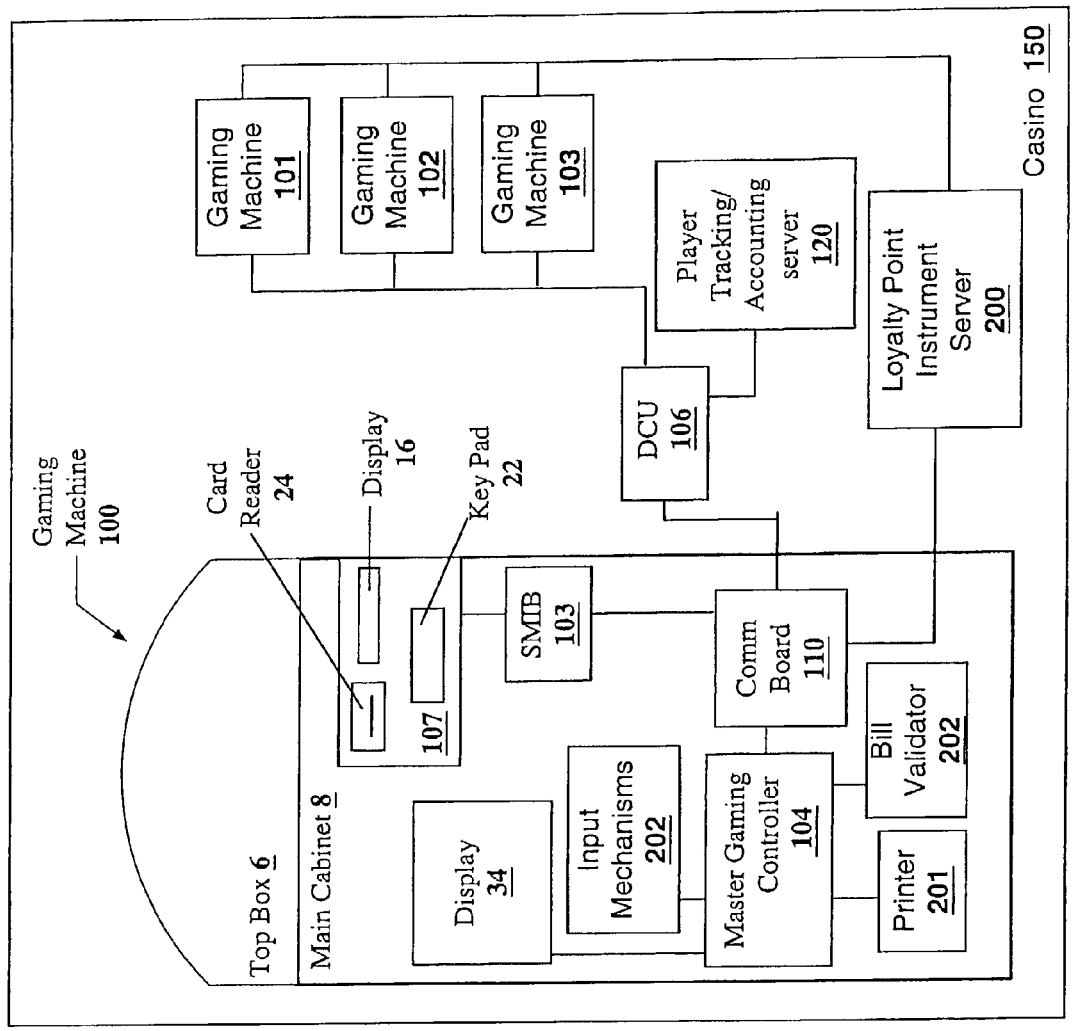
FIG. 2 is a block diagram of a gaming machine connected to a player tracking server and a loyalty program server allowing loyalty program instrument transactions.

FIG. 2 is a block diagram of gaming machines 100, 101, 102 and 103 connected to a player tracking server 120 and a loyalty program instrument server 200 allowing loyalty program instrument transactions. With the present invention, without providing a player tracking card, player tracking information or any other type of identification information, a player may initiate a game play session on gaming machine 100, play a number of games and receive loyalty points, such as player tracking points. The player may or may not have a player tracking account with the gaming establishment such as casino 150. Note that the "game play session" described here serves as an example of a loyalty points session.

For instance, the player may insert a bill or a bar-coded printed ticket (e.g. an EZPAY™ ticket) into bill validator 202 to register credits on the gaming machine. When credits are registered on the gaming machine 100, a logic device located on the gaming machine 100, such as master gaming controller 104 or a logic device located the player tracking unit 107, may begin to generate loyalty points, such as player tracking points. As another embodiment, when credits are registered on the gaming machine 100, a remote logic device such as a logic device on the player tracking accounting server 120 or a logic device on the loyalty program instrument server 200 may begin to accrue loyalty points. Next, the player, using input mechanisms 202, may make wagers on a number of games presented on the gaming machine and view the game outcomes on display 34. Based upon a manner in which the player participates in game play on the gaming machine 100, such as the amount wagered over a specific period of time, loyalty points may be awarded to the player. A rate at which the player accrues loyalty points may be adjusted according to the following parameters (without limitation thereto): 1) the time of the day, 2) the day of the week, 3) month of the year, 4) a total amount wagered, 5) an amount of time spent playing, 6) a game denomination, 7) a promotional event and 8) a game type.

The amount of loyalty points awarded to the game player is calculated by a logic device located on the gaming machine, by a remote gaming device or combinations thereof. When the logic device used to calculate the awarded loyalty points is located remotely, the master gaming controller 104 may transfer certain gaming machine information, such as wager amounts, to the remote logic device. For instance, when the player tracking account server 120 or the loyalty program server 200 calculates the amount of loyalty points awarded during a particular game play session, the master gaming controller 104 may send game play information to these remote gaming devices. In some embodiments, game play information used to calculate loyalty point awards may be sent from the gaming machine to the player tracking server 120 through the player tracking unit 107 or the information may be sent directly to the loyalty program instrument server 200. In other embodiments, the master gaming controller 104 may calculate the loyalty points awarded during a game play session. Thus, the transfer of game play information to a remote gaming device may not be required.

At the end of the player's game play session, the amount of loyalty points awarded to the player may be stored on a loyalty point instrument such as a printed ticket, a smart card, a debit card, a room key or a portable wireless device. For example, the printer 201 may print a ticket voucher showing the amount of loyalty points awarded to the player during the game play session. The player may later validate the ticket to receive the loyalty points. As another example, loyalty points awarded to the player may be stored on a smart card inserted into the card reader 24. In some embodiments, the loyalty point instrument may simply be used as a receipt to ensure that loyalty point credits earned by the player have been correctly credited to their account.

When the loyalty point instrument is issued to the player, various types of transaction information may be recorded on the loyalty point instrument and may also be stored to another memory location on the gaming machine 100, on the loyalty program instrument server 120, on the player tracking server 120 or some other gaming device. Examples of stored transaction information includes an issue time, a date, an instrument number, an instrument type, a machine number, etc., The transaction information stored on the loyalty point instrument and stored at the additional memory location may be compared to validate the loyalty point instrument. For instance, a player may wish to have the loyalty points stored on the ticket voucher to be later credited to their player tracking account or to redeem the points directly for a goods and services item without crediting the player's player tracking account. In some cases, the player may not even have a player tracking account. To credit or to redeem the loyalty points stored on the loyalty point instrument, the transaction is first validated. Specific examples of the loyalty point instrument validation process and other uses of loyalty point instruments are described with respect to FIGS. 3-8.

An advantage of loyalty point instruments of the present invention is that a player may earn loyalty points such as player tracking points from game play on a gaming machine or during other gaming activities without the use of a player tracking card or without providing any identification information. As indicated above, if a player forgets to bring their player tracking card, loses their player tracking card, brings the wrong card, forgets to insert the card into the gaming machine, inserts the card incorrectly into the card reader or the card reader is malfunctioning, the player may be still earn loyalty points such as player tracking points from a game play on a gaming machine. In current player tracking programs, before a player can receive player tracking points, the player must always provide identification information of some type, which is usually stored on their player tracking card. Thus, in any situation where player tracking identification information is not provided by the player, such as in the cases described above where the information is obtained from a player tracking card, the player does not earn player tracking points. These situations are avoided with the present invention.

Figure 3:
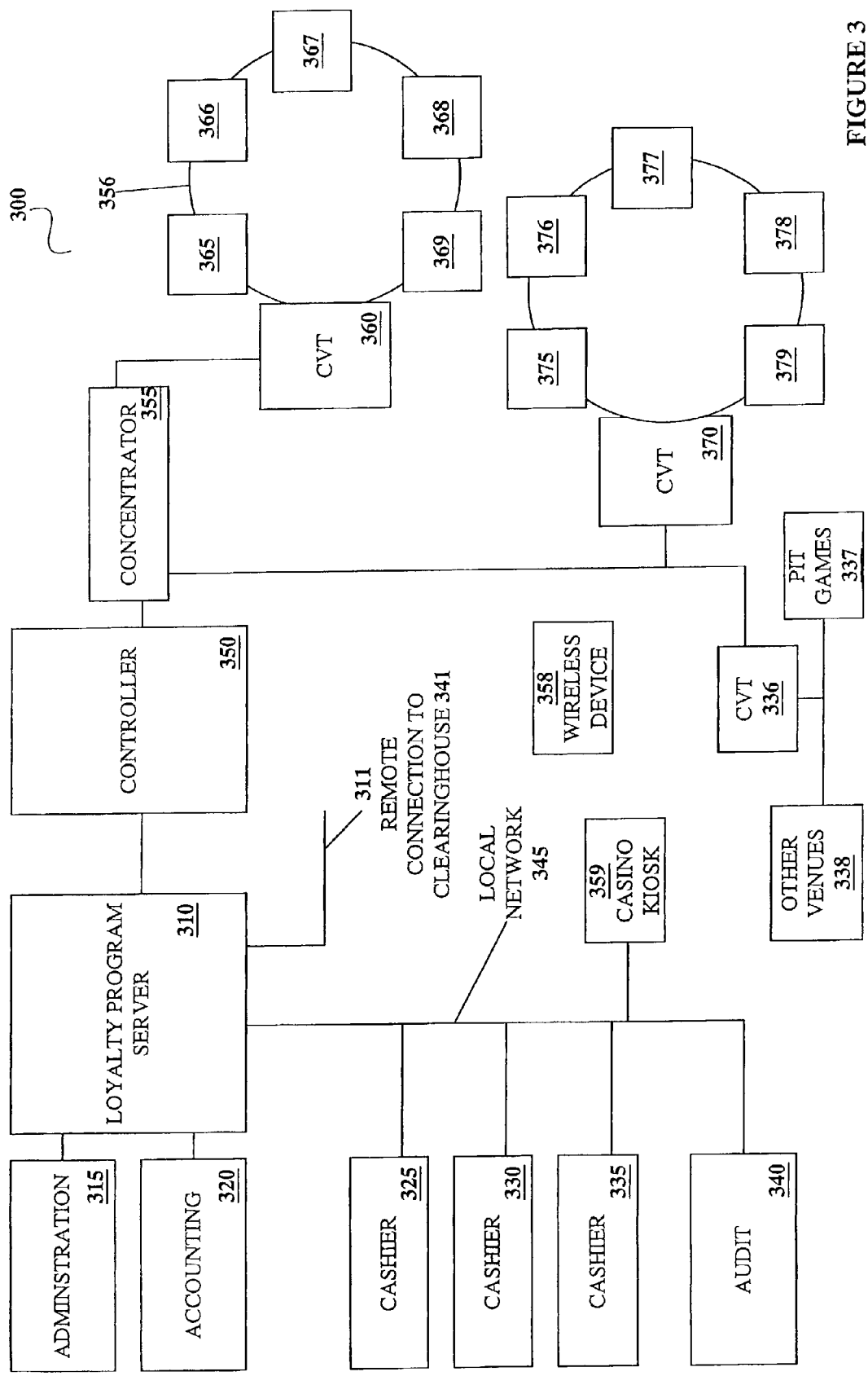
FIG. 3 is a block diagram of the components of a loyalty program instrument system for one embodiment of the present invention.

FIG. 3 is a block diagram of the components of a loyalty program instrument system for one embodiment of the present invention. A loyalty program instrument system is the hardware components and software components needed to generate and validate loyalty program instruments. Components of an loyalty program system may include 1) data acquisition hardware, 2) data storage hardware, 3) loyalty program instrument generation and validation hardware (e.g. printers, card readers, ticket acceptors, validation terminals, etc.), 3) auditing software, 4) loyalty program instrument validation software and 5) database software. Many types of loyalty program instrument systems are possible and are not limited to the components listed above. A loyalty program instrument system may be installed at each property utilizing loyalty program instruments. To allow multi-site validations of loyalty program instruments, the loyalty program instruments systems at each property may be linked to a loyalty program transaction clearinghouse. The relation of multiple loyalty program instrument systems connected to a loyalty program transaction clearinghouse are described with reference to FIGS. 4 and 5. The details of the generation and the validation of loyalty program instruments using a loyalty program instrument system at one property are described below with reference to FIG. 3.

In some embodiments of the present invention, the loyalty program instrument system may be implemented in conjunction with a cashless system that generates cashless instruments. Thus, a single instrument generation site may issue both cashless instruments and loyalty program instruments. For example, a gaming machine may issue printed tickets with a cash value that may be redeemed for cash or gaming credits as part of a cashless system or a gaming machine may issue printed tickets with a loyalty point value or a prize value that may be redeemed for goods and services as part of a loyalty program instrument system. Further, a single generation site may issue a plurality of different instrument types for cashless transaction and loyalty program transaction such as but not limited to smart cards, printed tickets, magnetic striped cards, room keys and portable wireless devices. In addition, a single validation site may accept and validate both cashless instruments and loyalty program instruments such as but not limited to smart cards, printed tickets, magnetic striped cards, room keys and portable wireless devices. An example of a cashless system that may be modified to implement both cashless instruments and loyalty point instruments with the present invention is the EZPAY™ system manufactured by IGT of Reno, Nev.

Details of apparatus and methods used to validate a cashless instruments and that may be applied to the validation of a loyalty point instruments are described in co-pending U.S. application Ser. No. 09/544,884 by Rowe et al. filed Apr. 7, 2000 entitled "Wireless Gaming Environment" which is incorporated herein in its entirety and for all purposes. Details of apparatus and methods used to validate a cashless instrument across multiple gaming properties and may be applied to the validation of a loyalty point instrument across multiple gaming properties are described in co-pending U.S. application Ser. No. 09/684,382 by Rowe filed Aug. 25, 2000 entitled "Cashless Transaction Clearinghouse" which is incorporated herein in its entirety and for all purposes. Details of apparatus and methods of using a smart card as a cashless instrument, at a single gaming property or across multiple gaming properties, that may be applied to the use of a smart card as a loyalty point instrument, at a single gaming property or across multiple gaming properties, are described in co-pending U.S. application Ser. No. 09/718,974 by Rowe filed Nov. 22, 2000 entitled "EZPAY™ Smart Card and Ticket System" which is incorporated herein in its entirety and for all purposes. Details of providing secure transactions for a cashless system which may applied to a loyalty program instrument system are described in co-pending U.S. application Ser. No. 09/660,984 by Espin et al. filed Sep. 13, 2000 entitled "Transaction Signature" which is incorporated herein in its entirety and for all purposes.

Returning to FIG. 3, a first group of gaming machines 365, 366, 367, 368, and 369 is shown connected to a first clerk validation terminal (CVT) 360 and a second group of gaming machines, 375, 376, 377, 378 and 379 is shown connected to a second CVT 370. The clerk validation terminals are used to store loyalty program transaction information generated when a loyalty program instrument is issued at a generation site such as a gaming machine. The loyalty program transaction information, which may be stored each time a loyalty program instrument is issued, may include but is not limited to prize information, loyalty point information, an establishment, a location, a bar code, a instrument type (e.g. ticket, smart card, room key, magnetic card, portable wireless device, etc.), an issue date, a validation number, an issue time, an instrument number, an instrument sequence number and a machine number. Also, the loyalty program transaction information may include transaction status information such as whether the loyalty program instrument has been validated, is outstanding or has expired. Some of the loyalty program transaction information stored in the CVT may also be stored on the loyalty program instrument as loyalty program instrument information. When a loyalty program instrument is validated. the information stored in the CVT and the information stored on the loyalty program instrument may be compared as a means of providing secure loyalty program transactions.

As described with reference to FIG. 2, all of the gaming machines are designed or configured to accrue loyalty points during a game play session, award a player some or all of the accrued loyalty points and store loyalty program information to a loyalty program instrument, such as a printed ticket, a magnetic striped card, a room key, a portable wireless device or a smart card, which is issued to the game player. The loyalty program instruments, as part of a loyalty program available at property 300, may be redeemed for goods and services. In addition, the gaming machines and other loyalty program validation sites at property 300 may accept loyalty program instruments issued at a different property from property 300 where the different property utilizes the same or a different loyalty program instrument system as compared to property 300. Details of a multi-site loyalty program instrument system are described with respect of FIGS. 6 and 7.

A player may participate in a number of activities at the gaming establishment of property 300 for which the player can earn loyalty points. For instance, loyalty points may be earned while playing a game of chance at pit games 337, while playing one of the gaming machines, or while making a food purchase, an entertainment purchase, a transportation purchase, a lodging purchase, a merchandise purchase or a service purchase at one of the other venues 338 at property 300. Further, food purchases, entertainment purchases, transportation purchases, lodging purchases, merchandise purchases and service purchases that earn loyalty points for a patron may be made at venues outside of traditional gaming establishments but in affiliation with a gaming establishment. For instance, a patron may make a food purchase at a restaurant affiliated with a gaming establishment or may make merchandise purchase with a retailer affiliated with the gaming establishment. After their purchase, the patron may be issued a loyalty point instrument with a number of loyalty points that may be redeemed for goods, services and comps or may be later added to a loyalty point account of the patron. Affiliated venues that issue loyalty point instruments may be linked to a loyalty program server, such as 310, via the Internet (see FIG. 7).

As another example, a player, without providing identification information such as player tracking information or comp information, may be identified at a pit game. After rating the players manner of game play over a certain period of time (e.g. amount bet), the player may be awarded a loyalty point instrument storing loyalty points, such as a printed ticket, earned during their pit game play. The loyalty point instrument may be later exchanged by the player for a comp, such as free meal at casino buffet. In another embodiment, when player comp information has been provided by the player, the loyalty point instrument may be used as a receipt that is designed to allow the player to verify that their game play has been both correctly rated and correctly entered into the comp system.

After each activity, a player may be issued 1) a new loyalty program instrument storing the loyalty points earned for the activity or 2) an existing loyalty program instrument may be updated to store additional loyalty points. For instance, the existing loyalty program instrument may be, a smart card, already storing loyalty points earned from previous activities. The smart card may be modified to store additional loyalty points after each new activity. Accumulated loyalty points earned by a player and stored on a loyalty program instrument may be used to obtain goods, services and comps at various loyalty program validation sites at property 300, such as but not limited to: i) gaming machines, ii) cashier stations 325, 330, 335, iii) a casino kiosk 359, iv) from a casino service person with a hand-held wireless device 358 and v) at a clerk validation terminal 360 or 370.

In general user interfaces for viewing and modifying loyalty point accounts may be displayed on many different types of computing devices such as gaming machines, personal digital assistants, home computer linked to remote site via the Internet, a kiosk located in a casino, a phone and a video display interface. In one embodiment, a video display interface may be a television monitor located in a hotel room. The hotel rooms may be linked by a local intranet to the loyalty program server 310. A touch screen, control pad or some other input device may be used with the television monitor to provide input to the loyalty point account user interface.

A game player may wish to use a loyalty program instrument issued during one activity during another activity at property 300. For example, a game player may participate in a pit game 337 such as craps, roulette, black jack, etc. and may be issued a loyalty point instrument, such as a printed ticket, with a number of loyalty points based upon the manner in which they participated in the activity such as an amount wagered over a particular amount of time. Next, the player may desire to use the loyalty point instrument during another activity such as a game play session on one of the gaming machines 365, 366, 367, 368, 369, 375, 376, 377, 378 and 379. After the loyalty point instrument has been validated, as described below, the loyalty points stored on the loyalty point instrument may be used by the player to redeem prizes, goods, or services available on the gaming machine. In one embodiment, for promotional purposes, only particular prizes, goods or services may be available on particular gaming machines to encourage game play of those machines. In another embodiment, a player may redeem loyalty points stored on a loyalty point instrument to access a special bonus features or game play features on a gaming machine. For example, after the play has been issued a printed ticket with loyalty points during one activity, the player may initiate a game play session on a gaming machine by entering the printed ticket into a bill validator on the gaming machine. After ticket has been validated, as described below, some or all of the loyalty points stored on the printed ticket may be used to access a special bonus game or a special game play feature available on the gaming machine such as a chance to win a special jackpot. For instance, a player may commit five hundred loyalty points earned from a lodging purchase, stored on a loyalty program instrument, to activate a bonus feature on a gaming machine.

In yet another embodiment, for convenience, a player may desire to combine loyalty points earned from a plurality of activities, such as gaming machine play, pit game play, merchandise purchases, etc., and stored on multiple loyalty program instruments onto a single loyalty program instrument. For example, a player may be issued a printed ticket or another type of loyalty program instrument from a gaming machine after a first game play session. At beginning of a second game play session, on the same or a different gaming machine, the player may insert the printed ticket into the gaming machine. After validating the ticket, the gaming machine may add any loyalty points stored on the ticket to any loyalty points earned by the player during the second game play session and issue a new loyalty point instrument, such as a printed ticket, with combined loyalty points.

Since loyalty points may be redeemed for goods and services, the loyalty points may be considered as having a "cash value" of some type. Thus, since the loyalty points have a "cash value", it is important to prevent fraud, such as validating a single ticket multiple times or validating a duplicate copy of an already validated ticket, and to provide accounting means for tracking unvalidated and validated tickets. To prevent fraud and to provide accounting for loyalty program instruments, generation sites and validation sites for loyalty point instruments, such as but not limited gaming machines, casino kiosks, cashier stations, clerk validation terminals, pit games and wireless gaming devices, may 1) when a loyalty program instrument is generated at generation site, store loyalty program transaction information to both the loyalty program instrument and to a memory location separate from the loyalty program instrument and 2) when a loyalty program instrument is validated, loyalty program transaction information stored on the loyalty program instrument may be compared with loyalty program transaction information previously stored at the memory location.

In one embodiment of the present invention, a clerk validation terminal (CVT), such as 336, 360 and 370, may be connected to a number of gaming devices that generate loyalty program instruments and the CVT may store loyalty program transaction information each time a loyalty program instrument is generated by one of the gaming devices connected to the CVTs issues a loyalty point instrument. For instant, CVT 360 is connected to gaming machines, 365, 366, 367, 368 and 369 in ring 356. The gaming machines 365, 366, 367, 368 and 369 may issue printed tickets as a loyalty program instrument. Each time one of the gaming machines issues a printed ticket, loyalty program transaction information describing the loyalty program transaction may be stored to the CVT and printed on the ticket.

When the CVTs are not connected to one another or the gaming machines are not linked together in some manner, a loyalty program instrument from one gaming machine may be only be accepted in another gaming machine which is in a group of gaming machines connected to the same clerk validation terminal. For example, a loyalty program instrument issued from gaming machine 365 might be accepted at gaming machines 366, 367, 368 and 369, which are each connected to the CVT 360, but not in gaming machines 375, 376, 377, 378, and 379, which are each connected to the CVT 370. In an analogous manner, when the cashless systems from one property are not connected together then a loyalty program instrument generated from gaming machine 366 may not be used at property different from property 300.

The CVTs, 336, 360 and 370, store loyalty instrument transaction information corresponding to the outstanding loyalty program instruments, including ticket vouchers, smart cards and debit cards, that are waiting for redemption. The CVTs may also store cashless instrument transaction information. In this embodiment, the CVTs are separate from the gaming machine. However, the loyalty program transaction information may be also stored within each gaming machine or one gaming machine may functionally act as a CVT for a group of gaming machines eliminating the need for separate CVT hardware. In addition, loyalty program transaction information may be stored in a loyalty program server 310. As previously described, the loyalty program server may be an EZ PAY™ server that also supports cashless instrument transactions.

As described above, the loyalty program transaction information may be used when the loyalty program instruments are validated in some manner such as for a prize redemption or to credit the points to a loyalty point account. The CVTs 336, 360 and 370 may store the information for the ticket vouchers printed by the gaming machines connected to the CVT. For example, CVT 360 stores ticket voucher information for ticket vouchers printed by gaming machines 365, 366, 367, 368, and 369. When a ticket is printed out or a loyalty point instrument is issued in some other manner, loyalty program transaction information is sent to the CVT using a communication protocol of some type from the gaming machine. For example, the gaming machine may send transaction information to the CVT which is part of the cashless system using the slot data system manufactured by Bally's Gaming Systems (Alliance Gaming Corporation, Las Vegas, Nev.) or the slot acquisition system manufacture by IGT, Reno, Nev.

In present invention, when a player wishes to redeem a ticket or a loyalty program instrument of some other type, the player may redeem vouchers printed from a particular gaming machine at the CVT associated with the gaming machine or any other CVT which is part of the loyalty program instrument system associated with the CVT. For example, since CVT 360 and CVT 370 are connected as part of a single cashless system to the EZ pay server 310, a player may redeem loyalty program instruments or utilize loyalty program instruments at the gaming machines, the CVT's (336, 360 or 370), the cashiers (325, 330 and 335), the casino kiosk 359, the other venues 338 or the wireless cashiers 358. To redeem a loyalty program instrument, the loyalty program instrument is validated by comparing information obtained from the instrument with information stored within the CVT or other gaming devices which behaves functionally as a CVT. After the loyalty program instrument has been redeemed, the CVT marks the instrument paid in a database to prevent an instrument with similar information from being cashed multiple times.

Again, not all loyalty program systems may utilize CVTs, many of the functions of the CVT may be transferred to the cashless server, including the loyalty program server 310, eliminating the transferred function within the CVT. For instance, the cashless instrument transaction information may be stored in the loyalty program server 310 instead of the CVTs. Thus, the need to store loyalty program transaction information within the CVT may be eliminated.

In this embodiment, multiple groups of gaming machines connected to CVTs, such as 355 and 370, and other gaming devices in the other venues 338 and the pit games 337 connected to CVT 336 are linked together in a cross validation network 345. The cross validation network is typically comprised of one or more concentrators 355 which accepts inputs from two or more CVTs and enables communications to and from the two or more CVTs using one communication line. The concentrator 355 is connected to a front end controller 350 which may poll the CVTs for loyalty program transaction information. The front end controller 350 is connected to an Loyalty Program server 310 which may provide a variety of information services for the loyalty program instrument system including accounting 320, administration 315 and loyalty program account maintenance.

In this invention, the loyalty program server is a hardware and a software platform allowing loyalty program instruments to be utilized at all of the loyalty program validation sites (e.g. cashier stations, gaming machines, wireless cashiers and CVTs) within the single property 300. The loyalty program server 310 may also be used to provide multi-site validation of loyalty program instruments via a connection 311 such as a network interface to a remote loyalty program transaction clearinghouse. The loyalty program server is a communication nexus in the cross validation network. For instance, the loyalty program server 310 is connected to the cashiers, wireless devices, remote cashless instrument transaction clearinghouse, CVTs and the gaming machines and other gaming devices via the CVTs.

The cross validation network allows loyalty program instruments generated by any gaming machine connected to the cross validation network to be accepted by other gaming machines in the cross validation network 345. Additionally, the cross validation network allows a cashier at a cashier station 325, 330, and 335 to validate any ticket voucher generated from a gaming machine within the cross validation network 345. As an example, to redeem a loyalty program instrument for goods and services, a player may present the instrument at one of the cashier stations 325, 330, and 335, the casino kiosk 359 or to a game service representative carrying a wireless gaming device 358 for validating loyalty program instruments. Loyalty program transaction information obtained from the instrument is used to validate the instrument by comparing information on the instrument with information stored on one of the CVTs connected to the cross validation network. In addition, when the loyalty program instrument was issued at another property, the information on the instrument may be stored at the other property. Thus, to validate the loyalty program instrument, the loyalty program server 310 may have to communicate with the loyalty program transaction clearinghouse 341 via the remote connection 311 to obtain the information necessary to validate the instrument.

As loyalty program instruments are validated, this information may be sent to audit services computer 340 providing audit services, the accounting computer 320 providing accounting services or the administration computer 315 providing administration services. In another embodiment, all of these services may be provided by loyalty program server 310 which may also be an EZPAY™ server. Examples of auditing services, which may be provided by loyalty program system software residing on the auditing computer 340 include 1) session reconciliation reports, 2) soft count reports, 3) soft count verification reports, 4) soft count exception reports, 5) machine instrument status reports and 5) security access report. Examples of accounting services, which may be provided by cashless system software residing on the accounting computer 320 include a) instrument issuance reports, b) instrument liability reports, expired instrument reports, c) expired instrument validation reports and d) instrument redemption reports. Examples of administration services, which may be provided by loyalty program system software residing on the administration computer 315 include i) manual loyalty program instrument receipt, ii) manual loyalty program instrument report, iii) loyalty program instrument validation report, iv) interim validation report, v) validation window closer report, vi) voided loyalty program instrument receipt and vii) voided loyalty program instrument report.

In another embodiment of the present invention, two or more gaming machines, such as 365, 366, 367, 368 and 369, may be linked together to allow loyalty points earned during the simultaneous game play of the two or more linked gaming machines to be combined on a single loyalty point instrument. Thus, a single game player playing two or more linked gaming machines simultaneously or a couple playing two or more linked gaming machines simultaneously may be able to receive a single loyalty point instrument issued from one of the linked gaming machines for their game play on all of the linked gaming machines. In another embodiment, based upon the combined amount of game play for two or more gaming machines linked together, the rate of loyalty points accrued may be increased. Thus, a couple playing together on two or more linked gaming machines simultaneously or a single person playing two or more linked gaming machines simultaneously may be able to earn more loyalty points than when playing on two or more non-linked gaming machines simultaneously.

Figure 4:
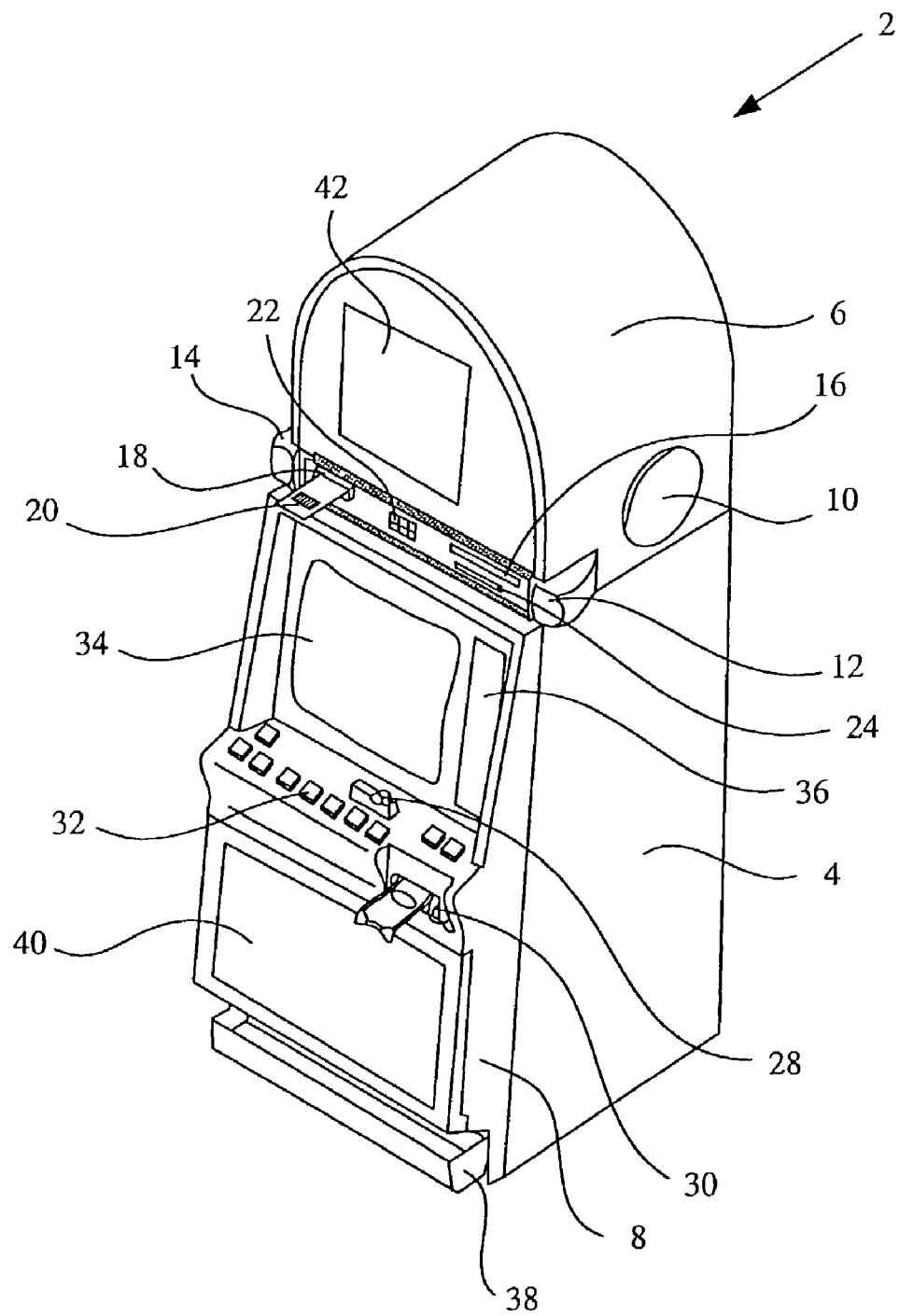
FIG. 4 is a perspective drawing of a video gaming machine of the present invention.

Turning to FIG. 4, more details of using loyalty program instruments in the context of game play on a gaming machine are described. In FIG. 4, a video gaming machine 2 of the present invention is shown. Machine 2 includes a main cabinet 4, which generally surrounds the machine interior (not shown) and is viewable by users. The main cabinet includes a main door 8 on the front of the machine, which opens to provide access to the interior of the machine. Attached to the main door are player-input switches or buttons 32, a coin acceptor 28, and a bill validator 30, a coin tray 38, and a belly glass 40. Viewable through the main door is a video display monitor 34 and an information panel 36. The display monitor 34 will typically be a cathode ray tube, high resolution flat-panel LCD, or other conventional electronically controlled video monitor. The information panel 36 may be a back-lit, silk screened glass panel with lettering to indicate general game information including, for example, the number of coins played. The bill validator 30, player-input switches 32, video display monitor 34, and information panel are devices used to play a game on the game machine 2. The devices are controlled by circuitry (see FIG. 2) housed inside the main cabinet 4 of the machine 2. Many possible games, including traditional slot games, video slot games, video poker, video black jack, video keno, video pachinko, lottery games and other games of chance as well as bonus games may be provided with gaming machines of this invention.

The gaming machine 2 includes a top box 6, which sits on top of the main cabinet 4. The top box 6 houses a number of devices, which may be used to add features to a game being played on the gaming machine 2, including speakers 10, 12, 14, a ticket printer 18 which may print bar-coded tickets 20 used as loyalty point instruments or cashless instruments, a key pad 22 for entering player tracking information, a florescent display 16 for displaying player tracking information, a card reader 24 for entering a magnetic striped card containing player tracking information. Further, the top box 6 may house different or additional devices than shown in FIG. 4. For example, the top box may contain a bonus wheel or a back-lit silk screened panel which may be used to add bonus features to the game being played on the gaming machine. During a game, these devices are controlled and powered, in part, by circuitry, such as a master gaming controller, (See FIG. 2) housed within the main cabinet 4 of the machine 2.

Understand that gaming machine 2 is but one example from a wide range of gaming machine designs on which the present invention may be implemented. For example, not all suitable gaming machines have top boxes or player tracking features. Further, some gaming machines have two or more game displays—mechanical and/or video. And, some gaming machines are designed for bar tables and have displays that face upwards. Still further, some machines may be designed entirely for cashless systems. Such machines may not include such features as bill validators, coin acceptors and coin trays. Instead, they may have only ticket readers, card readers and ticket dispensers. Those of skill in the art will understand that the present invention, as described below, can be deployed on most any gaming machine now available or hereafter developed.

Returning to the example of FIG. 4, when a user wishes to play the gaming machine 2, he or she inserts cash through the coin acceptor 28 or bill validator 30. In addition, the player may use a cashless instrument of some type to register credits on the gaming machine 2. For example, the bill validator 30 may accept a printed ticket voucher, including 20, as an indicia of credit. As another example, the card reader 24 may accept a debit card or a smart card containing cash or credit information that may be used to register credits on the gaming machine. In addition, the player may use a loyalty program instrument, such as smart card, ticket voucher, or debit card, to register previously accumulated loyalty points on the gaming machine. Typically, the information contained on the cashless instrument or loyalty point instrument, including the ticket voucher, smart card or debit card, is validated by a cashless system or loyalty program system. As described above, the cashless system and loyalty program may be a single or separate systems in the present invention. The loyalty program instrument, including but not limited to a ticket voucher, smart card or debit card, may have been generated at the same property, for example a first casino where the gaming machine 2 is located or the instrument may have been generated at another property for example a second casino.

As described above, on a gaming machine, loyalty points may redeemed for a number of purposes such as to access a special bonus feature available on the gaming machine or to obtain goods and services. The loyalty program instrument typically contains information used to register loyalty points on the gaming machine, including gaming machine 2, and validate the registration transaction. For example, when a ticket voucher is used as a loyalty program instrument, the printed ticket voucher may contain information including but not limited to: 1) a ticket value, 2) a ticket issue date, 3) a ticket issue time, 4) a ticket transaction number, 5) a machine ID, 6) a ticket issue location and 7) a ticket sequence number. Information such as the ticket value, the ticket issue date, the ticket issue time, the ticket number and the machine ID may be common to loyalty program systems that generate and validate tickets issued at a single property. However, information such as the ticket issue location and other information may be needed to allow multi-site generation and validation of loyalty program instruments. In addition, other types of information, besides the information listed above, may be stored on the loyalty program instrument. For example, the ticket may contain information regarding a promotional prize that may be redeemed for loyalty points by the player when the ticket voucher is utilized in the gaming machine 2. As another example, the ticket may contain information such as a number of additional loyalty points that are needed to obtain a particular goods or services item.

The information on the loyalty program instrument may be recorded on the loyalty program instrument when the loyalty instrument is generated. For example, in the case of the ticket voucher, the generation of the ticket voucher may refer to the actual printing of the ticket voucher on paper or some other medium. A unique bar-code may be printed on the ticket voucher which may be read with a bar-code scanner to obtain information from the ticket. The ticket voucher, including 20, may be printed from a printer, including printer 18. In the case of the smart card or debit card, the generation of the smart card or debit card refers to storing or encoding this information on the smart card or debit card. The generation of the debit card or smart card may occur when the smart card or debit card is inserted into the card reader 24 in the gaming machine 2 or at another site where smart cards or debit cards are issued. For example, smart cards or debit cards may be generated at ATM like terminals, at a cashier station when a player cashes out or prepaid smart cards or debits may be purchased within the gaming property (e.g. casino). As another example, the gaming machine may transfer loyalty point information to portable wireless device worn by the player via a wireless interface (not shown) on the gaming machine 2. After game play session where an amount of loyalty points have been awarded to the player, the amount of loyalty points awarded to the player and any other loyalty points input into the gaming machine may be downloaded to the portable wireless device worn by the player via the wireless interface.

A game play session where loyalty points are accrued by the master gaming controller on gaming machine 2 or by another logic device located on the gaming machine 2 may occur after a particular game event initiated by a game player. For example, a loyalty point session, where loyalty points are accrued, may be triggered by one or more of the following game events: a) depositing an indicia of credit into the gaming machine [e.g., inserting a cashless instrument into the card reader 24], b) inserting a bill or a cashless instrument into the bill validator 30, or inserting a coin in the coin acceptor 28, c) activating an input button on the gaming machine [e.g., input buttons 32], d) inputting a loyalty program instrument into a gaming device on the gaming machine [e.g. inserting an instrument in the bill validator 30 or the card reader 24], e) entering a code into the gaming machine [e.g., via the key pad 22 or via a touch screen] and f) combinations thereof. In the present invention, when the gaming machine has not received identification information from the gaming player, such as but not limited to a player tracking account information, loyalty points may be still be accrued during the game play session. The game play session where loyalty points are accrued may end following another game event such as but not limited to i) detecting zero credits registered on the gaming machine, ii) the gaming machine remaining idle for an amount of time, iii) detecting a tilt condition or detecting an error condition on the gaming machine, iv) detecting a game player's request for a loyalty program instrument and v) combinations thereof. After the loyalty point session ends, some or all of the loyalty points accrued during the session may be awarded to the game player. The loyalty points may be awarded to the player by storing the points to a loyalty program instrument which is issued to the player or the awarded points may be credited to the player's player tracking account after the player provides identification information to the gaming machine.

During the course of a game play session, a player may be required to make a number of decisions, which affect the outcome of one or more games played during the game play session. For example, a player may vary his or her wager on a particular game, select a prize for a particular game, or make game decisions which affect the outcome of a particular game. The player may make these choices using the player-input switches 32, the video display screen 34 or using some other device which enables a player to input information into the gaming machine. During certain game events, the gaming machine 2 may display visual and auditory effects that can be perceived by the player. These effects add to the excitement of a game, which makes a player more likely to continue playing. Auditory effects include various sounds that are projected by the speakers 10, 12, 14. Visual effects include flashing lights, strobing lights or other patterns displayed from lights on the gaming machine 2 or from lights behind the belly glass 40.

After the player has completed a game play session, a loyalty program instrument or cashless instrument may be generated at the gaming machine 2. The loyalty program instrument or cashless instrument may be a printed ticket voucher, a smart card, debit card or other cashless medium. Prior to issuing the instrument, the loyalty points awarded to the player may be displayed on the main display 34, the secondary display 42 or the player tracking display 16. Also, a prize menu may be displayed on one or more displays on the gaming machine 2 such as the main display 34, the secondary display 42 or the player tracking display 16. The prize menu may include one or more goods and services items. To redeem a particular prize, a particular amount of loyalty points is needed. As service items, the game player may be able to convert the awarded loyalty points to frequent flyer miles, obtain a free meal with the loyalty points or obtain a free nights lodging with the loyalty points. As an example of goods items, a player may be able to redeem loyalty points for clothes, food items, electronic goods, etc.

In some embodiments, the player may transfer the awarded loyalty points to a player tracking account. After providing account information (e.g., by inserting a player tracking card), the player tracking points may be transferred to a player tracking account of the player directly on the gaming machine (see FIG. 5). In other embodiments, the player may credit player tracking points or loyalty points, stored on a loyalty point instrument, to a player tracking account 1) over the phone, 2) at a clerk validation terminal, 3) at a cashier station, 4) at a casino kiosk, 5) via a web-interface, 6) via mail or 7) through a hand-held wireless device.

The game player may select one of the goods and services items from the prize menu using an input mechanism of some type. For instance, the prize menu may be displayed on a touch screen and the player may touch the screen to select one of the goods and services items. When the amount of loyalty points required to redeem the selected prize is less than an amount of loyalty points available on the gaming machine, a loyalty program instrument containing the prize instrument may be issued. For instance, when loyalty points are redeemed for a free meal, the player may be issued a ticket 22 from printer 18 which may be used to obtain a free meal when presented at one or more restaurants listed on the ticket.

In some embodiments of the present invention loyalty points accrued during the game play session may be combined with previously earned loyalty points to redeem a prize. Thus, loyalty points stored in one or more of a player's loyalty program accounts, such as a player tracking account, or loyalty points earned during other activities stored on one or more loyalty program instruments available to the player may be used to redeem prizes on the gaming machine. For instance, the player may insert five printed tickets containing various amounts of loyalty points into the gaming machine 2 using the bill validator 30. After each ticket has been validated, as described with reference to FIG. 3, the loyalty points stored on each ticket may be added to the amount loyalty points available on the gaming machine. As another example, the player may request that loyalty points be deducted from a loyalty program account such as a player tracking account. In this case, the gaming machine may send a message to remote server storing the loyalty point account information and request that some amount of loyalty points be deducted from the player's account. Assuming the amount of requested points is available, the requested points may be deducted from the player's account and then transferred to the gaming machine. Finally, the method described above, may be implemented when the player has not accrued any loyalty points during a particular game playing session. For instance, the player may desire to redeem a prize using one or more loyalty program instruments storing loyalty points previously earned by the game player.

In another embodiment of the present invention, a single instrument may store both cash transaction information and loyalty program information. For instance, a smart card may be used to load credits onto a gaming machine and cash out an award from the gaming machine. Also, the smart card may be used to store loyalty program information generated during one or more of a player's game playing activities. Further, the smart card may store prize information for a prize redeemed at a gaming machine using loyalty points accrued by the game player.

Figure 5:
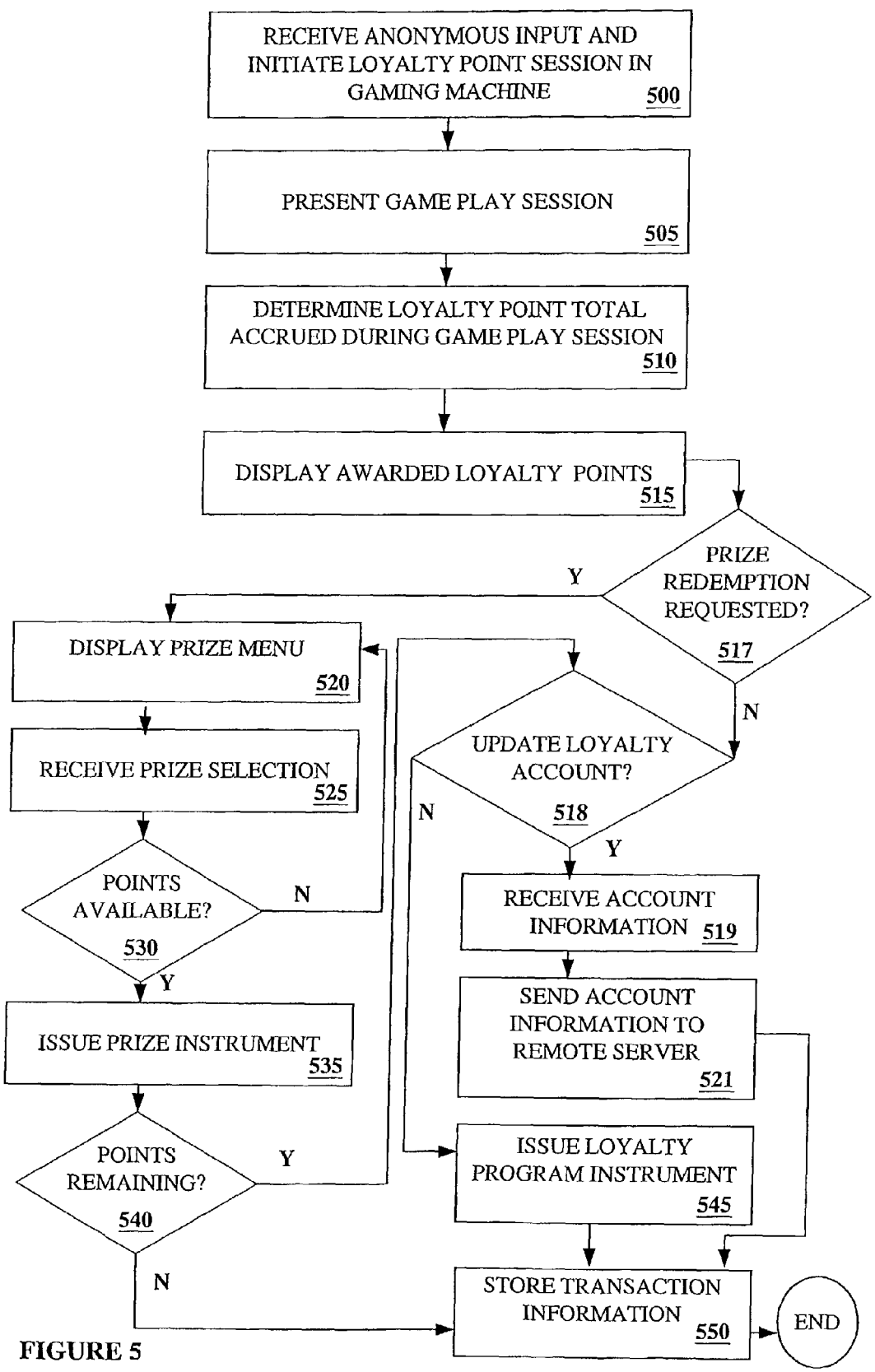
FIG. 5 is a flow chart depicting a method of rewarding loyalty points accrued anonymously on a gaming machine.

FIG. 5 is a flow chart depicting a method of rewarding loyalty points accrued anonymously on a gaming machine. In 500, a gaming machine receives an input of some type from a game player that has not provided any identification information, such as player tracking information. The input, which may be a number of different gaming events, as described with reference to FIG. 4, such as the player depositing a indicia of credit into the gaming machine, triggers a game play session on the gaming machine where loyalty points may be accrued. In 505, a game play session is presented on the gaming machine which may include the player wagering on a number of different games of chance and game outcome presentation corresponding to each wager. For instance, the player may make 5 different wagers on 5 slot games presented on the gaming machine. In 510, a gaming event triggers the end of the game play session and an amount of loyalty points accrued during the game play session are determined. The gaming event ending the game play session may be but is not limited to 1) detecting zero credits registered on the gaming machine, 2) the gaming machine remaining idle for an amount of time, 3) detecting a tilt condition or detecting an error condition on the gaming machine, and 4) detecting a game player's request for a loyalty program instrument. A rate at which the player accrues loyalty points during the game play session may vary according to one or more of a time of day, days of a week, months of a year, an amount wagered, a game denomination, a promotional event, a game type and a rate of wagering. After the amount of loyalty points accrued during the game play session have been determined, some or all of the accrued loyalty points may be awarded to the game player. For instance, a player that does not have a loyalty program account may be awarded a higher fraction of the accrued points than a player that already has an account to encourage the player without an account to sign up for a new account.

In 515, the gaming machine may display the amount of loyalty points accrued during the game play session to one or more display screens on the gaming machine (see FIG. 4). In 517, the player may be offered the option to exchange loyalty points for a prize of some type such as goods or services. In 520, when a prize redemption is requested, a prize menu may be displayed to one or more display screens on the gaming machine. The prize menu may contain a list of prizes available and a number of loyalty points corresponding to each prize that must be redeemed to obtain each prize. In 525, a player may select a prize. In 530, when the player does not have enough loyalty points available to obtain the prize, the prize menu in 520 may be redisplayed and the player may be asked to make another selection or given an option to exit from the menu.

In one embodiment, the player may be given the option (not shown) of viewing loyalty point account information from a loyalty point account such as a player tracking account available to the player. In this case, the player may enter loyalty program account information into the gaming machine using some method. For example, the game player may insert a player tracking card into a card reader on the gaming machine and type in an identification number corresponding to the card such as a PIN number. When the card has been validated, the player may view player tracking account information. Next, to redeem a prize requiring a certain number of loyalty points, when a player does not have enough loyalty points available on the gaming machine, the player may request that loyalty points be transferred to the gaming machine from a remote loyalty point account. The gaming machine may send a request for an amount of loyalty points to a remote server. When the loyalty point transaction has been approved, the remote server may send the requested loyalty points to the gaming machine and delete the requested points from the player's account. Then, the transferred loyalty points may be added to loyalty points already available on the gaming machine and used to redeem a prize.

In 535, when a prize selection has been made and there are enough loyalty points available on the gaming machine to redeem the prize, a prize instrument may be issued to the game player. For instance, the gaming machine may print a ticket for a free meal at a restaurant. The issued ticket may be taken to a restaurant and, after the ticket has been validated, used to obtain a free meal.

In 540, after a prize redemption and points are still remaining, the player may be given the option, in 518, of updating a remote loyalty account with the remaining points. When a player does not request a prize redemption, the player may be directly presented the option to update a remote loyalty point account with some or all of the points awarded during the game play session. In 519, the player may enter loyalty program account information into the gaming machine using some method. For example, the game player may insert a player tracking card into a card reader on the gaming machine and type in an identification number corresponding to the card such as a PIN number. In 521, when the loyalty program account information has been validated by the remote server, the gaming machine may send a request to the remote server requesting that an amount of loyalty points awarded to the player be added to the player's loyalty program account.

In 545, when loyalty points remain on the gaming machine, the gaming machine may issue a loyalty point instrument storing the remaining loyalty points. For instance, the gaming machine may issue a printed ticket voucher redeemable for a certain amount of loyalty points. In 550, the gaming machine may store to a local database residing on the gaming machine loyalty program transaction information for one or more loyalty program transactions performed by the gaming machine such as but not limited to 1) loyalty point awards, 2) prize redemptions, 3) requests for loyalty program account information, 4) requests to add loyalty points to remote account, 5) requests to delete loyalty points from a remote account and 6) information regarding issued loyalty point instruments. In 550, loyalty program transaction information may also be sent to a remote server in lieu of storing the information on the gaming machine or in conjunction with storing the information on the gaming machine.

Figure 6:
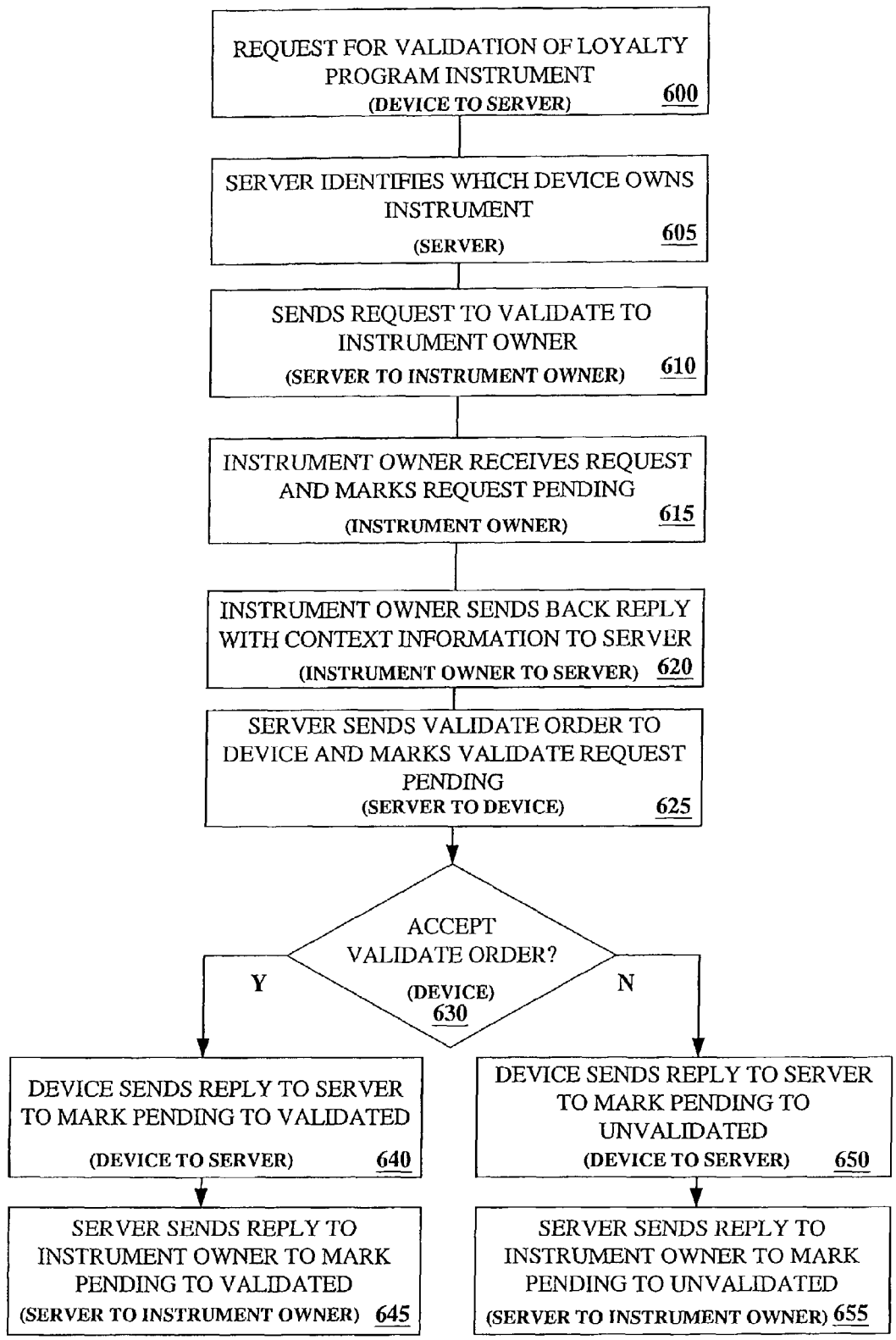
FIG. 6 is a flow chart depicting a method for validating information stored on a loyalty point instrument at a validation site connected to a cross validation network as described with reference to FIG. 3.

FIG. 6 is a flow chart depicting a method for validating information stored on a loyalty point instrument at a validation site connected to a cross validation network as described with reference to FIG. 3. In the embodiment shown in the figure, a loyalty point instrument is validated in a manner consistent with an EZPAY™ cashless system. In 600, a request for game service transaction information read from a loyalty point instrument is sent via a network interface on the gaming device validating the instrument to a loyalty program server. The gaming device may be a gaming machine, a casino kiosk, a hand-held wireless device or a CVT. In 605, the server identifies which gaming device owns the instrument. When a gaming device owns an instrument, the gaming device has stored information regarding the status of a particular instrument issued from a instrument generation site connected to the gaming device. As an example, as described with reference to FIG. 3, the gaming device may be a CVT connected to a number of gaming machines that generate loyalty program instruments. In 610, the server sends a request to validate the instrument to the gaming device identified as the owner of the instrument. Typically, the validation request indicates a service on the instrument has been requested. For instance, for a loyalty program ticket, a validation request may mean a request to access the loyalty points stored on the ticket has been made. For a loyalty program ticket valid for a free meal, a validation request may mean a request to obtain the meal has been made. In 615, the instrument owner receives the validation request for the instrument and marks the instrument transaction pending. While the instrument transaction is pending, any attempts to validate a loyalty program instrument with similar information is blocked by the instrument owner.

In 620, the instrument owner sends back a reply with context information to the server. As an example, the context information may be the time and place when the instrument was issued. The information from the instrument owner to the server may be sent as one or more date packets according to a communication standard shared by the instrument owner and server. In 625, after receiving the validation reply from the instrument owner, the server marks the validation request pending and sends a validation order to the gaming device validating the instrument. While the validation request is pending, the server will not allow another instrument with the same information as the instrument with the validation request pending to be validated.

In 630, the gaming device may chose to accept or reject the validation order from the server. For instance, using a security protocol, the gaming device may determine the validation order is invalid. As another example, an employee using a gaming device to validate loyalty program instruments may decide not to validate an instrument for some reason. When the gaming device accepts the validation order from the server, in 640, the gaming device sends a reply to the transaction server confirming that the transaction has been performed. The loyalty program server marks the request validated or completed which prevents another instrument with identical information from being validated. In 645, the server sends a confirmation to the instrument owner which allows the instrument owner to mark the request from pending to validated. When the gaming device rejects the validation order from the server, in 650, the gaming device sends a reply to the server to mark the validation request from pending to unvalidated. When the instrument transaction is marked unvalidated, it may be validated by another gaming device at a later time. In 655, the server sends the reply to the instrument transaction owner to mark the validation request from pending to unvalidated which allows the instrument to be validated later.

Figure 7:
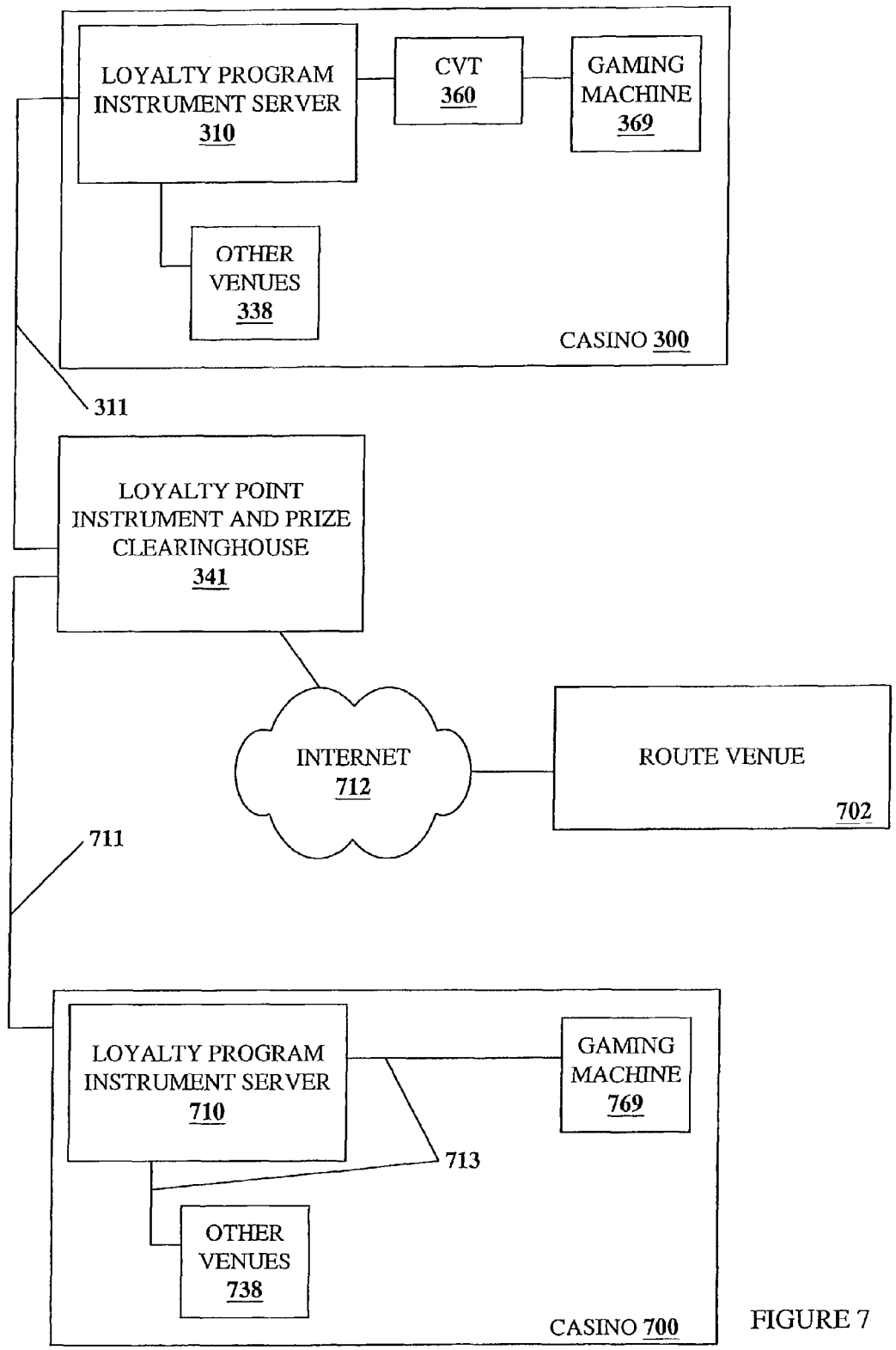
FIG. 7 is a block diagram of loyalty program systems at multiple gaming properties connected to a loyalty program transaction clearinghouse server.

FIG. 7 is a block diagram of loyalty program systems at multiple gaming properties connected to a loyalty program transaction clearinghouse server. At least three gaming devices, a loyalty program server 310 at property 300 (described with reference to FIG. 3), a loyalty program server 710 at property 700 and one or more gaming devices along a route venue 702, may communicate with the loyalty program transaction clearing house server 341. The route may comprise a plurality of gaming machines or other devices issuing loyalty program instruments located in various venues such as stores and bars. The example is for illustrative purposes only, as many different combinations of gaming devices using different network topologies may be connected to the loyalty point instrument and prize clearinghouse 341. At property 300, one or more gaming machines, such as gaming machine 369, send loyalty program transaction information to the clerk validation terminal 360. The CVT 360 sends information to the loyalty program server 310 which may also be cashless server and data acquisition system. In this embodiment, the functions of the controller 350 and concentrator 355, as described with reference to FIG. 3, are combined into the loyalty program server 310. The loyalty point instruments used on property 300 may be smart cards, magnetic cards, ticket vouchers, room keys, debit cards, portable wireless devices and combinations thereof.

The loyalty program server 310 contains a network interface used to send information on loyalty point instruments generated on property 300 to the clearinghouse server 341 or request information 300 from the clearinghouse server 341 on loyalty point instruments issued at other properties that are being validated at property, including instruments issued at property 700 and venues along route 702. The loyalty program transaction information sent to the loyalty program server 310 from the clearinghouse server 341 and received by the clearinghouse server from the loyalty program server 310 is transmitted via the network connection 311. Further, details of information transmitted between a cashless server and a cashless clearinghouse server in regards to multi-property cashless instrument validation as well as server hardware, which may be applicable to multi-property loyalty program instrument validation, are described in U.S. application Ser. No. 09/684,382 by Rowe filed Aug. 25, 2000 entitled "Cashless Transaction Clearinghouse."

At property 700 gaming machines, such as gaming machine 769, and other gaming devices located at other venues 738, such as a loyalty point instrument generation site at a pit game, are connected to the loyalty program server and data acquisition system 710 via the local network 712. The local network 712 may be a wireless or wired connection system including fiber, copper or wireless cellular, combinations of all three or other connection systems. A separate CVT is not shown in this embodiment. The functions of the CVT including storage of loyalty program transaction information may be built into one or more the gaming machines including 769 or may be built into the loyalty program server 710. The information sent to the loyalty program server 710 from the clearinghouse server 341 and received by the clearing house server 341 from the loyalty program server 710 is transmitted via the network connection 711. Along the route venue 702, one or more gaming machine and other gaming devices located in a plurality of properties send and receive loyalty program transaction information for the clearinghouse 341 via an Internet connection 712.

Components of the transaction clearinghouse server 341 may include 1) a memory storage unit for storing loyalty program transaction information in a transaction database, 2) a functional router enabling communication between the clearinghouse server and different properties, 3) a logic devices such as one or microprocessors, 4) a memory containing software for implementing the clearinghouse functions and 5) a network interface. The transaction database may contain on-going and past loyalty point instrument transactions processed using the clearinghouse server. The transaction database may be implemented using Microsoft NT (Microsoft, Redmond, Wash.) and SQL (server query language). The loyalty program servers, including 310 and 710, may also utilize this database technology.

Loyalty program instrument transaction information for two or more gaming properties may be stored in the clearinghouse server transaction database. The properties may be owned by the same or different gaming establishments. The transaction database may be accessed remotely by the properties, including 300 and 700, utilizing the clearinghouse server 341. Further, the transaction database may be used with analysis software to analyze transactions routed through the clearinghouse server 341.

The requirements associated with accounting and reporting of the loyalty program instrument information may be dependent on the regulations within a particular gaming jurisdiction. That being the case, the system is adaptable to those particular regulations. In general, a loyalty program instrument with an award amount may be considered to be analogous to a personal check written by the property where it was generated. When the loyalty program instrument is validated, it is essentially cashed. This implies that the property where the cashless instrument was generated must maintain a database of data related to those loyalty program instruments that were created on its property. This is analogous to maintaining a bank account whose sole purpose is to cover the loyalty program instruments that were generated at the property. This property is usually responsible for maintaining its loyalty program instrument database and validating loyalty program instruments. When a request to validate a loyalty program instrument is received by the loyalty program system at a particular gaming property, the property has the option of validating or rejecting the request. Once the property validates the loyalty program instrument, it is typically the responsibility of that property to insure its own loyalty program instrument transaction database is updated. At that time, the property which generated the loyalty program instrument, may transfer the funds to the property requesting the validation. The fund transfers may occur with each transaction or could be compiled in a batch to cover multiple instrument validation transactions on a periodic basis, eg. once a night. The transaction clearinghouse may facilitate all associated electronic fund transfers (EFTs) and acts as a third party between the parties.

Figure 8:
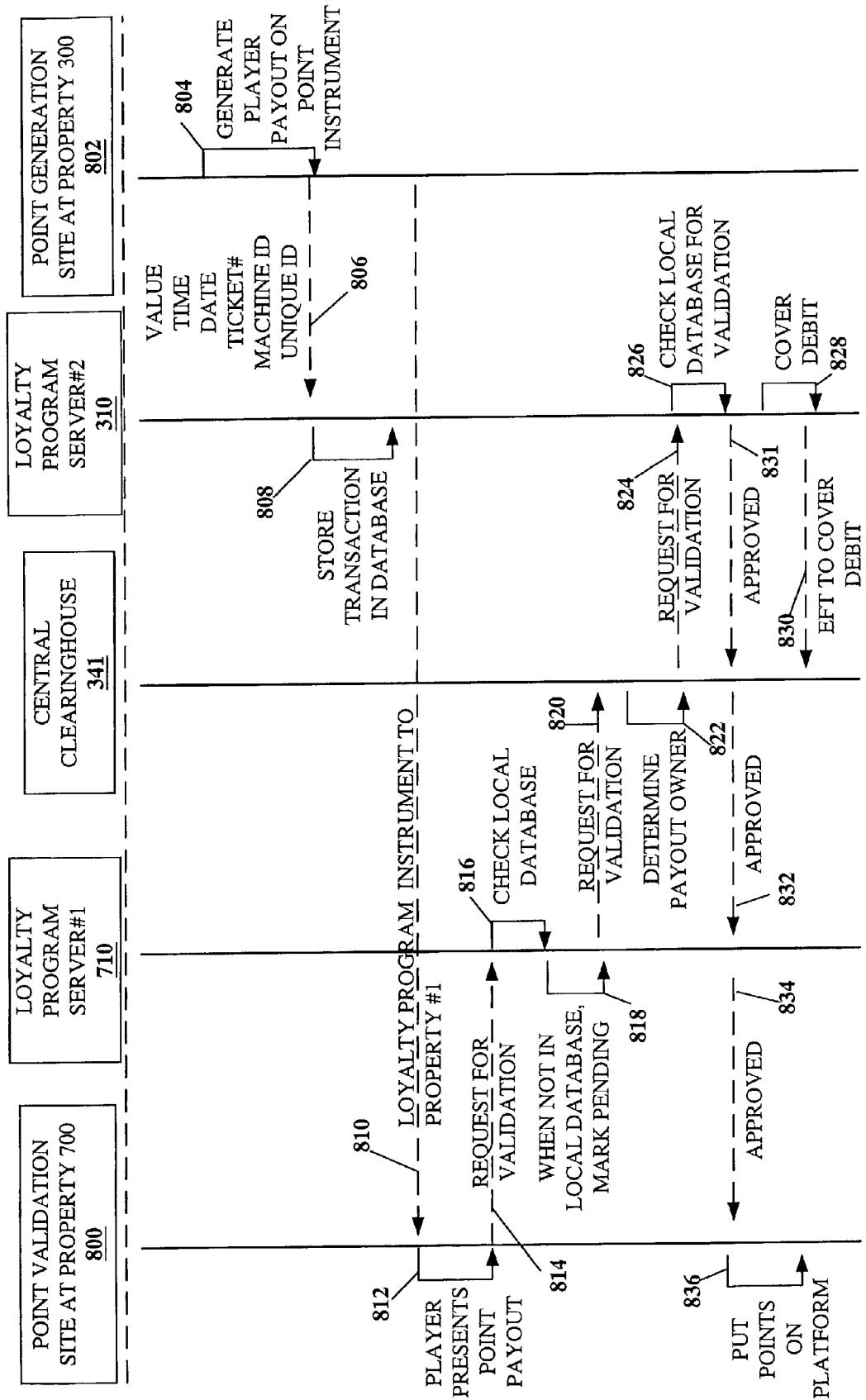
FIG. 8 is an interaction diagram for a loyalty program instrument transaction between a clearinghouse, loyalty program servers, and loyalty program instrument generators/validators where the loyalty program instrument is generated at a different location from where it is validated.

FIG. 8 is an interaction diagram for a loyalty program instrument transaction between a clearinghouse, loyalty program servers, and loyalty program instrument generators/validators where the loyalty program instrument is generated at a different location from where it is validated. In 804, awarded loyalty points are generated on a loyalty program instrument at a loyalty program instrument generation site 802 at property 300. The loyalty program generation site may include but is not limited to a gaming machine, a clerk validation terminal, a wireless validation terminal, a casino kiosk and a cashier station. The loyalty program instrument may include a printed ticket voucher (e.g. EZPAY™ ticket), a smart card, a debit card, a room key and a portable wireless device. In 806, when the loyalty program instrument is generated, loyalty program transaction information, including but not limited to 1) a value, 2) an issue date, 3) an issue time, 4) a transaction number unique to the transaction, 5) a machine ID that generated the loyalty program instrument, 6) an issue location and 7) an instrument sequence number, may be transmitted to the loyalty program server 310. The loyalty program instrument transaction information is also stored on the loyalty program instrument when the loyalty program instrument is generated in 804. In 808, the loyalty program server 310 may store the loyalty program instrument transaction information in a database. The transaction information stored in the database is used when the loyalty program instrument is validated. The validation process may be invoked when the loyalty program instrument is redeemed for a prize or when the loyalty program instrument is used in a gaming machine or other device that accepts the loyalty program instrument. The validation process involves comparing the loyalty program instrument transaction information stored on the loyalty program instrument with the loyalty program instrument transaction information stored in the loyalty program server database.

In 810, a game player takes the loyalty program instrument generated at property 300 to property 700. In 812, the game player presents the loyalty program instrument for a prize redemption at a loyalty program transaction validation site 800 at property 700. The loyalty program transaction validation site may include a gaming machine, a cashier station, a clerk validation terminal, a wireless validation device and any other devices which accept loyalty program instruments. For instance, when a debit card is used as the loyalty program instrument, the game player may be able to directly deposit the awarded loyalty points on the debit card into a loyalty program account, such as a player tracking account, accessible to the game player. In 814, a validation request is sent from the loyalty program transaction validation site 800 to the loyalty program server 710. The validation request may be an information packet containing the transaction information stored on the loyalty program instrument in 804 and stored in the loyalty program server database in 808.

In 816, the loyalty program server 710 may check the local loyalty program transaction database on the loyalty program server 710 to determine if the loyalty program instrument was generated at property 300. The loyalty program server may check the local loyalty program transaction database in a number of ways to determine whether a transaction record for the loyalty program instrument resides in the database. The database search technique may depend on what information is stored in the local database and what information is stored on the loyalty program instrument. When the loyalty program instrument was generated at a property using a different loyalty program system than the property where the loyalty program instrument is validated, the type and amount of loyalty program instrument transaction information stored on the loyalty program instrument may differ from the type and amount of loyalty program transaction information stored on the local loyalty program transaction instrument database. Thus, the search technique may depend on determining a common set of transaction information stored on the loyalty program instrument being validated and stored in the loyalty program transaction database. For instance, when the loyalty program instrument contains a machine ID and the loyalty program transaction database stores a list of all the local machine IDs, the loyalty program server 710 may search the local loyalty program transaction database to determine whether the loyalty program instrument was generated on one of the local machines at the property 700. As another example, when the loyalty program instrument contains transaction information on the property where the loyalty program instrument was generated or the owner of the loyalty program instrument (e.g. the owner of the property), the loyalty program server 710 may quickly determine whether the loyalty program instrument was generated at the local property 700.

In 818, when the loyalty program instrument was not generated locally, the loyalty program server 710 may mark the validation request pending in a local database and send a request for validation to the central clearinghouse 341 in 820. The request for validation from the loyalty program server 710 to the loyalty program instrument transaction clearinghouse 341 may contain all or some subset of the information stored on the loyalty program instrument being validated. In addition, the request for validation may contain information about the loyalty program transaction validation site. For example, the identification information about the loyalty program transaction validation site 800, the property 700 where the loyalty program transaction validation site is being validated and the owner of the may be included in the request for validation message.

As in 814, the request for validation in 820 may be an information packet of some type sent using a pre-determined communication protocol between the loyalty program server 710 and the central clearinghouse 341. The communication protocol used to transmit transaction information between the loyalty program transaction validation site 800 and the loyalty program server 710 in 814 may be the same or different than the communication protocol used to transmit the transaction information between the loyalty program server 710 and the loyalty program instrument transaction clearinghouse 341 in 820.

In 822, the loyalty program transaction clearinghouse determines the owner of the loyalty program instrument (e.g. the property where the loyalty program instrument was generated). The clearinghouse 341 determines the owner based upon information received in the validation request in 820 and based upon information stored in the clearinghouse 341. In 824, using routing information stored within the clearinghouse 341, a request for validation is sent from the clearinghouse 341 to the property where the loyalty program instrument was generated (i.e. property 300 in this embodiment). The request for validation is an information packet in a communication protocol of some type. The transaction information contained within the information packet is sufficient to allow the loyalty program server 310 at the loyalty program generation site 802 at property 300 to validate the loyalty program instrument. The communication protocol used to transmit the transaction information between the loyalty program server 310 and the clearinghouse 341 in 820 may be the same or different than the communication protocol used to transmit the transaction information between the loyalty program instrument transaction clearinghouse 341 and the loyalty program server 710 in 824. For example, the communication protocols may be different when the loyalty program system used at property 700 is different from the loyalty program system used at property 300.

In 826, the loyalty program server 300 checks the local loyalty program instrument transaction database to confirm the request for validation received in 824 is valid. When the transaction is valid (e.g. the loyalty program instrument was generated at property 300 and has not been previously validated), in 831, an approval message may be sent from the loyalty program server 310 to the clearinghouse 341, in 832, the clearinghouse may forward or generate the approval message to the loyalty program sever 710, in 834, the loyalty program server 310 may forward or generate the approval message to the loyalty program transaction validation site 800. In 828, the loyalty program server may represent the transaction as a debit and cover the debit by allocating or transferring funds to an account used to cover debits. For example, each loyalty point may be assigned a pre-determined value such as a $0.01 US dollars. In 830, the loyalty program server 310 may send an Electronic Fund Transfer (EFT) to cover the debit to the clearinghouse 341. The EFT may be sent after each transfer or may be sent as a batch at the end of some time period, e.g. at the end of each day.

In 836, the validation site 800 at property 700, performs an appropriate operation when the validation is approved. For example, when the validation site 800 is a gaming machine, loyalty points may be posted on the gaming machine. As another example, when the validation site 800 is a cashier station, the player may receive a prize according to the value of the loyalty program instrument.

In FIGS. 9-13, apparatus and methods are described that allows gaming information for gaming services, such as but not limited to anonymous loyalty program session, a non-anonymous loyalty program session and cashless transactions to be entered into a gaming machine. The apparatus and methods employ a non-physical contact data interface that allows for data to be read from a loyalty program instrument without physical contact between the data interface and the loyalty program instrument. As was described with respect to FIG. 2, examples of non-physical contact data interface include a bar-code scanner and a wireless interface.

In providing a loyalty program session, the use of a non-physical contact data interface to read data from a loyalty program instrument provides many advantages over a card reader and a magnetic striped card. The card reader and a magnetic striped card are commonly employed in providing a player tracking session on a gaming machine. The data interface in a card reader requires physical contact between a magnetic head and the magnetic-stripe on the card to read data from the card. Details of reading data from a magnetic striped card are described next and then details of input mechanisms using a non-physical contact data interface to read data from a loyalty program instrument are described with respect to FIGS. 9-13.

When a magnetic striped card is used in a player tracking session, which is one type of loyalty program session, the session is initiated when physical contact between the magnetic stripe and magnetic reader is detected. Typically, the card is inserted in a card reader. For a successful read of the magnetic stripe, the length of the stripe must be moved over a magnetic head in the card reader. The movement of the magnetic stripe over the magnetic head can be supplied by 1) a force supplied by a user (e.g., the act of the user inserting the card forces the stripe over the magnetic head) or 2) a force supplied by servo-mechanisms within the card reader.

For a successful read, the card must be inserted correctly in the card reader. A correct orientation is when the card inserted in a manner that allows the magnetic stripe to come in contact with the magnetic head. Typically, a standard magnetic striped card is designed with a top-side and a bottom-side where the magnetic stripe is located across the bottom side of the card in an off-center location. A card reader used with the standard magnetic stripe card requires the card to be inserted with the topside facing upwards and the magnetic stripe on the left side of the card slot. If the card is inserted up-side down or the card is inserted in the card slot with the stripe on the opposite side of the location of the magnetic head then the data is not read from the card.

The magnetic head is used to read data stored on a number of tracks on the magnetic stripe. The magnetic stripe may contain a number of tracks, usually three, but all of the tracks may not be used. In most player tracking implementations, the first track is used to store a number, the number is an index to a record in a player tracking database. The second track is used to store a name such as the property where the card was issued. The third track is not used. The first track usually contains up to 80 characters of data and the second track contains up to 40 characters of data.

When the index number is read from the card, the number is transmitted to a remote server. The index number is used by the remote server to retrieve a player tracking record corresponding to the index number. An index number to a record in a database is used because the magnetic striped card does not have the storage capacity to store the record.

A portion of the information stored in the record may be transmitted back to the gaming machine. The gaming machine may use the information transmitted from the server to generate a player tracking session and to provide other personalized gaming services. For instance, the record referenced by the index number may supply information, such as, 1) a player identification number, 2) a social security number, 3) a name, 4) an address, 5) a credit number, 6) a player rating, 7) complimentary (comp.) information, 8) a player preference tracking number and 9) a casino preference tracking number. In addition, information relating to games, game features, gaming machine settings, prizes, promotions and food/beverage services preferred by the game player may be stored in the record.

For the generation of a player tracking session, the striped card is inserted in the card reader, the index number is read from the magnetic striped card and then is transmitted to the remote server. As part of the validation process for the player tracking session, a player may be required to enter a PIN number. After the session is validated, parameters from game play performed on the gaming machine, such as an amount bet, is converted to player tracking points by the remote server. The player tracking session ends when the player removes the magnetic striped card from the card reader.

When a magnetic striped card storing an index to a record in a database is used to initiate a player tracking session, a number of factors can prevent the implementation of the player tracking session. For example, if the magnetic stripe on the card can't be read because the stripe has been damaged or de-magnetized, then the player tracking session is not initiated. As another example, if the magnetic striped card is not inserted in the card reader, then the player tracking session is not initiated. The card may not be inserted because the player may forget to insert the card or may have forgotten to bring their card as previously described. In another example, the player can insert their card incorrectly, such as, up-side down or backwards, which prevent the card from being read and thus a player tracking card from being initiated. If communication is unavailable between the gaming machine and a remote server, then the player tracking session may not be initiated. If the player is required to enter a PIN number and the player has forgotten their number, then the player tracking session can't be initiated. Finally, if the player the leaves the magnetic striped card in the card reader, then the card can be lost. Until, the card is re-placed, the player may not be able to generate a player tracking session.

It is beneficial to the casino that operates a loyalty program and a player that is a member in the program to make the process of participating as simple and as foolproof as possible. Fool-proofing the process requires addressing the issues that prevent the loyalty program session from being initiated. As is described with respect to FIGS. 9-13, input mechanisms using non-physical contact data interfaces can be used to make the initiation of a loyalty program session on a gaming machine more fool proof.

Figure 9B:
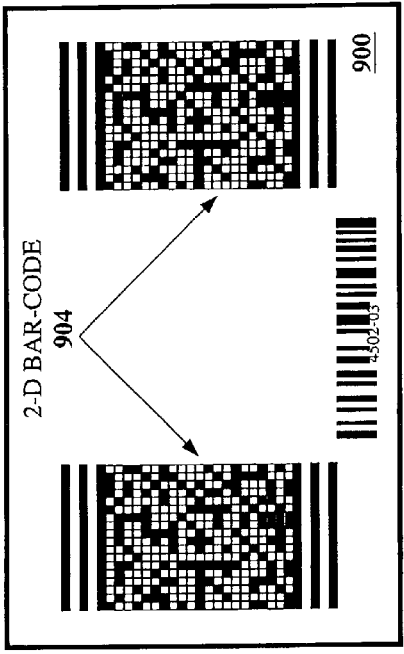
FIGS. 9A-9D are block diagrams of loyalty program instruments and data formats of the present invention.
Figure 9D:
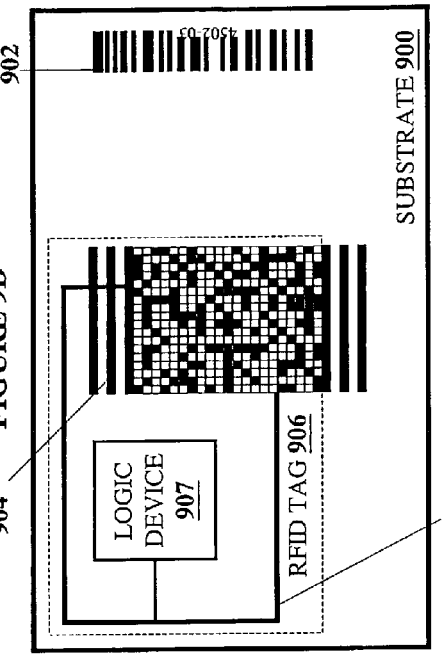
Figure 9A:
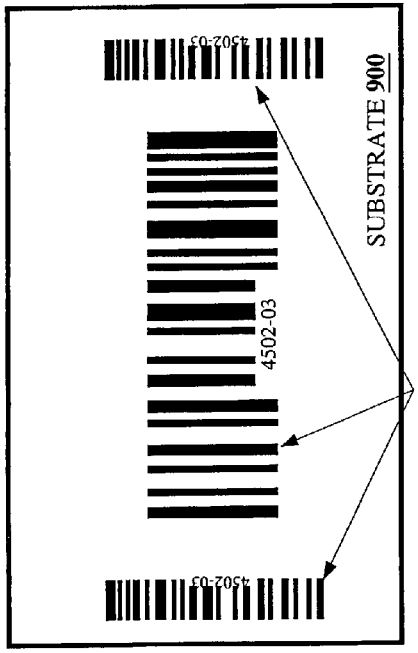

FIGS. 9A-9D are block diagrams of loyalty program instruments and data formats of the present invention. In FIG. 9A, a substrate 900 with a 1-D bar-code is shown. The 1-D bar-code may be used to encode an index to a record in a database. A standard Universal Product Code (UPC) symbol provides a 12 digit number. However, longer or shorter numbers may be encoded in a 1-D bar-code format. In FIG. 9B, a substrate with a 1-D bar-code and a 2-D bar-codes 904 are shown. The 2-D bar-codes, as is to be described as follows, may be used to encode a much large amount of data than a 1-D bar code. In FIGS. 9A and 9B, the 1-D bar-codes and 2-D bar-codes may be read with a bar-code reader, such as a LS 6800 series bar-code reader from Symbol Technologies (Holtsville, N.Y.). The LS 6800 is incorporated in a rectangular box of dimensions of a height of 1.75 inches a width of 2.75 inches and a depth of 4.5 inches.

In FIG. 9A, the substrate 900 is printed with three 1-D bar-codes 902. The 1-D bar-codes encode the same number or different numbers. For instance, the bar-codes at the edge of the substrate 9A may encode one number while the large bar-code in the center of the substrate 900 may encode a different number than then number at the edges. The size and orientations of the 1-D barcodes allow the bar-codes to be read at different orientations and distances from the bar-code reader.

In one embodiment, the bar-codes (1-D/2-D) may be printed on a substrate, such as a plastic wallet sized rectangular shaped card (e.g., credit card sized), a printed ticket and a plastic device designed to be attached to a key ring. In this case, the bar-codes may be printed on the top-side of the substrate, the bottom side of the substrate or both. The information encoded on the top-side and the bottom side of the substrate 900 may be the same or may be different. When the information is on the top-side and the bottom-side is the same, the information may be read from the substrate when either top-side or the bottom side is orientated toward the reader. In another embodiment, different information may be optionally encoded on the top-side and the bottom-side of the substrate. For instance, a 1-D bar-code may be printed on a top-side of the substrate 900 and an optional 2-D bar-code may be printed on the bottom side of the substrate. In this case, information may be read from a first side of the substrate and the substrate may be optionally flipped to read information from the second side of the substrate.

In one embodiment of the present invention, the 1-D/2-D bar-codes may be printed on a substrate with an adhesive backing. Thus, the substrate may be attached to a plurality of devices that may be carried by the player. For instance, the substrate may be attached to a credit card carried by the player, a magnetic striped room key, a cell phone, a person digital assistant, a watch band, a purse, a wallet, an item of clothing, etc. The surface on which the printed substrate is attached does not necessarily have to be flat. Many bar-code readers are capable of reading bar-codes placed on curved surfaces. A player may be issued a sheet of bar-codes with adhesive backing so that the bar-codes may be placed on a plurality of devices.

In another embodiment, the bar-code may be printed on a bracelet that may be worn by the player, similar to a hospital bracelet. The player may place the bracelet near the bar-code reader to have it read. After the player is finished with the bracelet, it may be discarded.

In one embodiment, a plurality of bar-codes corresponding to different loyalty programs may be located on the same substrate. Player tracking clubs run by different casinos use different index numbers for their clubs that are not compatible. Thus, a player that gambles at a plurality of casinos may be required to carry a plurality of player tracking clubs to participate in a player tracking session at each of the clubs. With the present invention, bar-codes from different player tracking clubs may be printed on the same substrate or attached the same substrate using a bar-code printed on an adhesive backing. At the start of the loyalty program session, the plurality of bar-codes may be scanned from the substrate, the scanned numbers may be analyzed to determine if any are valid for the gaming machine or gaming device on which the player has requested a loyalty program session. When one of the scanned numbers is valid, then a loyalty program session may be initiated on the gaming machine. An advantage of this embodiment is that the number of player tracking cards carried by the player may be reduced.

In another embodiment, the gaming machine or another gaming device may be capable of scanning a plurality of 1-D bar-codes and 2-D bar-codes and combining them on a single instrument. For example, a plurality of 1-D bar-codes providing index numbers for a plurality of player tracking clubs may be read by the bar-code reader or the index numbers may be read by another input device on the gaming machine. Then, the all of the 1-D bar-codes may be formatted and printed on a single instrument, such as a printable media with an adhesive backing or a printed ticket. In another example, the plurality of 1-D bar-codes may be combined into a single 2-D bar-code. The 2-D bar-code may be printed on a single instrument, such as a printable media with an adhesive backing or a printed ticket, that may be carried by the player. In yet another embodiment, all of the index may be combined in a single RFID tag. RFID tags are described in detail with respect to FIGS. 9C and 10A-10C.

As described above, 1-D/2-D bar-codes may be used with the present invention. In an ordinary (1-D) bar-code, the data is encode in a vertically redundant format, i.e., the same information is repeated vertically. Thus, the heights of the bars may be truncated without any loss of information. The vertical redundancy allows a symbol with printing defects, such as spots or voids, to still be read. The higher the bar heights, the greater probability that at least one path along the bar-code will be readable.

A 2-D bar-code symbol stores information along the height as well as the length of the symbol. Since both dimensions contain information, some of the vertical redundancy is lost. To insure accurate reading, most 2-D bar-codes use check words to insure accurate reading. An advantage of a 2-D bar-code symbol is that significantly more data may be encoded than compared a 1-D bar-code symbol. With a 2-D bar-code symbol, an entire record of a database can be stored on a single 2-D bar-code symbol rather than just an index to a record.

When a 2-D bar-code is employed, data processing, such as but not limited to parsing, editing, formatting, re-ordering, optical character recognition, encrypting/decrypting, format conversion, may be utilized to process the data read from the 2-D bar-code by the bar-code reader. The data processing may be performed by a logic device located in the bar-code reader, a logic device in communication with the bar-code reader and combinations thereof. Thus, the bar-code reader may include a communication interface for communicating with processors located on other gaming devices, such as a processor located in a player tracking unit, the master gaming controller on the gaming machine or a processor on a remote server.

A 2-D bar-code is one example of a 2-D symbol encoding format. In general there are many types of 2-D symbol formats that may be employed with the present invention. Often the term 2-D bar-codes and the term 2-D symbols are used interchangeably to describe a 2-D symbol encoding information. These 2-D symbol formats include but not are limited to, 3-DI, ArrayTag, Aztec Code, Small Aztec Code, Codablock, Code 1, Code 16K, Code 49, CP-Code, DataGlyphs, Data Matrix, Data Strip Code, Dot Code A, hueCode, Intacta- .Code, MaxiCode, Mini code, PDF 417, Micro PDF 417, QR Code, Smart Code, Snowflake Code, Supercode and Ultracode. These codes may be black and white codes, i.e., use only black and white elements. However, some codes may also utilize color elements or gray scale elements which allow the information density encoded in the 2-D symbol to be increased. The use of a color elements or gray scale elements in a symbol may require different types of scanners to read the symbol than are used for symbols encoded only with black and white elements.

Varying amounts of data may be encoded in a 2-D symbol depending on the format and the capabilities of the reader. Further, in many of the formats the data may be encrypted. For instance, Code 16K printed at 7.5 mils may be used to encode 208 alphabet characters per square inch or 417 numeric characters per square inch. Data Strip Code may be used to encode 150 to 1000 Bytes of digital data per square inch. PDF417 (portable data format) may be used to encode 1.1 kilobytes of machine readable data in the space of a standard bar-code. Also, PDF417 (Symbol Technologies) may be used to encode ASCII, numeric or binary data. The data densities may vary according encoding format of the data. With maximum error correction in PDF417, data may be correctly read from a symbol with half of the symbol damaged.

The 2-D bar-codes may be used to encode data, text, graphics, biometrics, sounds and voice records. For instance, fingerprints, scanned signatures and voice authorization records may be stored in a 2-D bar-code. The scanned signature and the voice authorization record may be recorded at the gaming machine, processed and printed in a 2-D bar-code format on a ticket that is carried by the player. The encoded information on the ticket may be later used to validate/authenticate the printed ticket. In one embodiment, prior to issuing a ticket, the player may be asked to speak a short phrase of their choosing or specified by the gaming machine into a microphone located on the gaming machine. The short phrase may or may not be encoded on the ticket in the player's voice. For instance, a digital sound signature may be generated from the message. Later, to validate the ticket, the encoded information may be read on the ticket and played back to an operator validating the ticket, such via as in an earpiece worn by the operator. The operator may ask the player to repeat the short phrase encoded on the ticket. The operator may use the manner in which the phrase is said, the information contained in the phrase or combinations thereof to validate the ticket. In another embodiment, the short phrase may be repeated into a microphone and a digital sound signature generated from the short phrase may be compared with a digital sound signature of the message originally stored on the ticket.

In other embodiments, the 2-D bar-code may be used to encode a record in a loyalty program database such as a 1) a player identification number, 2) a social security number, 3) a name, 4) an address, 5) a credit number, 6) a player rating, 7) complimentary (comp.) information, 8) a player preference tracking number and 9) a casino preference tracking number. In general, the 2-D barcodes may be used to encode one of a) loyalty program information, b) biometric information, c) player preferences for games, game features, gaming machine settings, prizes, promotions and food/beverage services, d) promotional information, e) gaming machine configuration settings, f) prize information, g) cashless transaction information and h) and combinations thereof. Further, equipment calibrations used for maintenance as well as gaming machine settings preferred by the player may be encoded in a 2-D bar-code format.

The 2-D bar-codes provide a number of advantages. One advantage is that gaming services may be provided to the player when contact with a remote server is unavailable because a record rather than an index may be encoded in the 2-D bar-code. Another advantage is that the PIN code may be eliminated when biometric information is encoded in the 2-D bar-code. For instance, in one embodiment, a player's fingerprint may be encoded in a 2-D symbol. Thus, rather than entering a PIN number, the player may simply place their finger on a finger printer reader. Therefore, the player can initiate a secure session without having to remember a PIN number.

In general, by providing an entire record on the loyalty program instrument (e.g., encoded in a 2-D bar-code format or encoded in an RFID tag), a gaming service, such as a player tracking session, a preferred gaming machine configuration or other customized gaming machine service, that requires a record to be retrieved from a remote server to generate the service on the gaming machine, may be provided by the gaming machine without first contacting the remote server. For example, in a traditional player tracking programs, a remote server is contacted after the player inserts their player tracking card because the player tracking card only stores an index to a record stored on the remote server. Via a communication on the gaming machine, the index number is sent to the remote server to retrieve the player tracking record corresponding to the index number. The player tracking record provides information necessary to implement the player tracking session. With the present invention, the player tracking session may be implemented using the player tracking record stored on the loyalty program instrument without contacting the remote server. After the player tracking session has been completed, the gaming machine may contact the remote server to provide a history of the player tracking session that has been implemented on the gaming machine.

Bar-code readers include a bar-code scanner and a decoder. The bar-code scanner is the optoelectronic part of the reader which transforms for the optical image of the bar-code into electrical signals. The electrical signal may be converted by a decoder within the reader into ASCII (American Standard Code for Information Interchange). The readers of the present invention are not limited to reading data only encoded in a 1-D bar-code format (there are also a wide variety of 1-D formats). For instance, information on a loyalty program instrument may be encoded in a 1-D bar-code format, a 2-D bar-code format (there are wide variety of 2-D bar-code symbol formats), other symbol formats, alpha-numeric formats and combinations thereof. Therefore, the reader of the present invention, including a scanner and a decoder, may be capable of scanning and decoding information encoded in a wide variety of formats. For instance, on a substrate 900, a casino's name in an alpha-numeric format, a symbol for a casino, a 1-D bar-code and a 2-D bar-code may all be printed on the same substrate and all of this information in the different formats may be processed by the same reader.

The bar-code reader may be used to read 1-D bar-codes and 2-D bar-codes using a laser scanner. The laser scanner used in the bar-code reader is one example of a non-physical data interface. The laser in the scanner may be generated using a laser diode. The wavelength of the light used in the scanner may vary from the visible to the infrared spectrum. In some embodiments, the bar-code may be printed in an invisible format. For example, some invisible inks and dyes are fluorescent in the near infrared spectrum and thus may be read with infrared scanner. These symbols are not visible under UV light.

The scanning rate for the laser scanner may be between 40 and 800 times a second. Since self-scanning laser readers, scan at a high rate, they are able to read poorly printed bar code that may require several scan attempts without the user noticing. Many bar-code readers and symbols formats provide for error correction that allow for damaged or misprinted symbols to be read. Typically, laser scanner use coherent light, which limits the amount of beam spreading. This allows the diameter of the beam to remain small enough to resolve wide and narrow bars of the bar-code even when the reading distances vary over the bar-code symbol. This property allows bar-codes printed on curved surfaces to be read. Depending on the symbol width, printing technology and ambient conditions, data may be read from bar-codes in a range of about 2 inches to 30 inches from the reader. These distances may vary depending on the employed technology. For instance, an ArrayTag 2-D bar-code format may be read from a distance as great as 50 meters.

Another example of a non-physical contact data interface that may be used to read 1-D and 2-D bar-codes in a bar-code reader is a charged coupled device (CCD) scanner. In CCD scanner, the bar-code may be illuminated by a photoflash or by another type of light source. The image of the bar-code is focused on to an array of photodetectors (i.e., CCD). The images of the dark bars of the symbol will fall on some of the photodetectors, while the light spaces fall on other detectors. An electrical signal is applied to the CCD array and the light value at each detector is read. This signal may be processed to determine the information encoded in the symbol. With a bright light, the depth of focus for a CCD array is several inches and generally the symbol must be placed closer to the scanner as compared to a laser scanner. Although, depending on the size of the symbols, the information may be read up to several feet away.

The density of the symbol that can be read is a function of the number of photodetectors in the CCD array. Instead of a CCD scanner, a CCD video camera may be also be used to read bar-code symbols. The laser and CCD scanners may be operated continuously, may be activated when a sensor detects an object is in the vicinity of the scanner, may be activated in response to a gaming event, such as a player depositing money into a gaming machine and combinations thereof.

Figure 9C:
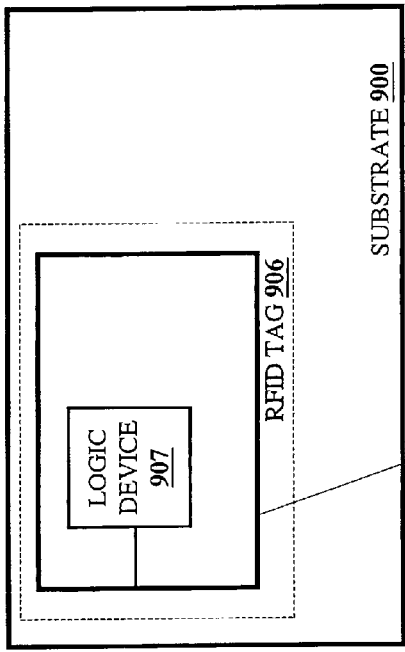

In the present invention, a loyalty program instrument with an RFID tag is another type of device that may be utilized with an input mechanism using a non-physical contact data interface. In FIG. 9C, a substrate 900 with an embedded RFID tag 906 is shown. In its simplest form, an RFID tag 906 may comprise a logic device 907 and an antenna 908 without a power supply. When the RFID tag without a power supply is interrogated by a RFID tag reader operating at the right radio frequency, the antenna picks up a small amount of electromagnetic energy that is used to power logic device 907. After receiving power, the logic device 907 broadcasts via the antenna 908 data that is stored in the logic device to the RFID tag reader. Additional details regarding RFID tag readers and RFID tags are described with respect to FIGS. 10A-10C.

The RFID tags 906 may be of varying sizes. For instance, the logic device 907 may be 1 mm square and ½ mm thick and embedded in a flexible substrate such as paper. The RFID devices may also incorporated into a substrate 900 with an adhesive backing and placed on various objects carried by a gaming machine user at the casino in the manner as was described for the 1-D/2-D bar-codes. RFID devices that may be used with the present invention are produced by companies, such as Texas Instruments (Dallas, Tex.), Hitachi (Japan), Infeon Technologies (Germany). Another type of RFID tag by Samoff (Princeton, N.J.) is as small as 250 micrometers wide. The RFID tag includes photocells, logic, memory for 50 bits and an antenna etched in silicon. The logic device receives power through a burst of laser light that is received by the photocells.

The memory storage capacities of the RFID tags used in the present invention may vary. In one embodiment, the RFID tag may be used to store a number that is an index to record in database like a 1-D bar-code symbol. In another embodiment, the RFID tag may be used to store a record in a database like the 2-D bar-code symbol. The type of information, such as loyalty program instrument data, that may be stored on the RFID tag 906 are the same as described above for the 1-D/2-D bar-codes.

In one embodiment of the present invention, a combination of 1-D/2-D bar-codes and RFID tags may be used. In FIG. 9D, a substrate 900 including an RFID tag 906, 1-D bar-code symbol 902 and a 2-D bar-code symbol 904 is shown. The RFID tag 906 may be embedded in a media, such as paper or plastic, and the 1-D/2-D barcodes may be printed on the media. In particular embodiments, the media may be credit card size plastic substrate, a thermal printing media with an embedded RFID tag, any type of printable media with an embedded RFID tag and a printable label with an embedded RFID tag and an adhesive backing. Since the RFID tags may be quite small a plurality of tags may be embedded in the same media. Input mechanisms of the present invention may be designed to read information stored in RFID tags, read bar-codes or read both formats. For instance, a bill validator may be capable of scanning information encoded in the 1-D/2-D bar-code formats printed on a ticket inserted in the bill validator and interrogating an RFID tag embedded in the inserted ticket.

In FIG. 9D, the different information formats (i.e., RFID and bar-code) may be stored the same information or different information. For instance, in one embodiment, the 1-D bar-code 902 may store an index to a record while the RFID tag 906 stores a security code that is used to validate the instrument. In another embodiment, the RFID tag and a 1-D bar-code may be used to store the same index number. Thus, if the RFID tag is damage, the index number may be read from the 1-D bar-code or if the 1-D bar-code is damaged the index number may be read from the RFID tag.

Figure 10C:
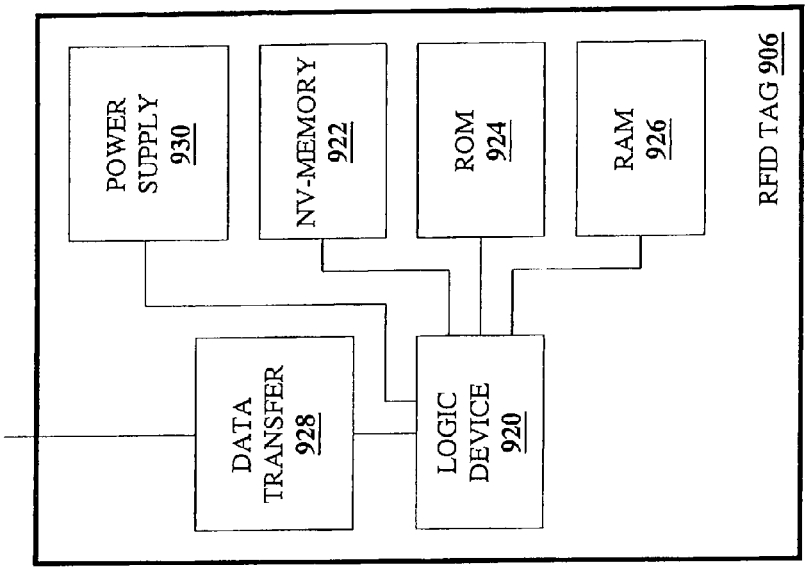
FIGS. 10A-10C are block diagrams of RFID tags and RFID readers of the present invention.
Figure 10A:
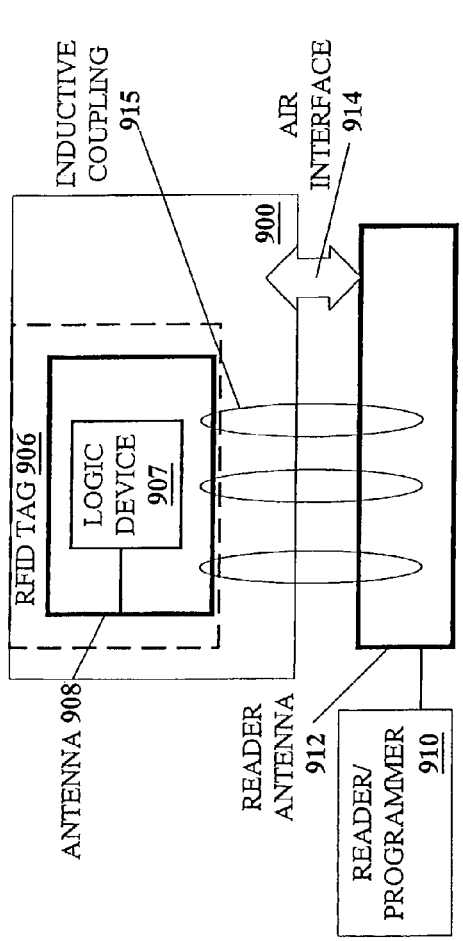
Figure 10B:
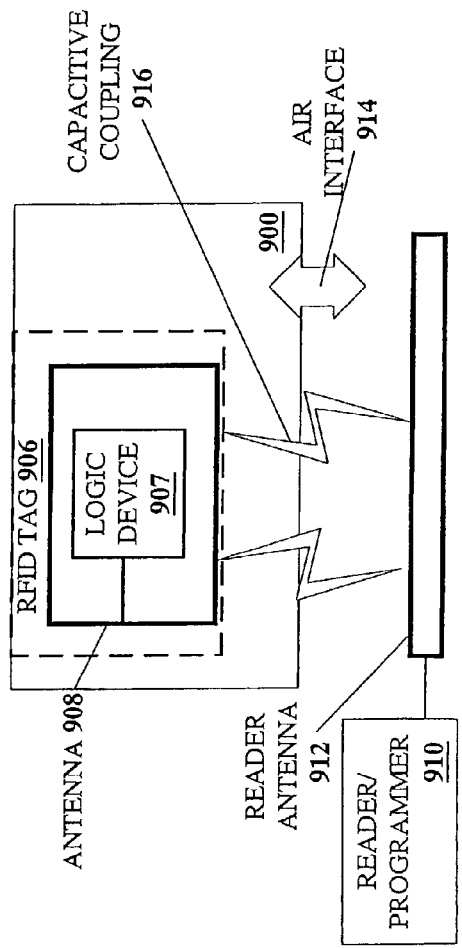

FIGS. 10A-10C are block diagrams of RFID tags and RFID tag readers of the present invention. In FIGS. 10A and 10B, the use of inductive coupling and propagation coupling to read RFID tags. In FIG. 10C, an RFID tag for one embodiment of the present invention is described.

In FIG. 10A, a reader antenna 912 connected to a reader/programmer 910 is used to communicate with an RFID tag 908, including a logic device 907 and antenna 908, which is located on a substrate 900. The RFID tag 906 is a passive RFID tag and does not include a power supply. Although, as described with respect to FIG. 10C, active RFID tags with a power supply may be used in the present invention. The logic device may be a silicon microprocessor, which may vary in size. The antenna is typically a metal coil made of a conductive metal such as copper or aluminum.

Power is supplied to the RFID tag 906 via the air interface 914 through inductive coupling 915 to the metal coil which is the tag's antenna 908. Inductive RFID tags are powered by a magnetic field generated by the reader. The antenna 908 picks up magnetic energy. The magnetic energy is then used to power the logic device 907. The logic device 907 modulates the magnetic field in order to retrieve and transmit data back to the reader 910. The data transmitted back to the reader then may be communicated to another gaming device, such as but not limited to, a logic device on a player tracking unit, a master gaming controller on a gaming machine and a remote server.

An RFID tag using capacitive coupling or propagation coupling 916 is shown in FIG. 10B. In a typical RFID tag using propagation coupling, the logic device 907 is a silicon microprocessor. The RFID tag's antenna 908 is generated using a conductive ink. By printing the antenna structure on a media, such as paper, using the conductive ink, the antenna may be formed. Carbon-ink electrodes on the paper, which may be integrated into an adhesive label, may be used to connect the antenna to the microprocessor. The capacitively coupled RFID tag 906 is powered by electric fields generated by the reader antenna 912 attached to the reader/programmer 910.

In another embodiment of the present invention, the RFID tag 906 may include one or more photocells. The photocells may be used to power the RFID tag by shining light energy, such as a generated by a laser, onto the photocell. The photocell then transmits the energy received from the laser to the logic device.

Typically, the RFID tags may use three frequency ranges, low, medium and high to communicate information. Low frequency range is from 100-500 Khz. The medium frequency range is from 10-15 Mhz and the high frequency range is from 850-850 Mhz and 2.4 to 5.8 GHz. In general, the reading speed for data and the reading range increases as the frequency used with the RFID tag increases. The range of the RFID system is a function of the power available at the reader/programmer 910 and the power available by the RFID tag to respond and the environmental conditions in which the RFID tag is used, such as a casino environment.

The function of the reader portion of the reader/programmer 910 is to provide a means of communicating with the tags and facilitating data transfer. The reader may include a logic device designed to perform signal conditioning and parity error checking and correction. RFID readers, such as 910, may probe simultaneously a plurality of RFID tags. Once a signal from an RFID tag has been correctly received and decoded, algorithms may be applied to decide whether the signal is a repeat transmission. When the reader 910 determines the transmission has been repeated, the reader may instruct the RFID tag to stop transmitting. This process, often referred to as "Command Response Protocol," is used to circumvent the problem of reading multiple tags in a short period of time during batch processing. In another approach, the reader 910 may look for RFID tags with specific identities and interrogate them in turn.

Batch processing may be applied when a plurality of RFID tags are within the range of the RFID reader. For example, batch processing may be applied when a player is carrying a plurality of instruments where each instrument may include one or more RFID tags. In this example, the reader may be able to interrogate each of the RFID tags to determine the function of each instrument carried by the player. In one embodiment, when the player is carrying a plurality of RFID tags where a portion of the RFID tags encode index numbers corresponding to different player tracking programs, then the RFID reader located on the gaming machine may be able to read each of the index numbers stored on the tags and determine if any of the read index numbers are valid for a player tracking program implemented on the gaming machine. The interrogation of the different RFID tags by the reader may be initiated when a game play session is initiated on the gaming machine.

In one embodiment, the player may carry instruments with RFID tags issued for a number of purposes, such as player tracking programs, anonymous loyalty instruments, cashless instruments, promotional credits, coupons and comps. These RFID tags may have been issued at different locations and at different times. Thus, the RFID tags may store information regarding but not limited to, a purpose, where they were issued, the time they were issued and when they expire. When a game play session is initiated on the gaming machine by a player or in response to some other game event, the reader may interrogate the RFID tags that are within range of the reader such as the RFID tags carried by the player initiating the game play session. With this information, the gaming machine may be able to determine 1) what types of tags the player is carrying, 2) what is their purpose and 3) where the player has been. The gaming machine may also be able to determine where the RFID tag was issued, when the instrument with the RFID tag was issued and whether the instrument has an expiration date. This process may be carried out at other locations frequented by the player. For instance, RFID readers may be located at cashier stations, ATM machines, casino kiosk, hotel registration desks as well as gaming machines.

Using information read from RFID tags carried by the player, a gaming device, such as a gaming machine, or a casino employee that has access to the read information, may send targeted information to the player. For instance, if the player is carrying a coupon for promotional credits, the gaming machine may remind the player of the coupon and encourage them to use it. In another embodiment, if the gaming machine determines the player is carrying cashless instruments with a cash value above a certain threshold, then the gaming machine may offer the player promotional offers to entice them to spend it. The promotional offer may be displayed on a display screen on the gaming machine or may be made via a printed ticket issued by the gaming machine. In another embodiment, based upon information read from the RFID tags, such as the value of cashless instruments carried by the player, the gaming machine may notify an attendant to provide the player special service.

In another embodiment, if the gaming machine determines that any of the instruments carried by the player are about to expire, the gaming machine may generate and display a notification message. For instance, cashless instruments are only redeemable for a limited time period. Thus, if the gaming machine determines that a cashless instrument is about to expire, the gaming machine may generate a notification message with this information and display the message. In another example, promotions, such as promotional credits, may only be valid for a limited time period. Therefore, if the gaming machine determines the promotion is about to end, then the gaming machine may generate a notification message with this information and display the message.

The targeted services may be provided while identity of the player is unknown. targeted anonymous gaming services are possible because although the RFID tags may not contain any information about the player's identity, information read from a plurality of RFID tags carried by the player, such as the purpose of the instrument, when they were issued and where they were issued, may provide enough information to target a service to the player. As described above, information read from the instruments the player is carrying may be used to construct a history of the player's recent activities and based upon the information software algorithms may be developed that target services to the player.

A person carrying the RFID tags may not know what information is stored on the tags or in what instruments the tags are located. Further, the information on the RFID tags may be gathered without any active participation by a person carrying the RFID tag, i.e., the information gathering process is passive in regards to participation by the player. Passive information gathering is not possible with a magnetic striped card. With a magnetic striped card, active information gathering is required because the player has to correctly insert the card into a card reader to have the information from the card read. Further, only the information on the inserted card is read. Information from other magnetic striped cards carried by the player can't be read unless the player serially inserts the card in the card reader. With an RFID tag (see FIGS. 12 and 13 for more detail), the player may only have to be in a location within the range of the RFID reader to have the information on all the RFID tags they are carrying to be read.

Returning to FIGS. 10A and 10B, the reader/programmer 910 may be used to store information to an RFID tag 906. In one embodiment, the programming process may involve a write-once read many (WORM) RFID tag. For this type of tag, the information programming may be carried out when the instrument with the RFID tag is issued. For example, a printable media with an embedded RFID tag may be programmed by the reader/programmer 910 during the process of generating a printed ticket with the RFID tag. In another embodiment, the embedded RFID tag may be pre-programmed and the information stored on RFID tag may only be read when the printed ticket is issued. The data read from the RFD tag may be stored in a database located on one of the gaming machine, a remote server and combinations thereof. As described with respect to FIG. 10C, more complicated RFID tags may be read/write capable, i.e., the memory on the tags may be written to and over written a plurality of times.

In one embodiment of the present invention, a portion or all of the electronic circuitry for an RFID tag used in an instrument may be generated by printing the circuitry directly to a printable media. The printing process may be carried out by a printer located in a gaming device, such as a gaming machine as part of the process of issuing the instrument from the gaming machine. For example, circuitry may be printed on a cashless instrument when the cashless instrument is issued from the gaming machine. The circuitry may be used to store information about the cashless instrument, such as a value of the ticket.

In one embodiment, the printed circuitry may be memory circuitry used to store information used on the RFID tag 906. The printed circuitry may be generated when the instrument is issued i.e., "on the fly." As an example, the memory circuitry may be generated using conductive ink transferred to a suitable media, such as paper, using an inkjet printer. Paper is one example of a flexible media that may be used with the present invention. In another example, a thermal printer may be used to activate electronic pathways on a thermally activated media to create the electronic circuitry. The memory circuitry printed on the media used for the instrument may be capable of storing a number of bits of information, such as an index number for a loyalty program instrument. The memory circuitry may be connected to an RFID microprocessor embedded in the printable media, such as the logic device 907. Therefore, the stored information in the memory circuitry may be later read by an RFID reader 910.

The printers used in the present invention may also be capable of printing information, such as loyalty program instrument data, in other formats, such as 1-D/2-D bar-codes and alpha-numeric symbols, as described with respect to FIGS. 9A-9D. The printer may be one of a laser printer, inkjet printer and thermal contact printer. Further, the printer may be capable of printing information, such as a bar-code symbols, in an invisible format.

In FIG. 10C, a RFID tag 906 for one embodiment of the present invention is described. The RFID tags of the present invention may be passive or active tags. Active tags are powered by an internal battery and are typically read/write devices. Passive tags operate without an internal battery source, deriving the power to operate from the field generated by the reader.

The RFID tag memory may comprise one or more of ROM 924, Non-volatile memory 922 (e.g., EEPROM or flash memory) and RAM 926. The ROM memory may be used to accommodate security data and the RFID tag operating system instructions. The operating system instructions may be used by the logic device 920 to perform internal functions, such as response delay timing, data flow control, encryption/decryption and power supply switching. The RAM memory 926 may be used for temporary data storage during interrogation and response between the RFID tag 906 and the reader 910.

The NV-RAM is used to store RFID tag data. NV-RAM is used to ensure the RFID tag data is not lost when the device is in its quiescent or power-saving sleep state. The NV-RAM used in the present invention may vary in storage capacity. The NV-RAM may be capable of storing a number of bits of information used to store a number that is an index to a record in a database or may be large enough to store a portable data file which may be a record in a database. As described with respect to FIGS. 9A-9D, gaming services may be provided using the record stored in a portable data file without contacting a remote server.

The data transfer circuitry 926 may be used as a data buffer to temporarily hold incoming data following demodulation and outgoing data for modulation and may be used to interface with the reader antenna. The data transfer circuitry 926 may also be used to direct and accommodate the interrogation field energy for powering purposes and triggering of the transponder response. Circuitry (not shown) may also be provided to allow for programming of the RFID tag 906. The power supply 930 is optional. Active tags require a power supply while passive tags derive power remote sources such as the from field energy provided by the reader antenna or a laser light source used to transfer energy to the tag via a photocell.

FIGS. 11A-11B are block diagrams of input mechanisms with a non-physical contact data interface of the present invention. The input mechanisms are provided for illustrative purposes and the present invention is not limited to these two designs. The input mechanisms may be mounted directly to a gaming machine or may be located within a player tracking device mounted to the gaming machine.

In FIG. 11A, an input mechanism 950 with an interior non-physical contact data interface 952 is shown. The non-physical contact data interface 952 may be one of a bar-code scanner, a RFID tag reader and combinations thereof. The input mechanism 950 comprises a rectangular housing 955. The rectangular housing has an exterior surface 959 that is designed to form an exterior surface of the gaming machine. Thus, most of the housing 955 is located within the interior of the gaming machine. The exterior surface 959 may be located on a horizontal surface, a vertical surface or on a surface with an inclination between horizontal and vertical located on the gaming machine.

The housing 955 is designed for accepting a rectangular substrate 900, such as a ticket or a plastic card. The substrate 900 may include 1-D bar-codes 902, 2-D bar-codes 904, RFID tags (not shown) and combinations thereof. The exterior surface 959 includes a slot 956. The slot is designed to receive the substrate 900. Guides 958 may be located in the interior of the housing. The guides 958 may be used to constrain the orientation of the substrate 900 after it is inserted in the slot 956. The top of the non-physical contact data interface 952 may be located at a distance below the guides 958. After the substrate 900 is inserted in the slot, information on the substrate may be read by the non-physical contact data interface 952.

In FIG. 11B, an input mechanism 951 with an exterior mounted non-physical contact data interface 952. The top of the non-physical contact data interface 952 is surrounded by an exterior surface 960. The non-physical contact data interface 952 may be mounted below a translucent material. The non-physical contact data interface 952 and the exterior surface by connected to a housing (not shown) extending below the exterior surface 960. The exterior surface 959 may be located on a horizontal surface, a vertical surface or on a surface with an inclination between horizontal and vertical located on the gaming machine.

The non-physical contact data interface may read information from the substrate 900 when it is moved through or within an active volume 970 above the reader 952. The shape and size of the substrate 900 is not limited to a rectangular shape shown in the figure. Information may be read from the substrate 900 at one of a plurality of distances between the substrate 900 and the reader 952 and with one of a plurality of orientations between the substrate 900 and the reader. For example, when bar-code data is read from the substrate 900 using a bar-code reader, the side of the substrate 900 facing the top of the reader 952 may be parallel to the top of the reader or inclined at one of a plurality relative to the top of the reader. When RFID data is read from the substrate 900, in some embodiments, the RFID data may be read independently of the orientation of the substrate relative to the reader 952. In other embodiments, when the RFID tag receives power from the reader 952 via light energy received from photocells on the tag, the substrate may have to be oriented in one of a plurality of orientations that allows the photocells to receive light energy from the reader 952.

During the read process, the substrate 900 may be stationary or at a time varying position relative to the reader 952. Further, the orientation of the substrate relative to the reader 952 during the read process may be fixed or may be time varying during the read process. For example, for a substrate 900 with a 2-D bar-code, the substrate 900 may be moving and changing orientation in the volume above the reader 952 during reading as the reader 952 scans the 2-D bar-code on the substrate a plurality of times.

The input mechanism 951 may optionally include guides 962 for aligning the substrate 900 in a preferred orientation. By placing the substrate 900 within the guides, the substrate 900 may be aligned relative to the reader 952. If the substrate 900 is placed above the guides, but somewhat aligned with the guides or the substrate 900 is smaller than the guides, the substrate may still be sufficiently aligned. In one embodiment, the guides 962 may include slots for inserting the substrate 900. An advantage of using a "free" read where the substrate 900 is simply placed within the active volume 970 for the read and then removed that the substrate 900 can't be left in the device like a magnetic striped card can be left in a card slot. Therefore, this design may reduce the probability of the substrate 900 being lost.

The input mechanisms 950 and 951 may include a loyalty program session status interface comprising one of a status light 954, a sound projection device 955 and combinations thereof. The light may be located at any location on the exterior surfaces 959 and 960. For input mechanism 950, the light may be a strip with one or more lighting elements and may surround the slot. For input mechanism, the light may be a strip with one or more lighting elements. Further, the guides 962 may be translucent and back-lit. The sound device 955 may be located on the exterior surfaces 959 and 960. The sound device 955 and status light 954 may be located or at other locations on the gaming machine and are not limited to exterior surfaces 959 and 960. In general, the sound device 955 and status light 954 may be used to provide information regarding the functioning of the input mechanisms in 950 and 951 in any application for which they are used.

The loyalty session status interface may be used to indicate the status of a loyalty program session and communicate information regarding the loyalty program session. In the present invention, the loyalty program session is not limited to being initiated by physical contact between the loyalty program instrument and the instrument reader and is not limited to being terminated by the removal of a card from a card slot. The loyalty program session may be initiated and terminated in response to a number of conditions. For example, the loyalty program session may be initiated by a first gaming event and may be terminated by a second gaming event. The first gaming event may be one of i) an input of loyalty program instrument data from the loyalty point instrument via the non-physical contact data interface, ii) a deposit of an indicia of credit into the gaming machine, iii) an insertion of a card into a card slot on the gaming machine, iv) an activation an input button on the gaming machine, v) an input of a loyalty program instrument into the input mechanism on the gaming machine, vi) an input of a code into the gaming machine, vii) an input of biometric information into the gaming machine and viii) combinations thereof. The second gaming event may be one of a) an occurrence of zero credits on the gaming machine, b) an amount of idle time on the gaming machine exceeding a specified limit, c) a tilt condition, d) an error condition, e) a request for a loyalty program instrument, f) a request to terminate the loyalty program session, g) an inability to detect the loyalty program instrument, h) a cash-out request, i) a timeout condition, j) an inability to detect a user of the gaming machine and k) combinations thereof.

The loyalty program session status interface may communicate that status information in a loyalty program session in a number of ways. The sound projection device 955 may emit a sound in response to a data read by the non-physical contact data interface 952 or the lighting device 955 may generate light in response to a data read by the non-physical contact data interface 952. The lighting device 954 may change color in response to a data read by the non-physical contact data interface. For example, the lighting device 954 may generate one of a first color, first light pattern and combinations thereof when a status of the loyalty program session is active and may generate one of a second color, a second light pattern and combinations thereof when the status of the loyalty program session is inactive. Further, the lighting device may generate one of a third color, a third light pattern and combinations thereof when the status of the loyalty program session is about to change. For example, a loyalty program session may time-out after a period of time and the third pattern of light may be generated in a time period just before the loyalty program session ends.

When loyalty program session status interface includes both a sound device and one or more lighting devices. The loyalty program session status interface may generate one of a sound, a light pattern, a light color and combinations thereof when data is read correctly by the non-physical contact data interface and may generate one of a sound, a light pattern, a light color and combinations thereof when data is read incorrectly by the non-physical contact data interface. The loyalty program session status interface may generate one of a sound, a light pattern, a light color and combinations thereof when a status of the loyalty program session is active, may generate one of a sound, a light pattern, a light color and combinations thereof when a status of the loyalty program session is inactive and may generate one of a sound, a light pattern, a light color and combinations thereof when a status of the loyalty program session is about to change.

Figure 12:
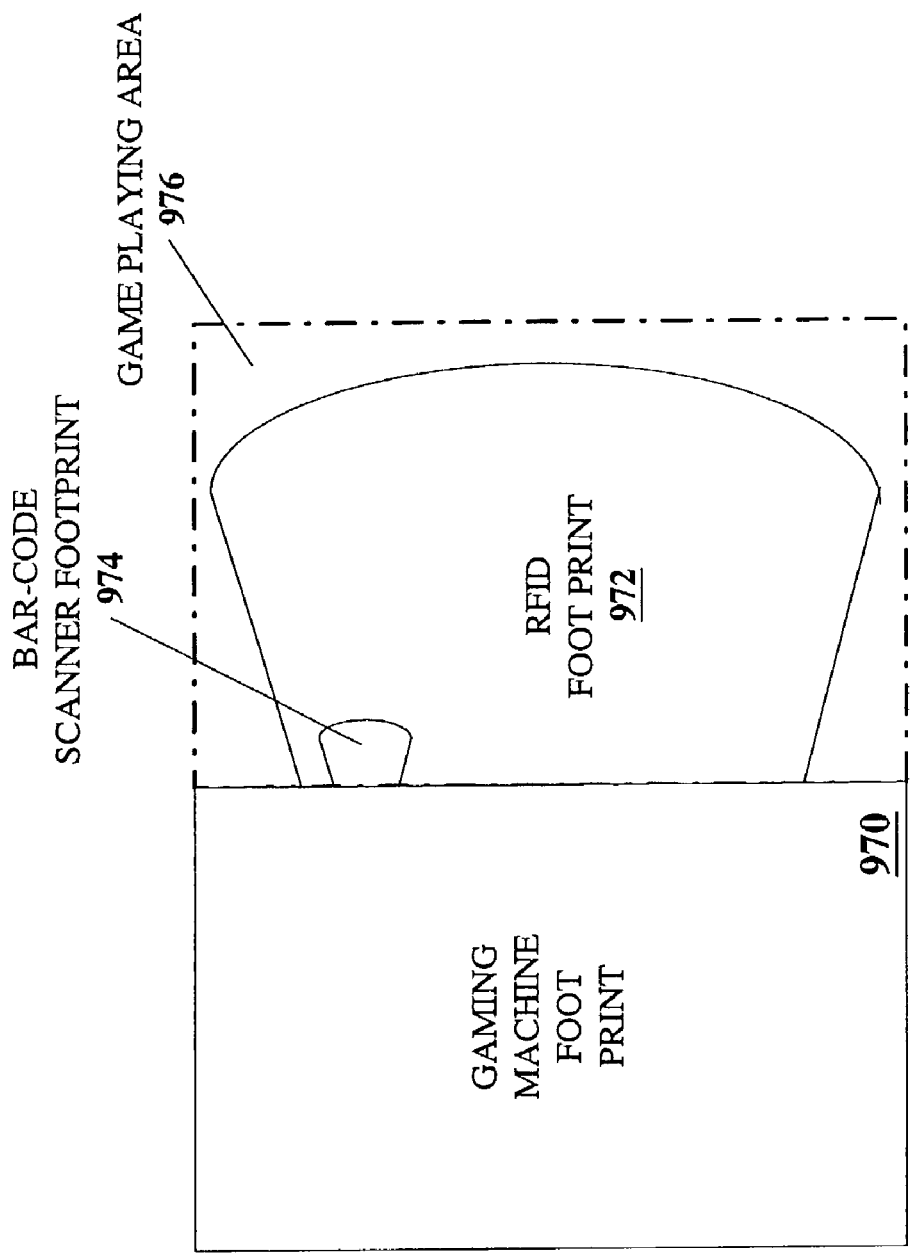
FIG. 12 is a block diagram of foot prints of non-physical contact data interfaces of the present invention.

FIG. 12 is a block diagram of foot prints of non-physical contact data interfaces of the present invention. The gaming machine typically occupies a foot-print 970 while the gaming machine is on the casino floor. The foot print is the area on the casino floor occupied by the gaming machine which may vary according to the make and model of the gaming machine. To play the gaming machine, a player typically stands or sits within a game player area 976 in front of the gaming machine. To read bar-code data, a substrate with the bar-code is placed within an active volume of space in which the bar-code reader is operable to read data. A foot print 974 for the active volume of the bar-code reader is shown. The active volume is typically located at a location on the gaming machine that is easily accessible to the player that is located within the game playing area 976.

An RFID tag reader may generate an active volume with a much larger foot print than a bar-code reader. In one embodiment, the foot print of the active volume for an RFID tag reader may encompass all or a large portion of the game playing area 976. The RFID tag reader may be designed to read all of the RFID tags located within its active volume. A foot print 972 for one active volume of an RFID tag reader is shown in the figure. For the foot print 972, when a player carrying RFID tags is located within the game playing area 976, then the RFID tag reader may be able to read the RFID tags carried by the player.

The active volume of the RFID tag reader may be sized to prevent overlapping reads. For instance, when the RFID tag reader is capable of reading an RFID tag storing loyalty program instrument data that is used to initiate a loyalty program session and when the active volume is large an extends beyond the game playing area 976, the RFID tag reader may read loyalty program instruments carried by a plurality of different game players. For instance, the RFID tag reader may read RFID tags carried by two different game players playing games on adjacent gaming machines in a casino. As another example, a person carrying an RFID tag used as a loyalty program instrument not participating in a game play on a gaming machine may be located proximate to a person with an RFID tag used as a loyalty program instrument that is participating in a game play session.

To minimize overlapping reads, the active volume of the RFID tag reader may be shaped. The active volume may be shaped by among other factors, the size of the antenna used with the reader, the power supplied to the antenna and the frequency used to read the RFID tags. Further, shielding may be built into the cabinet of the gaming machine to limit the active volume of the RFID tag reader. For instance, shielding may be provided to prevent the active volume from extending behind the gaming machine or to the sides of the gaming machine.

Dynamically changing the active volume may be used to located RFID tags closest to an RFID reader. For instance, if the active volume of the reader is such that a plurality of different RFID tags carried by different players are read by the reader, then the signal strength supplied to the reader antenna may be reduced such that only the RFID tags closest to the RFID reader receive enough power to reply to the RFID reader. Thus, only the RFID tag for a player located proximate to the front of the gaming machine may be read as the power supplied to the reader antenna is reduced. This approach may be applied when it is desirable to eliminate overlapping reads.

In some instances, it may be desirable to determine to location of an RFID tag. For instance, it may be desirable to determine the location of the RFID tag proximate to a particular gaming machine or the location of an RFID tag within a casino. Methods and apparatus for locating wireless gaming devices, such as RFID tags in a wireless gaming environment are described with respect to FIG. 13.

Figure 13:
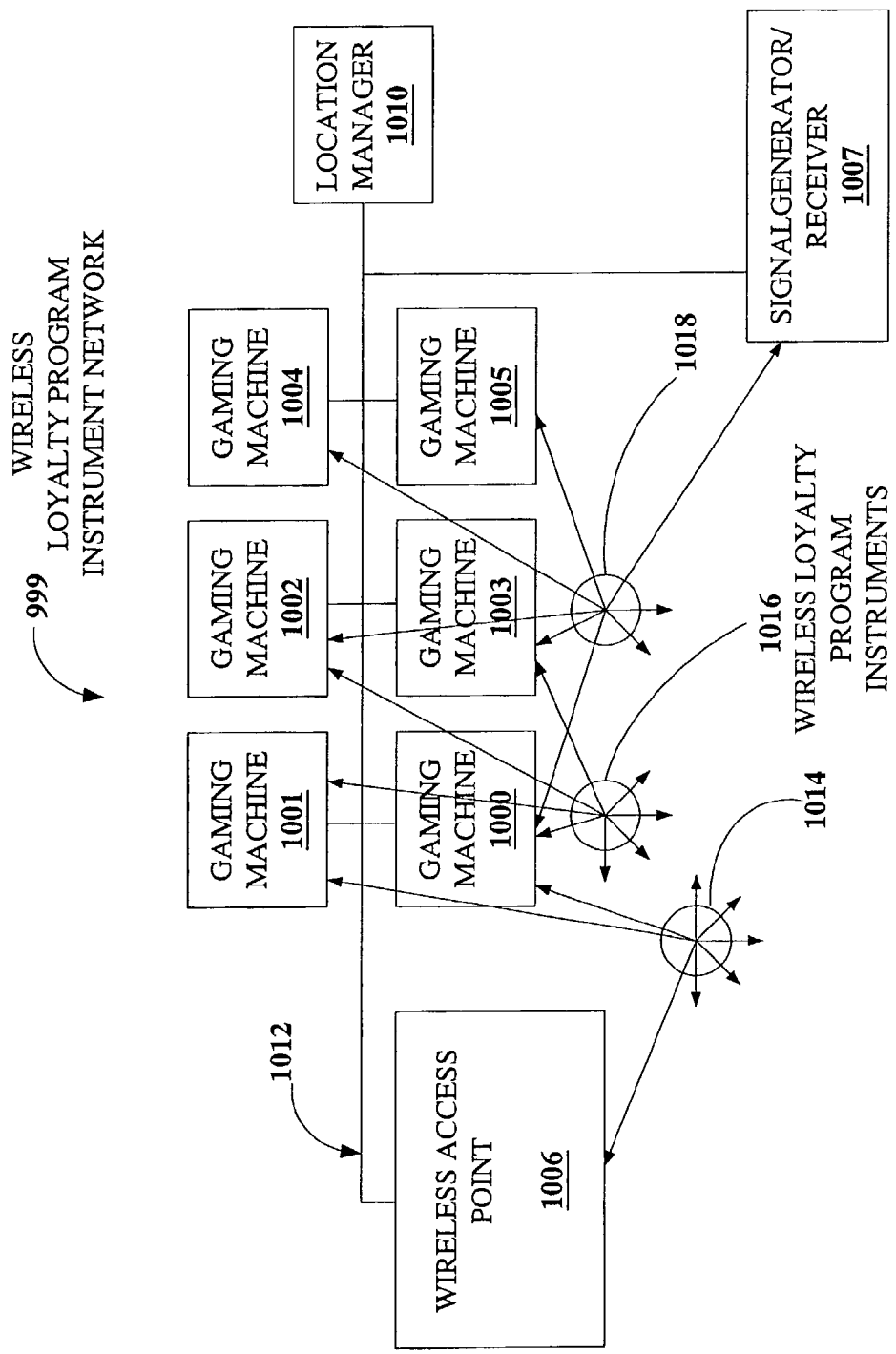
FIG. 13 is a block diagram of a gaming system providing wireless data access and wireless gaming device location services.

FIG. 13 is a block diagram of a gaming system providing wireless data access and wireless gaming device location services. In one embodiment, the gaming system is a wireless loyalty program instrument network 999. However, the present invention is not limited to locating wireless gaming devices used as loyalty program instruments. Any wireless gaming device capable of communication with the gaming system, such as cell phones and personal communication devices with wireless interfaces, used for any purpose may be located with the present invention.

The gaming system may comprise a plurality of wireless signal generators/receivers, such as RFID tag readers that are used to interrogate wireless gaming devices such as RFID tags and more complex RFID enabled devices, such as cell phones and other portable communication devices. The gaming system may also include a plurality of wireless access points to a local area network for active communication sessions with the more complex RFID devices that may transmit and receive data at higher data bandwidths. The wireless access points may provide sufficient bandwidth for services involving voice, video, internet connections, text messaging, e-mail and game services that may be provided on the more complex RFID devices. The wireless signal receivers and wireless access points may be located in gaming devices such as gaming machines 1000, 1001, 1002, 1003, 1004 and 1005. The wireless signal generators/receivers and wireless access points may be located in locations separate from the gaming machines, such as wireless signal generator/receiver 1007 and wireless access point 1006. In one embodiment, the wireless signal receivers used to locate wireless gaming devices may be totally separate from the gaming machines in that the gaming machines do not include wireless signal receivers.

The wireless signal generator/receivers and wireless access points are connected via a network 1012 to a location manager 1010. The location manager may be used to process signals received from a plurality of signal receivers in communication with the location manger 1010 and use information received from the plurality of readers to determine the location of a wireless source. The wireless sources may be RFID tags, cell phones or any type of device with a wireless communication interface.

The wireless sources may be used as loyalty program instruments. The wireless sources generate signals that may be received by a number of different signal receivers. In the case of a passive RFID device, until a signal is received from a reader device, the signals from the passive devices are not generated because the signal from the reader device is used to supply power to the wireless source to generate its reply signal. For active RFID devices with an internal power source, the initial signal may be provided by the wireless source.

As an example of how location services may be provided in gaming environment three passive RFID tags used as loyalty program instruments, 1014, 1016 and 1018, are shown in FIG. 13. The example is provided for illustrative purposes only. In one scenario, a game play session is initiated on gaming machine 1000. A player carrying the RFID tag 1016 may initiate the game play session. A player carrying the RFID tag 1018 may be involved in a game play session on an adjacent gaming machine and a third person walking near the gaming machine may be carrying the RFID tag 1014.

When the game play session is initiated, an RFID reader on gaming machine 1000 broadcasts a signal. The range of the signal is large enough to be received by RFID tags 1014, 1016 and 1018. In response to its initial signal, the RFID reader receives response signals from each of the RFID tags, 1014, 1016 and 1018, which are used as loyalty program instruments. In one embodiment, the gaming machine may be able to eliminate one or more of the loyalty program instruments based upon information read from the loyalty program instrument. For instance, one or more the loyalty program instruments may be issued for loyalty programs that are not valid on the gaming machine 1000. Thus, the gaming machine may be able to eliminate the RFID tags that are not valid on the gaming machine. In another embodiment, the gaming machine may be able to determine the closest loyalty program instruments to the gaming machine based upon the signal strength received from the tag or based upon a time to receive the signal reply signal from each of the RFID tags. Thus, when it is assumed that the RFID tags closest to the gaming machine are carried by the player initiating the game play session, the RFID tags that are farther away may be eliminated. Further, the gaming machine may reduce the power that is supplied to its reader antenna, such that, only the RFID tags closest to the gaming machine will receive enough power to generate a reply to the gaming machine. Thus, eliminating the RFID tags that are farthest away.

In one embodiment, for the case where two or more valid loyalty program instruments have been detected, the gaming machine may simply display a list of names corresponding to the index numbers read from each of the detected instruments, prompt the player to verify their name and input a pin number corresponding to the index number for their name. When a PIN number is correctly received by the gaming machine corresponding to the selected loyalty program instrument, then the loyalty program session may be initiated on the gaming machine.

In other embodiments, it may be desirable to more precisely locate, each of the RFID tags. This type of service may be applied to different types of wireless device, such as cell phones. In one example, the gaming machine 1000 may send a message to the location manager requesting a location of an RFID tag. In response, the location manager 1010 may send a message to a plurality of nearby wireless signal receivers requesting each of them to turn on their receivers and may send a message to request the RFID reader in gaming machine 1000 to send out a signal or a pattern of signals that may be received by the RFID tags where the signal strength generated by the reader may be varied. As example, in response to the signal from the reader in gaming machine 1000, the RFID tag 1014 may generate a signal that is received by the wireless access point 1006, gaming machine 1001 and gaming machine 1000. Further, the RFID tag 1016 may generate a signal that is received by the gaming machine 1000, gaming machine 1001 and gaming machine 1003. In addition RFID tag 1018 may send a signal that is received by gaming machines 1000, 1002, 1003, 1004, 1005 and the signal generator/receiver 1007.

The gaming devices receiving the signals may send response information to the location manager 1010 regarding when they received the signals and the signal strength. In addition, the location manager 1010 may request one or more other readers located on different gaming devices to send out a signal and a again request the nearby gaming devices to listen for the reply signal and relay this information to the location manager 1010.

Using the received information, the location may apply an algorithm, such as triangulation, to determine the location of each of the RFID tags. For instance, the location may be the location of the RFID tag relative to a casino floor plan. To provide this location, the location manager 1010 may store a map of the casino floor plan and the position of each signal receiver on the casino floor. After determining the location of each of the RFID tags, the location manager 1010 may send a message to the gaming machine 1000 with information indicating which RFID tag is closest to the gaming machine. In response to this information, the gaming machine 1000 may initiate a loyalty program session with the closest RFID tag.

The location manager 1010 may be capable of providing location services that are of varying accuracies. For instance, in some embodiments, it may be desirable to locate one or more RFID tags within a particular area, such as in the vicinity of a bank of gaming machines. This may be useful for monitoring traffic in the casino. In other embodiments, it may be desirable to more precisely pin-point the location of a particular RFID tag, such as its distance from a particular gaming machine. In some embodiments, the resolution of the location service may be accurate to less than 3-4 feet. The required resolution may depend on the dimensions of the gaming machines and their spacing on the casino floor. In another embodiment, the resolution may be accurate enough to determine whether a location of the wireless gaming device is directly in front of a gaming machine. To locate a wireless gaming device in front of a gaming machine may require a resolution accuracy of about 1½ feet or less.

The location manager 1010 may also keep a record of a status of each of the wireless activities involving wireless gaming devices and the locations of these devices. This information may be used to simplify the location process. For instance, the location manager 1010 may store a record that the RFID tag 1018 has been used to initiate a loyalty program session on gaming machine 1003. If the loyalty program session using RFID tag 1018 is still in session when an attempt is made on gaming machine 1000 to start a loyalty program session using RFID tag 1016, then the location manager 1010 may be able to eliminate RFID tag 1018 as the RFID tag that is to be used to initiate a loyalty program session on gaming machine 1000. In other embodiments, the location manager 1010 may assign communication frequencies for different RFID tags to use or may instruct, at times, different RFID tags to turn themselves off or not reply for a period of time. This strategy may eliminate conflicts between overlapping signals from nearby RFID tags.

Although the foregoing invention has been described in some detail for purposes of clarity of understanding, it will be apparent that certain changes and modifications may be practiced within the scope of the appended claims. For instance, while the gaming machines of this invention have been depicted as having top box mounted on top of the main gaming machine cabinet, the use of gaming devices in accordance with this invention is not so limited. For example, gaming machine may be provided without a top box.

What is claimed is:
1. A gaming machine comprising:
   a master gaming controller configured to i) control a game of chance played on the gaming machine and ii) generate data for use in a loyalty program session;
   a display mechanism for displaying the game of chance controlled by the master gaming controller;

a loyalty program session status interface separate from the display mechanism operable to at least visually display a status of the loyalty program session;

a Radio Frequency Identification (RFID) tag reader configured to read loyalty program instrument data from a loyalty program instrument, said loyalty program instrument comprising an RFID tag, said RFID tag reader comprising an antenna operable to receive the loyalty program instrument data from the RFID tag when the RFID tag is proximate to the gaming machine;

an input mechanism operable to receive an indicia of credit or money for a wager on the game of chance; and an output mechanism operable to output the indicia of credit or the money;

wherein the gaming machine is configured to
- a) determine a first gaming event has occurred on the gaming machine, said first gaming event comprising at least one of (i) a deposit of an indicia of credit into the gaming machine, (ii) an insertion of a card into a card slot on the gaming machine, (iii) an activation of an input button on the gaming machine, (iv) an input of a loyalty program instrument into the input mechanism on the gaming machine, (v) an input of a code into the gaming machine, (vi) an input of biometric information into the gaming machine;
- b) broadcast an RFID tag compatible signal, in response to determining the first gaming event has occurred;
- c) receive loyalty program instrument data from the RFID tag;
- d) after receiving the loyalty program instrument data, output on the loyalty program session status interface an indication that a loyalty program session is active;
- e) determine a second gaming event has occurred on the gaming machine;
- f) determine that the second gaming event is to result in a termination of the loyalty program session;
- g) in response to determining the second gaming event is to result in the termination of the loyalty program session, output on the loyalty program session status interface an indication that the loyalty program session interface is inactive;
- h) prior to changing a status of the loyalty program session and in response to determining the second gaming event is to result in the termination of the loyalty program session, output on the loyalty program session status interface an indication that the loyalty program status is about to change.

2. The gaming machine of claim 1, wherein the RFID reader is operable to read the loyalty program instrument data from the loyalty program instrument for the loyalty program instrument in a fixed position relative to the antenna during the reading of data from the loyalty program instrument data.

3. The gaming machine of claim 1, wherein the RFID reader is operable to read the loyalty program instrument data from the loyalty program instrument for the loyalty program instrument in a time varying orientation relative to the antenna during the reading of data from the loyalty program instrument data.

4. The gaming machine of claim 1, wherein the RFID reader is operable to read the loyalty program instrument data from the loyalty program instrument for the loyalty program instrument in a time varying distance relative to the antenna during the reading of data from the loyalty program instrument data.

5. The gaming machine of claim 1, wherein the RFID reader is operable to read the loyalty program instrument data from the loyalty program instrument for the loyalty program instrument in a plurality of distances relative to the antenna.

6. The gaming machine of claim 1, wherein the RFID reader is operable to read the loyalty program instrument data from the loyalty program instrument for the loyalty program instrument in a plurality of orientations relative to the antenna.

7. The gaming machine of claim 1, wherein the loyalty program instrument data stored on the RFID tag includes one or more of a plurality of index numbers, each of said index numbers corresponding to a different loyalty program.

8. The gaming machine of claim 7, wherein the gaming machine further comprises logic for selecting index numbers from the plurality of index numbers that are valid for use on the gaming machine.

9. The gaming machine of claim 1, wherein the gaming machine is operable to provide a gaming service using loyalty program instrument data read from the loyalty program instrument wherein the gaming service is provided after reading the loyalty program instrument data and prior to contacting a remote server.

10. The gaming machine of claim 9, wherein the gaming service is selected from the group consisting of providing a player tracking session and configuring the gaming machine according to a preferred gaming machine configuration.

11. The gaming of machine of claim 1, further comprising:
one or more physical guides for aligning the loyalty program instrument relative to the antenna.

12. The gaming machine of claim 1, further comprising:
a sound projection device for emitting a sound in response to a data read by the RFID reader.

13. The gaming machine of claim 1, further comprising:
a lighting device for generating light in response to a data read by the RFID reader.

14. The gaming machine of claim 13, wherein the lighting device changes color in response to a data read by the RFID reader.

15. The gaming machine of claim 13, wherein the lighting device generates one of a first color, first light pattern and combinations thereof when the status of the loyalty program session is active and wherein the lighting device generates one of a second color, a second light pattern and combinations thereof when the status of the loyalty program session is inactive.

16. The gaming machine of claim 15, wherein the lighting device generates one of a third color, a third light pattern and combinations thereof when the status of the loyalty program session is about to change.

17. The gaming machine of claim 1, further comprising:
the loyalty program session status interface comprising:
a lighting device and a sound projection device.

18. The gaming machine of claim 17, wherein the loyalty program session status interface generates one of a sound, a light pattern, a light color and combinations thereof when data is read correctly by the RFID reader.

19. The gaming machine of claim 17, wherein the loyalty program session status interface generates one of a sound, a light pattern, a light color and combinations thereof when data is read incorrectly by the RFID reader.

20. The gaming machine of claim 17, wherein the loyalty program session status interface generates one of a sound, a light pattern, a light color and combinations thereof when a status of the loyalty program session is active.

21. The gaming machine of claim 17, wherein the loyalty program session status interface generates one of a sound, a light pattern, a light color and combinations thereof when a status of the loyalty program session is inactive.

22. The gaming machine of claim 17, wherein the loyalty program session status interface generates one of a sound, a light pattern, a light color and combinations thereof when a status of the loyalty program session is about to change.

23. The gaming machine of claim 1, further comprising:
a housing for mounting within an interior of the gaming machine, said housing comprising:
a front surface including an opening allowing the loyalty program instrument to be inserted into the gaming machine and to be removed from the gaming machine wherein the front surface of the housing is part of an exterior of surface of the gaming machine.

24. The gaming machine of claim 1, wherein the game of chance is selected from the group consisting of video slot games, mechanical slot games, video black jack games, video poker games, video keno games, video pachinko games, video card games, video games of chance and combinations thereof.

25. The gaming machine of claim 1, wherein RFID tag reader is coupled to a player tracking unit mounted within the gaming machine.

26. The gaming machine of claim 1, wherein the second gaming event is one or more of a tilt condition, an error condition, and a request for a loyalty program instrument.

27. The gaming machine of claim 1, wherein the RFID tag is an inductively coupled RFID tag or a capacitively coupled RFID tag.

28. The gaming machine of claim 1, wherein the RFID tag is operable to store an index to a record in a loyalty program database, a record of data in a loyalty program database or combinations thereof.

29. The gaming machine of claim 1, wherein the stored data is encrypted.

30. The gaming machine of claim 1, wherein stored data is one of 1) loyalty program information, 2) biometric information, 3) player preferences, 4) promotional information, 5) gaming machine configuration settings, 6) prize information, 7) cashless transaction information and 8) and combinations thereof.

31. The gaming machine of claim 1, wherein the RFID tag further comprises at least one of 1) a logic device and 2) a random access memory.

32. The gaming machine of claim 1, wherein the RFID reader is designed to program the RFID tag or a first RFID tag stored on the gaming machine.

33. The gaming machine of claim 1, wherein the RFID reader is designed to read data from a plurality of RFID tags carried by a game player.

34. The gaming machine of claim 1, further comprising:
a printer.

35. The gaming machine of claim 34, wherein the printer is capable of generating an electronic circuit on a printable media stored on the gaming machine.

36. The gaming machine of claim 35, wherein the printable media is flexible.

37. The gaming machine of claim 35, wherein the master game controller is further configured to program the electronic circuit to store loyalty instrument data.

38. The gaming machine of claim 35, wherein the electronic circuit is part of an RFID tag.

39. The gaming machine of claim 1, wherein the second gaming event is one or more of i) an occurrence of zero credits on the gaming machine, ii) an amount of idle time on the gaming machine exceeding a specified limit, iii) a cashout request, iv) a timeout condition, v) an inability to detect a user at the gaming machine or vi) combinations thereof.

40. The gaming machine of claim 1, wherein the RFID tag is designed or configured to only respond to the RFID reader in response to receiving power from the RFID reader.

* * * * *